United States Patent
Hayakawa et al.

(10) Patent No.: US 10,096,124 B2
(45) Date of Patent: Oct. 9, 2018

(54) WATER DROPLET DETECTION DEVICE, AND THREE-DIMENSIONAL OBJECT DETECTION DEVICE USING WATER DROPLET DETECTION DEVICE

(71) Applicants: Nissan Motor Co., Ltd., Yokohama-shi, Kanagawa (JP); Clarion Co., Ltd., Saitama-shi, Saitama (JP)

(72) Inventors: Yasuhisa Hayakawa, Yokohama (JP); Osamu Fukata, Commerce Township, MI (US); Masayuki Takemura, Hitachi (JP); Akira Utagawa, Hitachinaka (JP); Shoji Muramatsu, Hitachi (JP); Kota Irie, Sagamihara (JP)

(73) Assignees: Nissan Motor Co., Ltd., Yokohama (JP); Clarion Co., Ltd., Saitama (JP)

( * ) Notice: Subject to any disclaimer, the term of this patent is extended or adjusted under 35 U.S.C. 154(b) by 872 days.

(21) Appl. No.: 14/410,585

(22) PCT Filed: Jul. 24, 2013

(86) PCT No.: PCT/JP2013/070012
§ 371 (c)(1),
(2) Date: Dec. 23, 2014

(87) PCT Pub. No.: WO2014/017523
PCT Pub. Date: Jan. 30, 2014

(65) Prior Publication Data
US 2015/0325005 A1    Nov. 12, 2015

(30) Foreign Application Priority Data

Jul. 27, 2012  (JP) ................................ 2012-166525
Jul. 27, 2012  (JP) ................................ 2012-166526

(51) Int. Cl.
*G06T 7/20* (2017.01)
*B60S 1/08* (2006.01)
(Continued)

(52) U.S. Cl.
CPC .......... *G06T 7/2053* (2013.01); *B60S 1/0844* (2013.01); *B60S 1/56* (2013.01); *G06T 7/174* (2017.01);
(Continued)

(58) Field of Classification Search
CPC ... G06T 7/2053; G06T 7/0042; G06T 7/0097; H04N 5/3595; H04N 7/18; B60S 1/0844
See application file for complete search history.

(56) References Cited

U.S. PATENT DOCUMENTS

2005/0035926 A1* 2/2005 Takenaga .............. B60S 1/0818
345/8
2009/0257621 A1* 10/2009 Silver .................. G06K 9/6202
382/103
(Continued)

FOREIGN PATENT DOCUMENTS

EP       1 507 138 A2    2/2005
JP     2001-199492 A    7/2001
(Continued)

OTHER PUBLICATIONS

Ballard et al, "Generalizing the Hough Transform to detect arbitrary shapes", Jan. 1981, Pattern Recognition, vol. 13, No. 2, pp. 111-122.*

*Primary Examiner* — Shawn S An
(74) *Attorney, Agent, or Firm* — Global IP Counselors, LLP

(57) ABSTRACT

A water droplet detection device has an image capturing unit and a water droplet detection unit. The image capturing unit has a photographic optical system that an area captures an
(Continued)

image of a predetermined area. The water droplet detection unit sets an arbitrary attention point in the captured image, a plurality of first reference points inside an imaginary circle of a predetermined radius having the attention point as a center the imaginary circle, and a plurality of second reference points corresponding to the first reference points outside the imaginary circle. The water droplet detection unit detects edge information between the first reference points and second reference points, and assesses a circularity strength of the edge information to detect a water droplet attached to the photographic optical system. The water droplet detection device can be used with an image conversion unit to form a three-dimensional object detection device.

27 Claims, 37 Drawing Sheets

(51) Int. Cl.
| | | |
|---|---|---|
| G06T 7/42 | (2017.01) | |
| G06T 7/00 | (2017.01) | |
| H04N 7/18 | (2006.01) | |
| B60S 1/56 | (2006.01) | |
| H04N 5/359 | (2011.01) | |
| G08G 1/16 | (2006.01) | |
| G06T 7/73 | (2017.01) | |
| G06T 7/174 | (2017.01) | |
| G06T 7/254 | (2017.01) | |
| G06K 9/00 | (2006.01) | |

(52) U.S. Cl.
CPC ............... *G06T 7/254* (2017.01); *G06T 7/42* (2017.01); *G06T 7/73* (2017.01); *G06T 7/97* (2017.01); *G08G 1/166* (2013.01); *G08G 1/167* (2013.01); *H04N 5/3595* (2013.01); *H04N 7/18* (2013.01); *B60S 1/0848* (2013.01); *G06K 9/00825* (2013.01); *G06T 2207/10016* (2013.01); *G06T 2207/20224* (2013.01); *G06T 2207/30261* (2013.01)

(56) References Cited

U.S. PATENT DOCUMENTS

| | | | | |
|---|---|---|---|---|
| 2010/0098339 | A1* | 4/2010 | Kido | ............... G06K 9/6253 |
| | | | | 382/199 |
| 2010/0329513 | A1* | 12/2010 | Klefenz | ............... G01C 21/00 |
| | | | | 382/104 |
| 2013/0028488 | A1* | 1/2013 | Abe | ............... G06K 9/0008 |
| | | | | 382/115 |

FOREIGN PATENT DOCUMENTS

| | | | |
|---|---|---|---|
| JP | 2002-79880 A | 3/2002 | |
| JP | 2005-225250 A | 8/2005 | |
| JP | 2006-262242 A | 9/2006 | |
| JP | 2007-226605 A | 9/2007 | |
| JP | 2008-219063 A | 9/2008 | |
| JP | 2010-41120 A | 2/2010 | |
| WO | WO 2013037402 A1 * | 3/2013 | ......... G06K 9/00791 |

\* cited by examiner

WATER DROPLET DETECTION DEVICE, AND THREE-DIMENSIONAL OBJECT DETECTION DEVICE USING WATER DROPLET DETECTION DEVICE

CROSS-REFERENCE TO RELATED APPLICATIONS

This application is a U.S. National stage application of International Application No. PCT/JP2013/070012, filed Jul. 24, 2013, which claims priority to Japanese Patent Application No. 2012-166525 filed in Japan on Jul. 27, 2012 and Japanese Patent Application No. 2012-166526 filed in Japan on Jul. 27, 2012.

BACKGROUND

Field of the Invention

The present invention relates to a water droplet detection device and a three-dimensional object detection device that uses the water droplet detection device.

Background Information

On-board monitoring devices for vehicles that use CCD cameras are known to include a lens for capturing a first focal point distance for near distances used for imaging rain droplets that have attached to the vehicle and a second focal point distance for far distances used for imaging the vehicle periphery, and a camera unit that switches the lens focal point distance between the first focal point distance and the second focal point distance. When the presence of rain droplets is to be detected, a switch is made to the first focal point distance, whereas when the periphery of the vehicle is to be monitored, a switch is made to the second focal point distance (Japanese Laid-Open Patent Application No. 2005-225250).

SUMMARY

However, because it is necessary to switch the focal point distance of the lens in order to detect rain droplets in the prior art described above, there is a problem in that it is not possible to carry out detection of an object during switching.

The problem to be solved by the present invention is to provide a water droplet detection device that can detect water droplets without generating a period of non-detection, and a three-dimensional object detection device using the water droplet detection device.

The present invention resolves the problem described above by detecting whether or not water droplets have attached to the photographic optical system of the image capturing unit, and, when water droplets have attached, controlling the vehicle in accordance with this state.

In accordance with the present invention, the vehicle is controlled in accordance with the water droplet attachment condition, and, for example, the water droplets are removed or detection of a three-dimensional object or another vehicle is suppressed when a large number of water droplets have attached, thereby allowing detection of a three-dimensional object without false detection due to water droplets.

BRIEF DESCRIPTION OF THE DRAWINGS

Referring now to the attached drawings which form a part of this original disclosure.

DETAILED DESCRIPTION OF THE EMBODIMENTS

Figure 1:
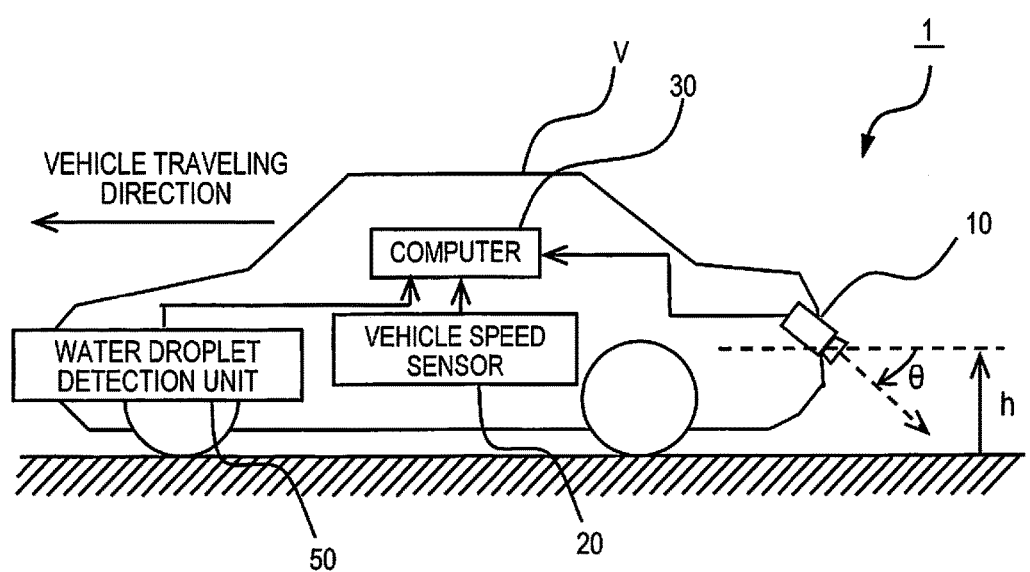
FIG. 1 is a schematic overview of a vehicle in an embodiment to which the three-dimensional object detection device of the present invention has been applied.

FIG. 1 is a schematic overview of a vehicle in an embodiment to which a three-dimensional object detection device 1 of the present invention has been applied. The three-dimensional object detection device 1 of this example is intended to detect other vehicles that have potential for contact when the host vehicle V is changing lanes and to calculate travel distances. For this reason, the example that is described below is an example in which the three-dimensional object detection device 1 is mounted in a vehicle V, and a trailing vehicle is the three-dimensional object to be detected. As shown in the drawing, the three-dimensional object detection device 1 of this example has a camera 10, a vehicle speed sensor 20, a computer 30, and a water droplet detection unit 40.

The camera 10, as shown in FIG. 1, is attached to the vehicle V at a position at height h to the rear of the vehicle V so that the optical axis produces an angle θ downward from the horizontal. The camera 10 captures a predetermined area within the peripheral environment of the vehicle V from this position. The vehicle speed sensor 20 detects the travelling speed of the vehicle V, and, for example, calculates the vehicle speed from the vehicle wheel speed detected by a vehicle wheel speed sensor for detecting the rotation rate at a vehicle wheel. The computer 30 detects the three-dimensional object to the rear of the vehicle, and, in this example, calculates the moving distance and traveling speed for the three-dimensional object. The water droplet detection unit 40 detects the presence of water droplets such as rain droplets that have attached to the photographic optical system such as the lens of the camera 10, the details of which are described below.

Figure 2:
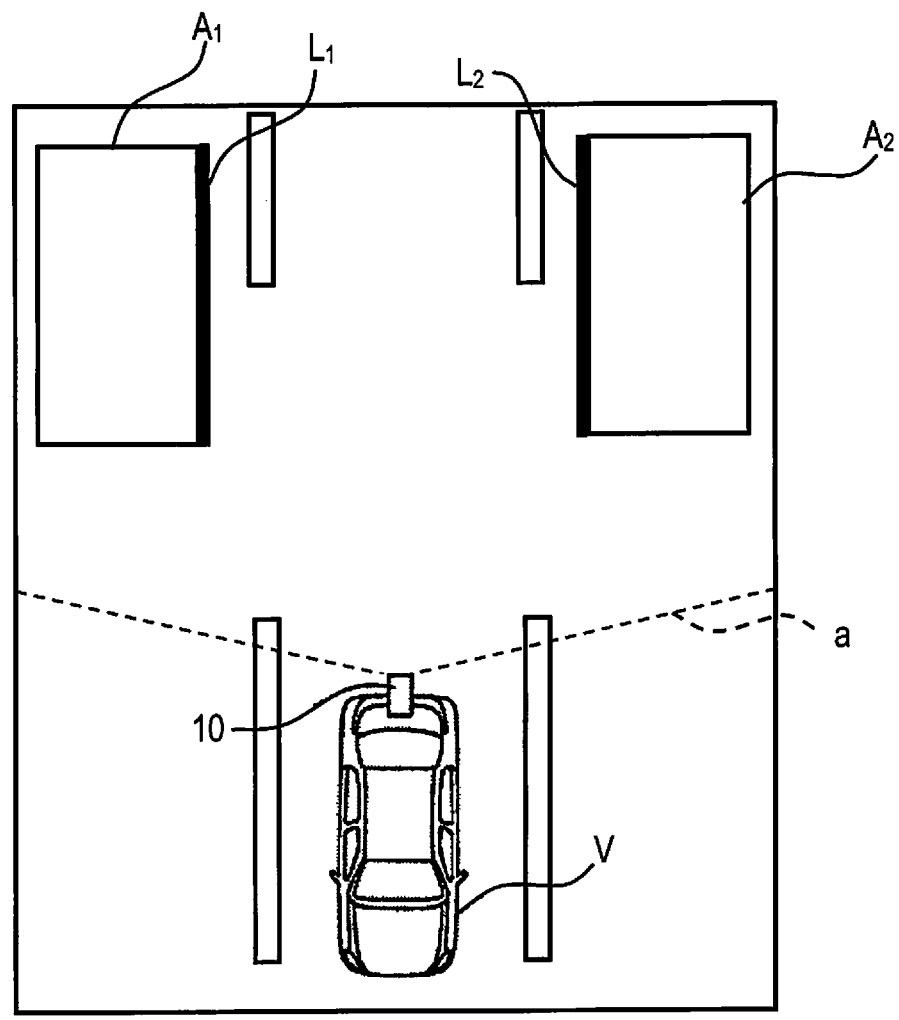
FIG. 2 is a plan view illustrating the travelling state of the vehicle of FIG. 1 (three-dimensional object detection based on differential waveform information).

FIG. 2 is a plan view illustrating the traveling state of the host vehicle V in FIG. 1. As illustrated in the drawing, the camera 10 captures the rearward side of the vehicle at a predetermined view angle a. The view angle a of the camera 10 is set to a view angle that allows capture of the vehicles lanes to the left and right as well as the vehicle lane in which the host vehicle V is travelling. A first embodiment of the three-dimensional object detection device of the present invention is described below with reference to FIGS. 3 to 30, and a second embodiment of the same is described with reference to FIGS. 31 to 36.

First Embodiment

Figure 3:
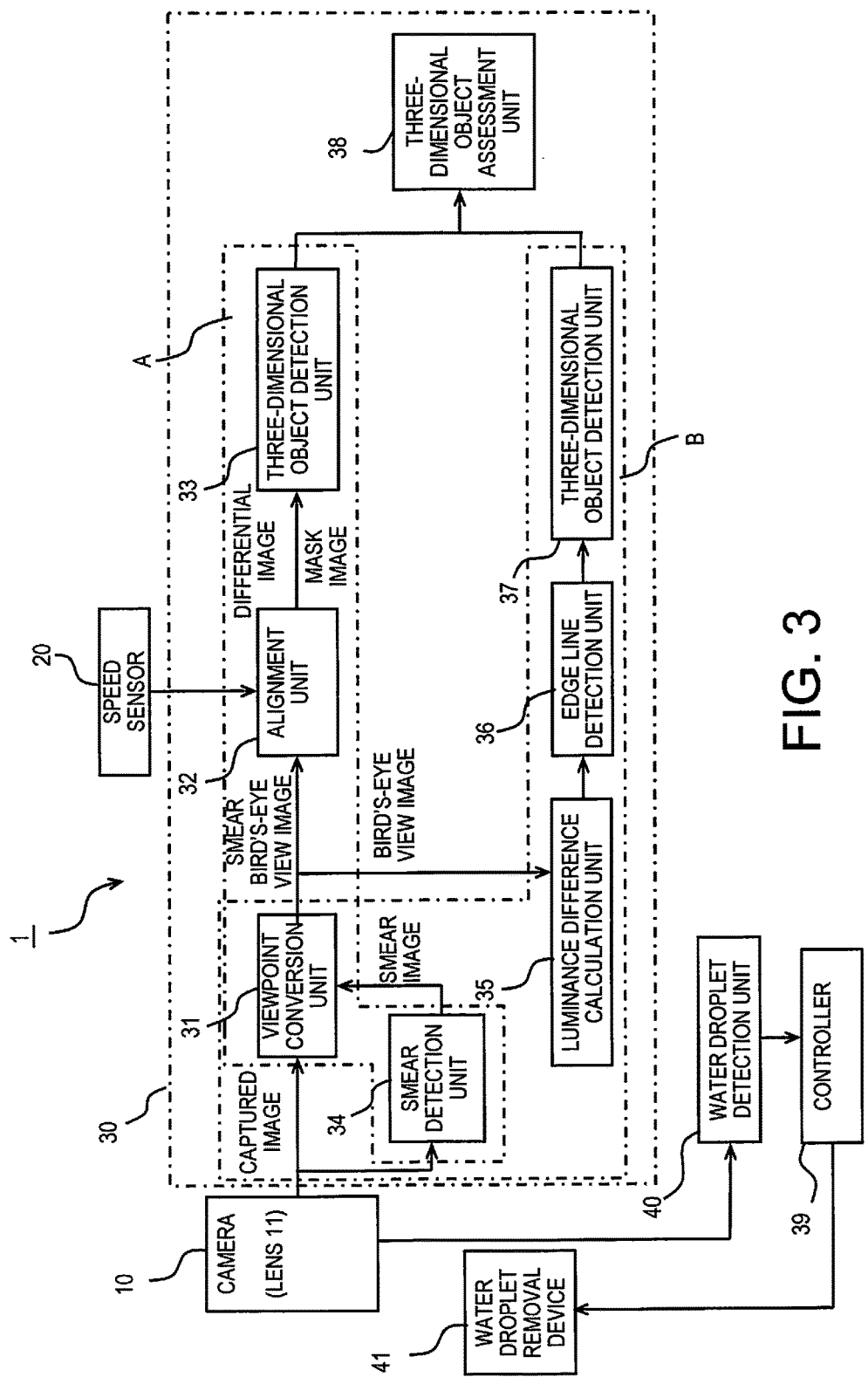
FIG. 3 is a block diagram illustrating the details of a first embodiment of the computer of FIG. 1.

FIG. 3 is a block view illustrating the details of the computer 30 of FIG. 1. In FIG. 3, the camera 10, the vehicle speed sensor 20, the water droplet detection unit 40, and the water droplet removal device 41 are depicted in order to clarify how these components are interconnected.

As illustrated in FIG. 3, the computer 30 is provided with a viewpoint conversion unit 31, an alignment unit 32, a first three-dimensional object detection unit 33, a smear detection unit 34, a luminance difference calculation unit 35, an edge line detection unit 36, a second three-dimensional object detection unit 37, a three-dimensional object assessment unit 38, and a controller 39. Of these, the viewpoint conversion unit 31, the smear detection unit 34, the alignment unit 32, and the first three-dimensional object detection unit 33 are constituent units related to the three-dimensional object detection block A which utilizes the differential waveform information described below. The viewpoint conversion unit 31, the luminance difference calculation unit 35, the edge line detection unit 36, and the second three-dimensional object detection unit 37 are constituent units related to the three-dimensional object detection block B which utilizes the edge information described below. First, the respective constituent units will be described below.

<<Detection of Three-Dimensional Object Using Differential Waveform Information>>

The three-dimensional object detection device 1 of this embodiment detects a three-dimensional object that is present in the right detection area or left detection area to the rear of the vehicle based on the image information that is obtained from a monocular camera 1 that captures images to the rear of the vehicle.

Captured image data of the predetermined area obtained by capturing carried out by the camera 10 is inputted to the viewpoint conversion unit 31, and the captured image data thus inputted is converted to bird's-eye-view image data, which represents a bird's-eye-view state. A bird's-eye-view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. Viewpoint conversion of captured image data to bird's-eye-view image data is based on the principle that vertical edges unique to a three-dimensional object are converted to a straight-line group that passes through a specific fixed point by viewpoint conversion to bird's-eye-view image data, and utilizing this principle allows a planar object and a three-dimensional object to be differentiated. The results of image conversion processing by the viewpoint conversion unit 31 are utilized also in the detection of three-dimensional objects based on edge information described below.

Figure 4:
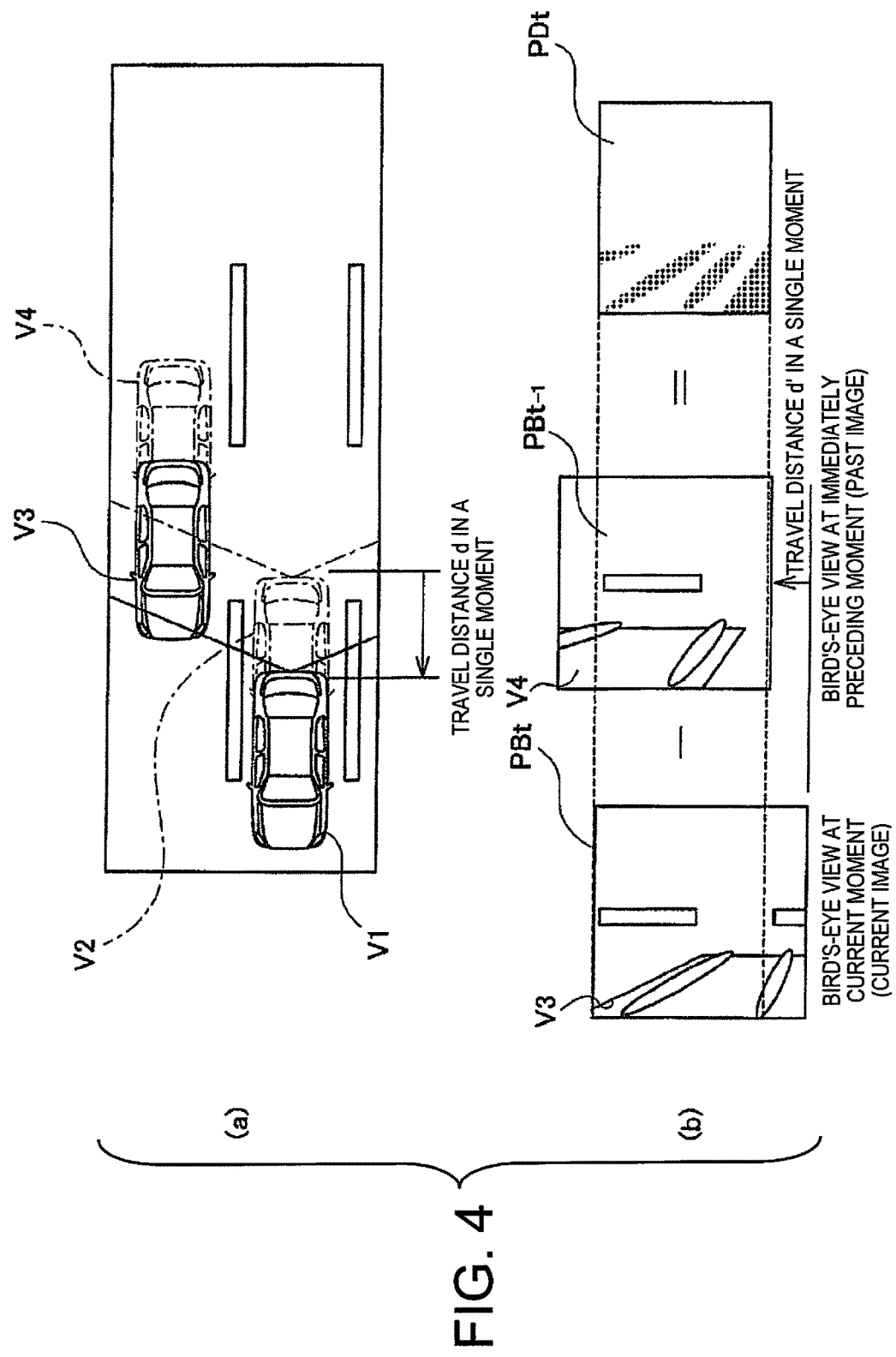
FIG. 4 is an explanatory view illustrating the general overview of the processing of the alignment unit of FIG. 3, with part (a) of FIG. 4 being a plan view showing the moving state of the vehicle, and part (b) of FIG. 4 being an image showing a general overview of alignment.

The bird's-eye-view image data obtained by viewpoint conversion carried out by the viewpoint conversion unit 31 is sequentially inputted to the alignment unit 32, and the inputted positions of the bird's-eye-view image data at different times are aligned. FIG. 4 is a view for describing the general overview of the processing of the alignment unit 32. Part (a) of FIG. 4 is a plan view illustrating the movement state of the vehicle V, and part (b) of FIG. 4 is an image illustrating a general overview of alignment.

As illustrated in part (a) of FIG. 4, the host vehicle V at the current moment is positioned at V1, and the host vehicle V at a single moment prior is positioned at V2. It is assumed that another vehicle V is positioned in the rear-side direction of the host vehicle V and is travelling parallel to the host vehicle V, and that the other vehicle V at the current moment is positioned at V3, and that the other vehicle V at a single moment prior is positioned at V4. Also, it is assumed that the host vehicle V has moved a distance d in a single moment. The phrase "at a single moment prior" may be a moment in the past by a time set in advance (e.g., a single control cycle) from the current moment, or may be a moment in the past by an arbitrary time.

In such a state, a bird's-eye-view image $PB_t$ at the current moment is illustrated in part (b) of FIG. 4. The white lines drawn on the road surface are rectangular in this bird's-eye-view image $PB_t$ and are relatively accurate in a planar view, but collapsing occurs with the other vehicle V3. The same applies to the bird's-eye-view image $PB_{t-1}$ at a single moment prior; the white lines drawn on the road surface are rectangular and are relatively accurate in a planar view, but collapsing occurs with the other vehicle V4. As previously described, vertical edges of a three-dimensional object (edges that stand erect in three-dimensional space from the road surface that are outside the strict meaning of vertical edge are also included) appear as a straight-line group along the collapsing direction due to the process for converting the viewpoint to bird's-eye-view image data, but because a planar image on the road surface does not include vertical edges, such collapsing does not occur when the viewpoint has been converted.

The alignment unit 32 carries out alignment of the bird's-eye-view images $PB_t$ and $PB_{t-1}$ as described above on the data. When this is carried out, the alignment unit 32 offsets the bird's-eye-view image $PB_{t-1}$ at a single moment prior, and matches the position with the bird's-eye-view image $PB_t$ at the current moment. The left-side image and the center image in part (b) of FIG. 4 illustrate the state of being offset by a travel distance d'. The offset amount d' is the amount of movement in the bird's-eye-view image data that corresponds to the actual travel distance d of the host vehicle V illustrated in part (a) of FIG. 4, and is decided based on a signal from the vehicle speed sensor 20 and the time from a single moment prior to the current moment.

After alignment, the alignment unit 32 obtains the difference between the bird's-eye-view images $PB_t$ and $PB_{t-1}$, and generates differential image $PD_t$ data. The pixel values of the differential image $PD_t$ may be the absolute values of the pixel value differences between the bird's-eye-view images $PB_t$ and $PB_{t-1}$, or may be taken as "1" if the absolute value exceeds, or "0" if the absolute value does not exceed, a predetermined threshold value for purposes of adapting to variation in the illumination environment. The right image in part (b) of FIG. 4 is the differential image $PD_t$. In this example, the alignment unit 32 aligns the positions of the bird's-eye-view image at different times on a bird's-eye view, and this aligned bird's-eye-view image is obtained. However, this alignment processing can be carried out based on luminance in accordance with the desired detection precision or the type of object to be detected. This processing may involve strict alignment, which is performed with respect to the same point in time and the same position, or relaxed alignment, which involves ascertaining coordinates of the birds-eye-view images.

Returning to FIG. 3, the first three-dimensional object detection unit 33 detects a three-dimensional object based on the differential image $PD_t$ data illustrated in part (b) of FIG. 4. In this example, the first three-dimensional object detection unit 33 calculates the travel distance of the three-dimensional object in actual space. The first three-dimensional object detection unit 33 first generates a differential waveform when the three-dimensional object is detected and the travel distance is calculated. The travel distance of the three-dimensional object per unit time is used for calculating the traveling speed of the three-dimensional object. Then, the traveling speed of the three-dimensional object can be used in determining whether or not the three-dimensional object is a vehicle.

In generating the differential waveform, the first three-dimensional object detection unit 33 sets a detection area in the differential image $PD_t$. The three-dimensional object detection device 1 of the present example detects, as a detection object, another vehicle VX that the operator of the host vehicle should pay attention to, in particular, another vehicle VX that is travelling in a lane adjacent to the lane in which the host vehicle V is travelling and which has the potential for contact should the host vehicle V change lanes. Accordingly, in the present example, in which a three-dimensional object is to be detected based on image information, two detection areas are set on the left and right sides of the host vehicle V among the images that are obtained by the camera 10. Specifically, in this example, rectangular detection areas A1, A2 are set behind the host vehicle V, as illustrated in FIG. 2. The other vehicle VX that has been detected in the detection areas A1, A2 is detected as a harmful object that is travelling in an adjacent lane that is adjacent to the lane in which the host vehicle V is travelling. Such detection areas A1, A2 may be set from a relative position with respect to the host vehicle V, or may be set based on the position of the white lines. When set based on the position of the white lines, the three-dimensional object detection device 1 may use, e.g., known white line recognition techniques.

The first three-dimensional object detection unit 33 identifies, as ground lines L1, L2, the borders of the set detection areas A1, A2 on the host vehicle V side (borders along the traveling direction). Generally, a ground line refers to a line in which a three-dimensional object is in contact with the ground, but in the present embodiment, a ground line is not a line in contact with the ground, but is rather set in the manner described above. Even such being the case, the difference between the ground line according to the present embodiment and the normal ground line determined from the position of the other vehicle V is not exceedingly great as determined by experience, and there is no problem in actuality.

Figure 5:
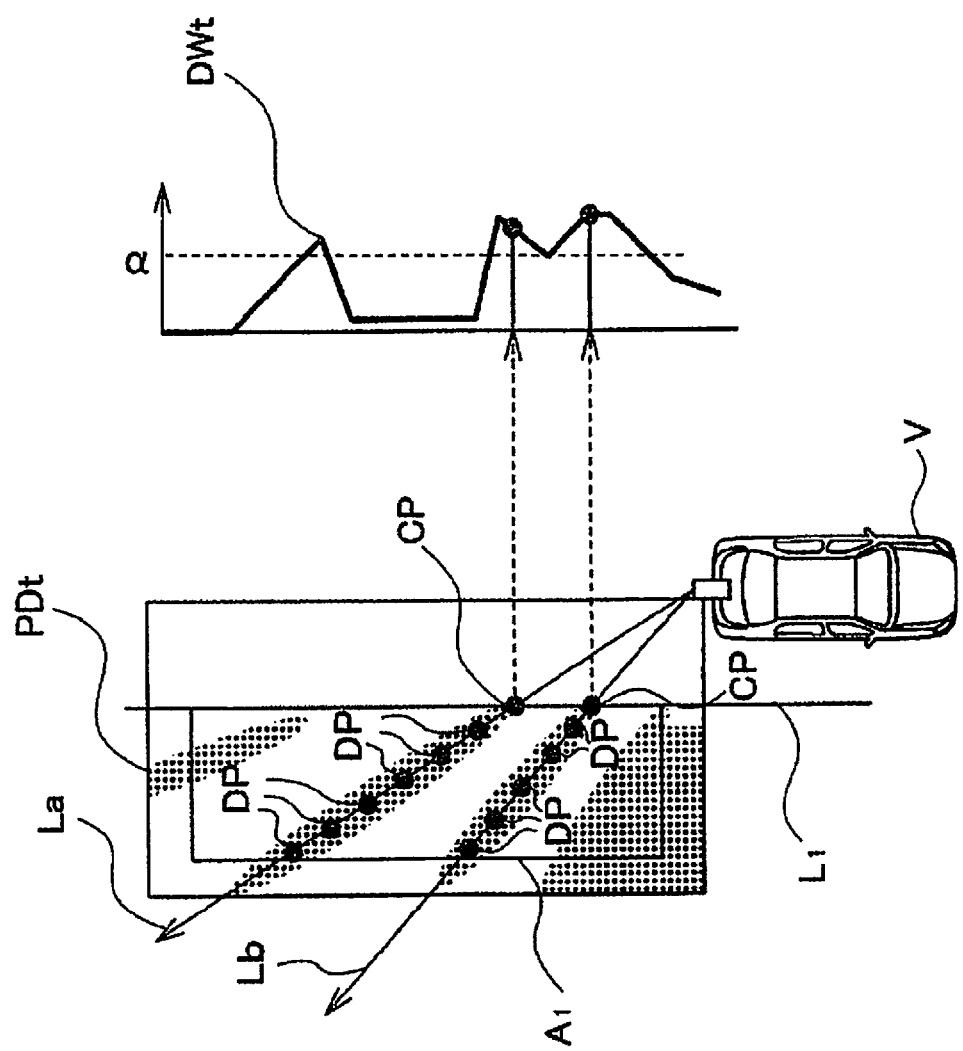
FIG. 5 is a schematic view illustrating the manner of generation of the differential waveform by the first three-dimensional object detection unit of FIG. 3.

FIG. 5 is a schematic view illustrating the manner in which the differential waveform is generated by the first three-dimensional object detection unit 33 shown in FIG. 3. As illustrated in FIG. 5, the first three-dimensional object detection unit 33 generates a differential waveform $DW_t$ from the portion that corresponds to the detection areas A1, A2 in the differential image $PD_t$ (drawing on the right in part (b) of FIG. 4) calculated by the alignment unit 32. In this case, the first three-dimensional object detection unit 33 generates a differential waveform $DW_t$ along the collapsing direction of the three-dimensional object by viewpoint conversion. In the example illustrated in FIG. 5, for the sake of convenience only the detection area A1 will be described, but the differential waveform $DW_t$ is generated for the detection area A2 as well using the same procedure.

More specifically, first, the first three-dimensional object detection unit 33 defines a line La in the direction in which the three-dimensional object collapses in the differential image $PD_t$ data. The first three-dimensional object detection unit 33 then counts the number of difference pixels DP indicating a predetermined difference on the line La. The difference pixels DP indicating a predetermined difference are pixels that exceed a predetermined threshold value when the pixel values of the differential image PDt are absolute valuations of the difference in pixel values of the bird's-eye-view images $PB_t$, $PB_{t-1}$, or are pixels that are indicated by "1" when the pixel values of the differential image PDt are represented by "0" and "1".

The first three-dimensional object detection unit 33 counts the number of difference pixels DP, and thereafter determines the crossing point CP of the line La and the ground line L1. The first three-dimensional object detection unit 33 then correlates the crossing point CP and the count, decides the horizontal-axis position; i.e., the position on the axis in the vertical direction in the drawing on the right in FIG. 5, based on the position of the crossing point CP, decides the vertical-axis position; i.e., the position on the axis in the lateral direction in the drawing on the right in FIG. 5, from the count, and plots the positions as the count at the crossing point CP.

Similarly, the first three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count (the number of difference pixels DP), and plots the positions. The first three-dimensional object detection unit 33 repeats the above in sequence to form a frequency distribution and thereby generate a differential waveform $DW_t$ as illustrated in the drawing on the right in FIG. 5.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when it is assumed that the detection area A1 is filled with the difference pixels DP. For this reason, the first three-dimensional object detection unit 33 performs normalization based on the distance of overlap between the lines La, Lb in the direction in which the three-dimensional object collapses and the detection area A1 when the vertical-axis position is decided from the count of the difference pixels DP. In a specific example, there are six difference pixels DP on the line La and there are five difference pixels DP on the line Lb in the drawing on the left in FIG. 5. Accordingly, when the vertical-axis position is decided from the count in FIG. 5, the first three-dimensional object detection unit 33 divides the count by the overlapping distance or performs normalization in another manner. The values of the differential waveform $DW_t$ that correspond to the lines La, Lb in the direction in which the three-dimensional object collapses are thereby made substantially the same, as illustrated in the differential waveform $DW_t$.

After the differential waveform $DW_t$ has been generated, the first three-dimensional object detection unit 33 calculates the travel distance by comparison with the differential waveform $DW_{t-1}$ at a single moment prior. In other words, the first three-dimensional object detection unit 33 calculates the travel distance from the change in time of the differential waveforms $DW_t$ and $DW_{t-1}$.

Figure 6:
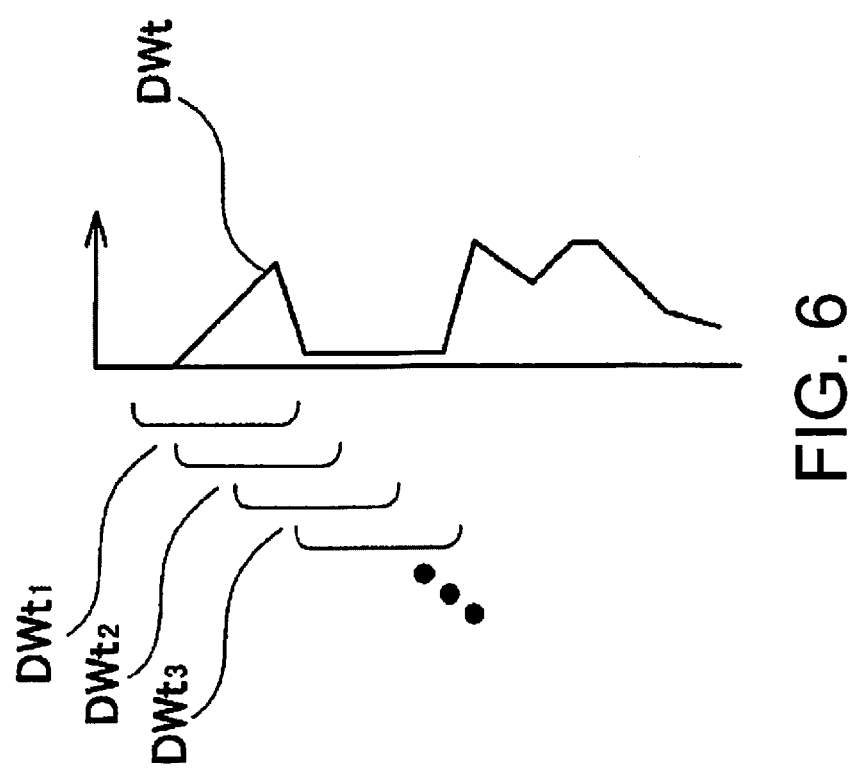
FIG. 6 is a view illustrating the small areas divided by the first three-dimensional object detecting unit of FIG. 3.

More specifically, the first three-dimensional object detection unit 33 divides the differential waveform $DW_t$ into a plurality of small areas $DW_{t1}$ to $DW_{tn}$ (where n is an arbitrary integer of 2 or greater), as illustrated in FIG. 6. FIG. 6 is a view illustrating the small areas $DW_{t1}$ to $DW_{tn}$ divided by the first three-dimensional object detection unit 33. The small areas $DW_{t1}$ to $DW_{tn}$ are divided so as to be mutually overlapping, as illustrated in, e.g., FIG. 6. For example, the small area $DW_{t1}$ and the small area $DW_{t2}$ overlap each other, and the small area $DW_{t2}$ and the small area $DW_{t3}$ overlap each other.

Next, the first three-dimensional object detection unit 33 determines the offset amount (the amount of movement in the horizontal-axis direction (vertical direction in FIG. 6) of the differential waveform) for each of the small areas $DW_{t1}$ to $DW_{tn}$. Here, the offset amount is determined from the difference (distance in the horizontal-axis direction) between the differential waveform $DW_{t-1}$ at a single moment prior and the differential waveform $DW_t$ at the current moment. In this case, the first three-dimensional object detection unit 33 moves the differential waveform $DW_{t-1}$ at a single moment prior in the horizontal-axis direction for each of the small areas $DW_{t1}$ to $DW_{tn}$, and thereupon assesses the position (the position in the horizontal-axis direction) in which the error from the differential waveform $DW_t$ at the current moment is at a minimum, and determines as the offset amount the movement amount in the horizontal-axis direction at the position in which the error from the original position of the differential waveform $DW_{t-1}$ is at a minimum. The first three-dimensional object detection unit 33 then counts the offset amount determined for each of the small areas $DW_{t1}$ to $DW_{tn}$ and forms a histogram.

Figure 7:
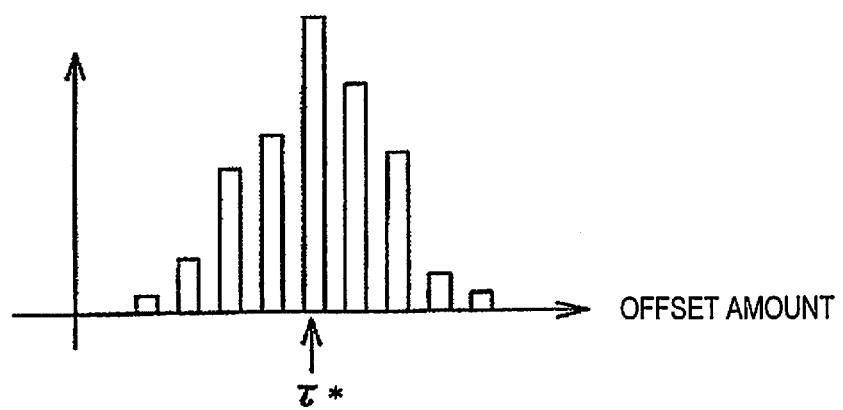
FIG. 7 is a view illustrating an example of the histogram obtained by the first three-dimensional object detection unit of FIG. 3.

FIG. 7 is a view illustrating an example of the histogram obtained by the first three-dimensional object detection unit 33. As illustrated in FIG. 7, some amount of variability occurs in the offset amount, which is the movement amount in which the error between the small areas $DW_{t1}$ to $DW_{tn}$ and the differential waveform $DW_{t-1}$ at a single moment prior is at a minimum. Accordingly, the first three-dimensional object detection unit 33 forms the offset amounts including the variability into a histogram and calculates the travel distance from the histogram. At this point, the first three-dimensional object detection unit 33 calculates the travel distance of the three-dimensional object from the maximum value in the histogram. In other words, in the example illustrated in FIG. 7, the first three-dimensional object detection unit 33 calculates the offset amount indicating the maximum value of the histogram as the travel distance $\tau^*$. The travel distance $\tau^*$ is the relative travel distance of the other vehicle V in relation to the host vehicle V. Accordingly, the first three-dimensional object detection unit 33 calculates the absolute travel distance based on the travel distance $\tau^*$ thus obtained and a signal from the vehicle speed sensor 20 when the absolute travel distance is to be calculated.

Figure 8:
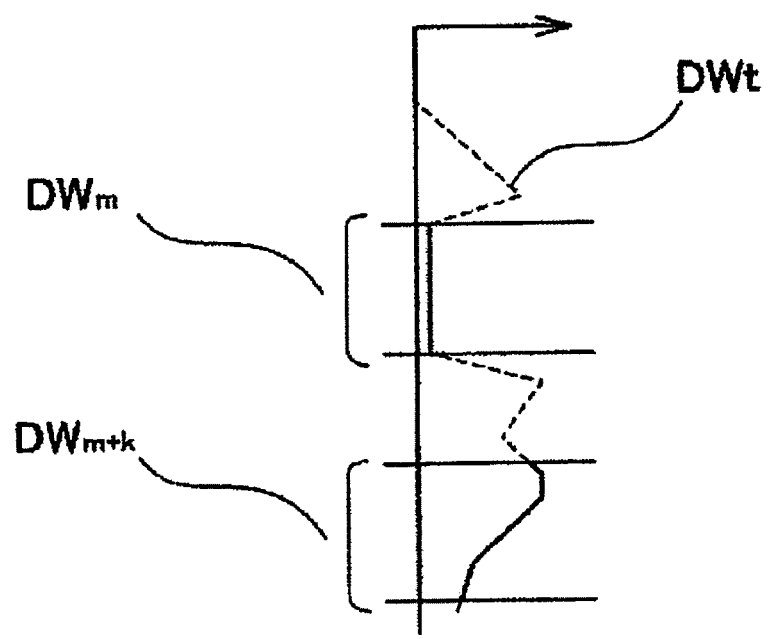
FIG. 8 is a view illustrating the weighting used by the first three-dimensional object detection unit of FIG. 3.

When a histogram is to be formed, the first three-dimensional object detection unit 33 may impart a weighting to each of the plurality of small areas $DW_{t1}$ to $DW_{tn}$, and count the offset amounts determined for each of the small areas $DW_{t1}$ to $DW_{tn}$ in accordance with the weighting to form a histogram. FIG. 8 is a view illustrating the weighting used by the first three-dimensional object detection unit 33.

As illustrated in FIG. 8, a small area $DW_m$ (where m is an integer of 1 or greater and n−1 or less) is flat. In other words, in the small area $DW_m$, there is little difference between the maximal and minimal values of the count of the number of pixels indicating a predetermined difference. The first three-dimensional object detection unit 33 reduces the weighting of this type of small area $DW_m$. This is because the flat small area $DW_m$ lacks a characteristic and there is a high possibility that an error will be magnified when the offset amount is calculated.

On the other hand, a small area $DW_{m+k}$ (where k is an integer of n−m or less) has a great amount of fluctuation. In other words, in the small area $DW_m$, there is considerable difference between the maximal and minimal values of the count of the number of pixels indicating a predetermined difference. The first three-dimensional object detection unit 33 increases the weighting of this type of small area $DW_m$. This is because the small area $DW_{m+k}$ having a large amount of fluctuation is characteristic, and there is a high possibility that the offset amount will be accurately calculated. Weighting in this manner makes it possible to enhance the precision of calculating the travel distance.

The differential waveform $DW_t$ is divided into a plurality of small areas $DW_{t1}$ to $DW_{tn}$ in the present embodiment in order to enhance the precision of calculating the travel distance, but division into the small areas $DW_{t1}$ to $DW_{tn}$ is not required when such high precision of calculating travel distance is not needed. In this case, the first three-dimensional object detection unit 33 calculates the travel distance from the offset amount of the differential waveform $DW_t$ when the error between the differential waveform $DW_t$ and the differential waveform $DW_{t-1}$ is at a minimum. In other words, the method for determining the offset amount between the differential waveform $DW_{t-1}$ at a single moment prior and the differential waveform $DW_t$ at the current moment is not limited to the details described above.

Returning to FIG. 3, the computer 30 is provided with a smear detection unit 34. The smear detection unit 34 detects an area in which a smear is generated from the captured image data obtained by the camera 10. A smear is a white-out phenomenon that is generated by, e.g., CCD image sensors, and therefore the smear detection unit 34 may be omitted when a camera 10 is employed that uses, e.g., a CMOS image sensor that does not generate this type of smear.

Figure 9:
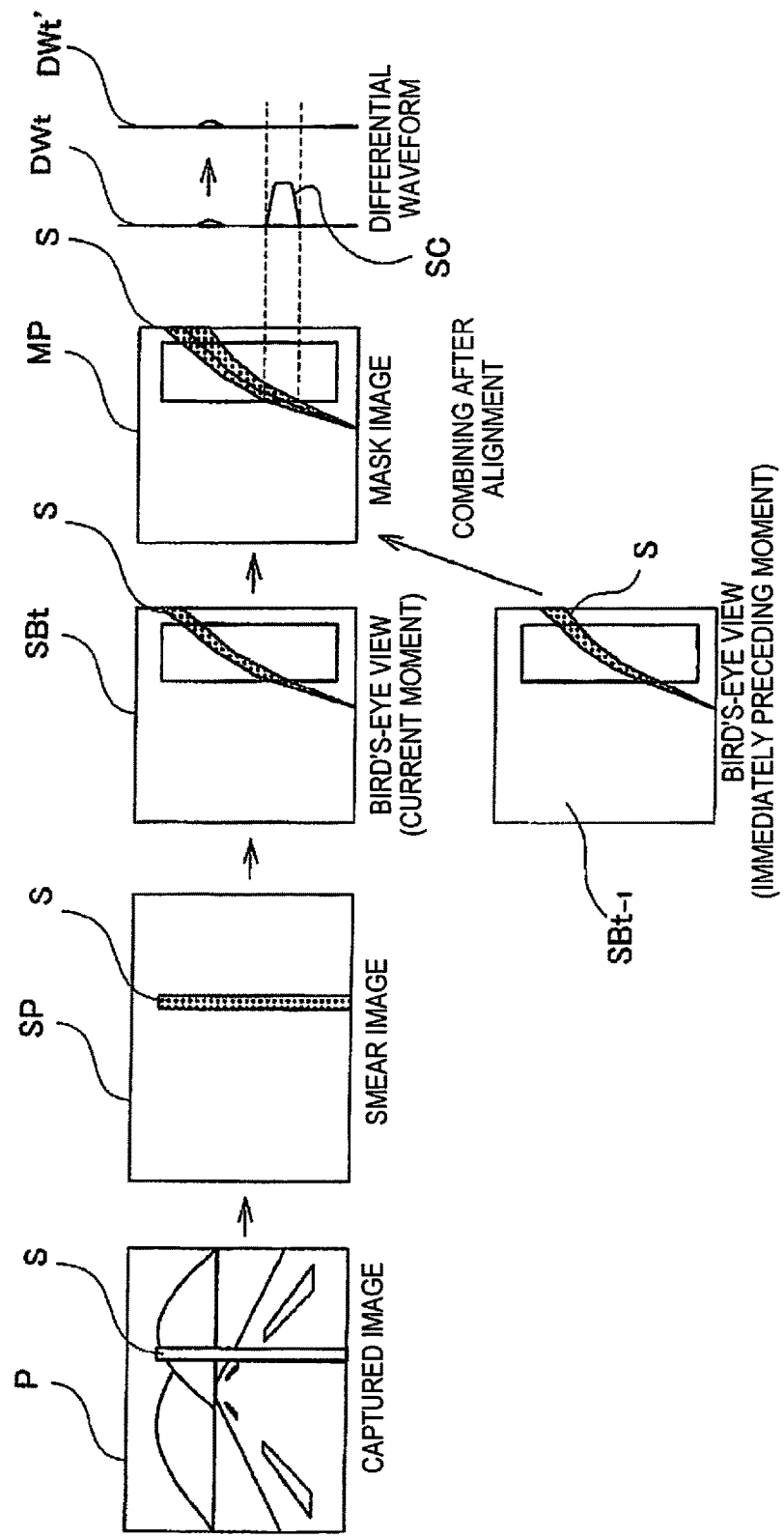
FIG. 9 is a view illustrating the processing of the smear detection unit of FIG. 3 and the differential waveform calculation process performed thereby.

FIG. 9 is a view illustrating the processing of the smear detection unit 34 and the calculation process for the differential waveform $DW_t$ according thereto. First, data from the captured image P in which a smear S is present is input to the smear detection unit 34. At this time, the smear detection unit 34 detects a smear S from the captured image P. There are various methods for detecting a smear S, but with typical CCD (charge-coupled device) cameras, for example, a smear S is generated only downward in an image from a light source. For this reason, in this embodiment, areas are searched for that have a luminance value of at least a predetermined value from below to above in the image, and which continue in the vertical direction. Such areas are specified as smear S generation area.

In addition, the smear detection unit 34 generates smear image SP data in which pixel values for the locations where the smear S is generated are assigned "1", and other locations are assigned "0". After generation, the smear detection unit 34 sends the smear image SP data to the viewpoint conversion unit 31. In addition, the viewpoint conversion unit 31 that has received input of the smear image SP data performs viewpoint conversion on this data to produce a bird's-eye-view state. As a result, the viewpoint conversion unit 31 generates smear bird's-eye-view image $SB_t$ data. After generation, the viewpoint conversion unit 31 sends the smear bird's-eye-view image $SB_t$ data to the alignment unit 32. In addition, the viewpoint conversion unit 31 sends the smear bird's-eye-view image $SB_{t-1}$ data at a single moment prior to the alignment unit 32.

The alignment unit 32 performs data-based alignment of the smear bird's-eye-view images $SB_t$ and $SB_{t-1}$. The specific alignment is similar to the case when alignment of the bird's-eye-view images $PB_t$ and $PB_{t-1}$ is carried out using data. In addition, after alignment, the alignment unit 32 carries out logical addition on the areas in which the smears S of the respective smear bird's-eye-view images $SB_t$ and $SB_{t-1}$ have been generated. As a result, the alignment unit 32 generates mask image MP data. After generation, the alignment unit 32 sends the mask image MP data to the first three-dimensional object detection unit 33.

The first three-dimensional object detection unit 33 zeroes the count of the frequency distribution for the locations corresponding to the areas in which the smears S have been generated in the mask image MP. Specifically, when the differential waveform $DW_t$ has been generated as shown in FIG. 9, the first three-dimensional object detection unit 33 zeroes the count SC in accordance with the smear S, and generates a revised differential waveform $DW_t'$.

The first three-dimensional object detection unit 33 in the present embodiment determines the traveling speed of the vehicle V (camera 10) and determines the offset amount for a stationary object from the determined traveling speed. After the offset amount of the stationary object has been determined, the first three-dimensional object detection unit 33 calculates the travel distance of the three-dimensional object, ignoring the offset amount corresponding to the stationary object among the maximum values of the histogram.

Figure 10:
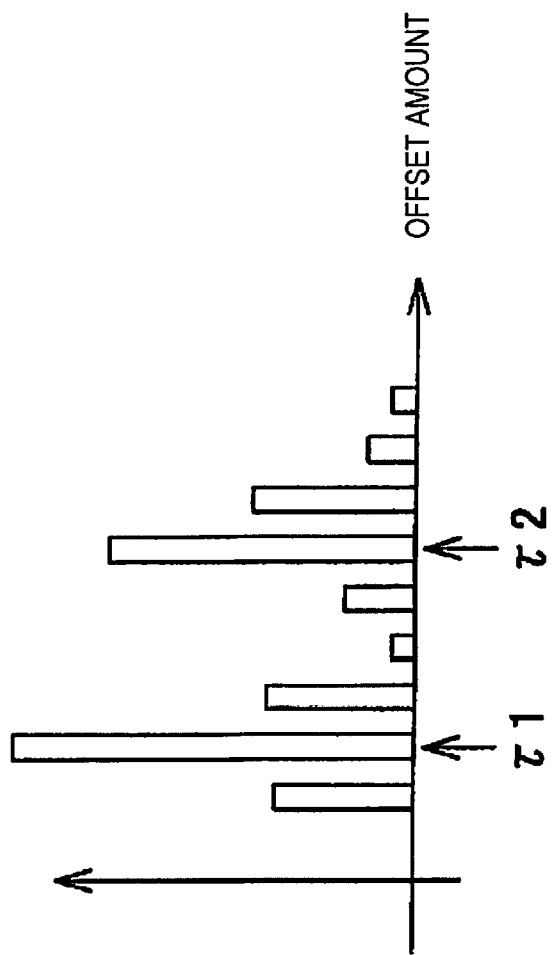
FIG. 10 is a view illustrating another example of the histogram obtained by the first three-dimensional object detection unit of FIG. 3.

FIG. 10 is a view illustrating another example of the histogram obtained by the first three-dimensional object detection unit 33. When a stationary object other than the other vehicle V is present within the view angle of the camera 10, two maximum values τ1, τ2 appear in the resulting histogram. In this case, one of the two maximum values τ1, τ2 is the offset amount of the stationary object. Consequently, the first three-dimensional object detection unit 33 determines the offset amount for the stationary object from the traveling speed, ignores the maximum value that corresponds to the offset amount, and calculates the travel distance of the three-dimensional object using the remaining maximum value.

Even when the offset amount corresponding to the stationary object is ignored, there may be a plurality of other vehicles V present within the view angle of the camera 10 when there is a plurality of maximum values. However, a plurality of other vehicles V present within the detection areas A1, A2 occurs very rarely. Accordingly, the first three-dimensional object detection unit 33 stops calculating the travel distance.

Figure 11:
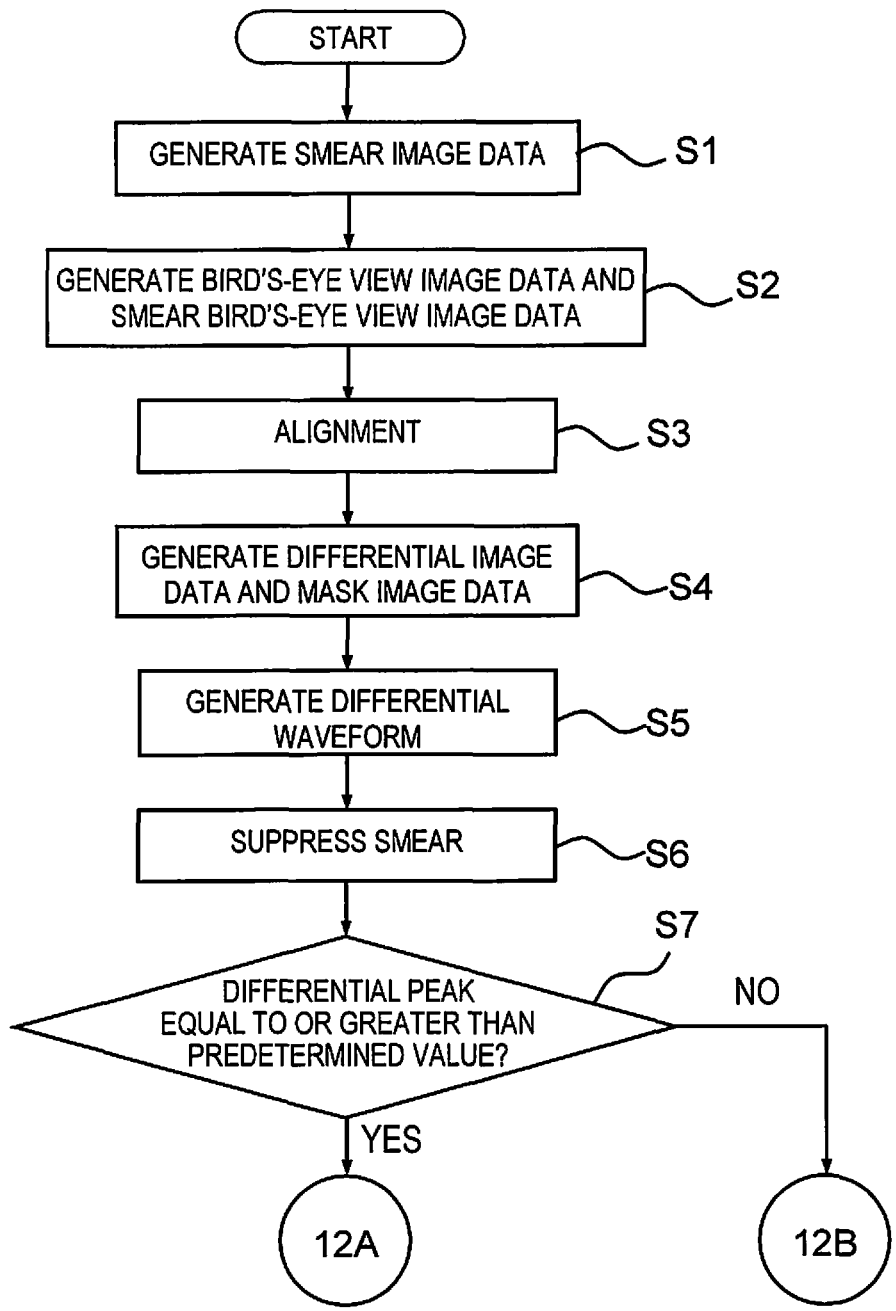
FIG. 11 is a first part of a flowchart illustrating the method for three-dimensional object detection using the differential waveform information actually implemented by the viewpoint conversion unit, the alignment unit, the smear detection unit, and the first three-dimensional object detection unit of FIG. 3.
Figure 12:
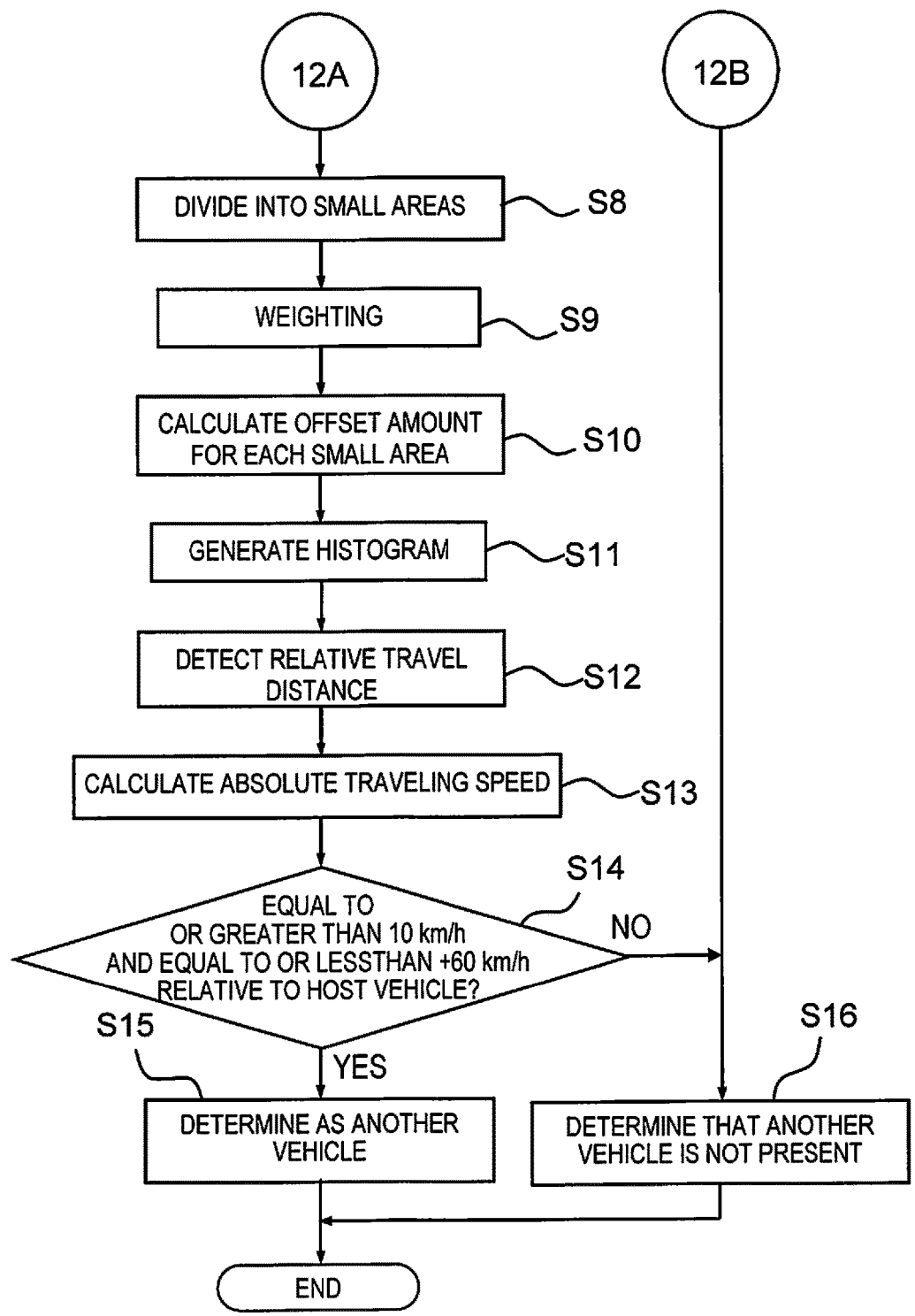
FIG. 12 is a second part of a flowchart illustrating the method for three-dimensional object detection using the differential waveform information actually implemented by the viewpoint conversion unit, the alignment unit, the smear detection unit, and the first three-dimensional object detection unit of FIG. 3.

Described next is the process for detecting a three-dimensional object using differential waveform information. FIGS. 11 and 12 are flowcharts illustrating processes for detecting a three-dimensional object according to the present embodiment. As shown in FIG. 11, first, data of a captured image P is inputted into the computer 30 from the camera 10, and a smear image SP is generated by the smear detection unit 34 (step S1). Next, the viewpoint conversion unit 31 generates bird's-eye-view image $PB_t$ data from the data of the captured image P from the camera 10, and also generates smear bird's-eye-view image $SB_t$ data from the smear image SP data (S2).

The alignment unit 32 then aligns the bird's-eye-view image $PB_t$ data and the bird's-eye-view image $PB_{t-1}$ data at a single moment prior, and also aligns the smear bird's-eye-view image $SB_t$ data and the smear bird's-eye-view image $SB_{t-1}$ data at a single moment prior (S3). After this alignment, the alignment unit 32 generates differential image $PD_t$ data and also generates mask image MP data (S4). Subsequently, the first three-dimensional object detection unit 33 generates the differential waveform $DW_t$ from the differential image $PD_t$ data and the differential image $PD_{t-1}$ data at a single moment prior (S5). After generating the differential waveform $DW_t$, the first three-dimensional object detection unit 33 zeroes the count corresponding to the generation area of the smear S in the differential waveform $DW_t$ and suppresses effects due to the smear S (S6).

Next, the first three-dimensional object detection unit 33 assesses whether the peak of the differential waveform $DW_t$ is equal to or greater than a first threshold value α (S7). This first threshold value α is determined and set as the result, e.g., of prior experimentation, but the value may be set by the three-dimensional object assessment unit 38 illustrated in FIG. 31. When the peak of the differential waveform $DW_t$ is at or above the first threshold value α, specifically, when there is little difference, it is concluded that a three-dimensional object is not present in the captured image P. Therefore, when it has been assessed that the peak of the differential waveform $DW_t$ is not at or above the first threshold value α (S7: No), the first three-dimensional object detection unit 33 assesses that no three-dimensional object is present, and that another vehicle is not present (FIG. 12: S16). The processing shown in FIGS. 11 and 12 is thus ended.

On the other hand, if it is assessed that the peak of the differential waveform $DW_t$ is equal to or greater than the first threshold value α (S7: YES), the first three-dimensional object detection unit 33 assesses that a three-dimensional object is present, and the differential waveform $DW_t$ is divided into the plurality of small areas $DW_{t1}$ to $DW_{tn}$ (S8). Next, the first three-dimensional object detection unit 33 carries out weighting for each small area $DW_{t1}$ to $DW_{tn}$ (S9). Subsequently, the first three-dimensional object detection unit 33 calculates the offset amount of each small area $DW_{t1}$ to $DW_{tn}$ (S10), and generates a histogram taking into account the weightings (S11).

The first three-dimensional object detection unit 33 then calculates the relative travel distance, which is the travel distance of the three-dimensional object with respect to the host vehicle V based on the histogram (S12). Next, the first three-dimensional object detection unit 33 calculates the absolute traveling speed of the three-dimensional object from the relative travel distance (S13). At this time, the first three-dimensional object detection unit 33 takes the time derivative of the relative travel distance to calculate the relative traveling speed, and adds the host vehicle speed detected by the vehicle speed sensor 20 to calculate the absolute traveling speed.

Next, the first three-dimensional object detection unit 33 assesses whether the relative traveling speed of the three-dimensional object is 10 km/h or greater and the relative traveling speed of the three-dimensional object with respect to the host vehicle V is +60 km/h or less (S14). If both are true (S14: YES), then the first three-dimensional object detection unit 33 assesses that the three-dimensional object is another vehicle V (S15). The process illustrated in FIGS. 11 and 12 is then ended. On the other hand, if either is not true (S14: NO), then the first three-dimensional object detection unit 33 assesses that another vehicle is not present (S16). The process illustrated in FIGS. 11 and 12 is then ended.

In this embodiment, the area rearward of the host vehicle V is taken to be detection areas A1, A2, and emphasis is placed on detection of another vehicle VX travelling in an adjacent lane that is adjacent to the lane in which the host vehicle is travelling and to which attention should be paid during travel of the host vehicle V, in particular, on whether or not there is potential for contact when the host vehicle V changes lanes. This is for assessing whether or not there is a potential for contact with another vehicle VX that is travelling in an adjacent lane that is adjacent to the lane in which the host vehicle is travelling, when the host vehicle V changes lanes. For this reason, the process of step S14 is carried out. Specifically, assuming that the system in this embodiment is operating on an expressway, when the speed of the three-dimensional object is less than 10 km/h, for example, then there will rarely be a problem even assuming another vehicle V is present, because the object will be positioned far behind the host vehicle V when lanes are changed. Similarly, when the relative traveling speed of the three-dimensional object relative to the host vehicle V exceeds +60 km/h (specifically, when the three-dimensional object is moving at a speed that is more than 60 km/h greater than the speed of the host vehicle V), then there will rarely be a problem, because the object will have moved to the front of the host vehicle V when lanes are changed. For this reason, in step S14, this is also referred to as assessing another vehicle V that represents a problem when changing lanes.

In addition, in step S14, the following effects result when it is assessed whether the absolute traveling speed of the three-dimensional object is 10 km/h or greater and whether the absolute traveling speed of the three-dimensional object relative to the host vehicle V is +60 km/h or less. For example, there can be cases in which the absolute traveling speed of a stationary object is detected at a few km/h due to errors in attachment of the camera 10. Thus, by assessing whether the speed is 10 km/h or greater, it is possible to decrease the chance that a stationary object will be assessed to be another vehicle V. In addition, it is possible for the relative speed of a three-dimensional object relative to the host vehicle V to be detected at a speed that exceeds +60 km/h due to noise. Thus, assessing whether the relative speed is +60 km/h or less can decrease the chance of erroneous detection due to noise.

In addition, instead of the processing of step S14, it may be assessed that the absolute traveling speed is not negative or 0 km/h. In addition, in this embodiment, because emphasis is placed on whether or not there is potential for contact when the host vehicle V changes lanes, when another vehicle V has been detected in step S15, a warning sound may be emitted to the operator of the host vehicle, or a display corresponding to a warning may be provided using a predetermined display device.

In accordance with the detection procedure for three-dimensional objects using the differential waveform information of this example, the number of pixels exhibiting a predetermined difference in the differential image $PD_t$ data along the direction in which the three-dimensional object collapses in viewpoint conversion is counted and used to produce a frequency distribution, thereby generating a differential waveform $DW_t$. Pixels exhibiting a predetermined difference in the differential image $PD_t$ data refers to pixels for which there has been a change in the images at different points in time, or in other words, locations at which a three-dimensional object is present. For this reason, in locations in which a three-dimensional object is present, the number of pixels along the direction in which the three-dimensional object collapses is counted and used to form a frequency distribution, thereby producing a differential waveform $DW_t$. In particular, because the number of pixels along the direction in which the three-dimensional object collapses is counted, a differential waveform $DW_t$ is generated from the information in the height direction with respect to the three-dimensional object. Next, the travel distance of the three-dimensional object is calculated from the temporal change in the differential waveform $DW_t$ including the information in the height direction. Consequently, in contrast to the focus being solely on the movement of a single point, the detection location prior to the change in time and the detection location after the change in time tend to be the same location on the three-dimensional object by virtue of being specified with the inclusion of information in the height direction. The travel distance is thus calculated from the change in time at the same location, and the precision of calculating the travel distance can be improved.

In addition, the count of the frequency distribution is zeroed at locations corresponding to areas in which a smear S is generated in the differential waveform $DW_t$. As a result, waveform locations in the differential waveform $DW_t$ that are generated by the smear S are removed, making it possible to prevent conditions in which the smear S is erroneously identified as a three-dimensional object.

In addition, the travel distance of the three-dimensional object is calculated from the offset amount of the differential waveform $DW_t$ when the error in the differential waveform $DW_t$ generated at different points in time is at a minimum. This allows the travel distance to be calculated from the offset amount of one-dimensional information as a waveform, which allows computation cost to be kept low when the travel distance is calculated.

Also, the differential waveform $DW_t$ generated at different points in time is divided into a plurality of small areas $DW_{t1}$ to $DW_{tn}$. Dividing the differential waveform into a plurality of small areas $DW_{t1}$ to $DW_{tn}$ allows a plurality of waveforms representing the locations of the three-dimensional object to be obtained. In addition, by determining the offset amount when the respective waveform errors are at minimum for each of the small areas $DW_{t1}$ to $DW_{tn}$, and by counting and creating a histogram of the offset amounts determined for each of the small areas $DW_{t1}$ to $DW_{tn}$, the travel distance of the three-dimensional object is calculated. Therefore, the offset amount for each location of the three-dimensional object is determined, and the travel distance is determined from the plurality of offset amounts, allowing improvement in the calculation precision of the travel distance.

In addition, weightings are applied to each of the plurality of small areas $DW_{t1}$ to $DW_{tn}$, and the offset amounts determined for each of the small areas $DW_{t1}$ to $DW_{tn}$ are counted in accordance with weighting to produce a histogram. To this end, the weightings are increased for characteristic areas, and the weightings are decreased for uncharacteristic areas, thereby allowing more suitable calculation of the travel distance. Consequently, the precision of the travel distance calculation can be further improved.

In addition, the weightings increase with increasing difference between the maximal and minimal count values of the number of pixels exhibiting a predetermined difference in each small area $DW_{t1}$ to $DW_{tn}$ in the differential waveform $DW_t$. Therefore, the weightings are increased for areas with characteristic fluctuations that have a large difference between maximum and minimum values, and the weightings are decreased for flat areas with small fluctuation. Because areas with large amounts of fluctuation allow accurate determination of the offset amount more readily than flat areas from a geometric standpoint, the weightings are increased for areas in which the difference between maximal and minimal values is large, allowing the precision of travel distance calculation to be further improved.

In addition, the travel distance of the three-dimensional object is calculated from the extreme value of the histogram obtained by counting offset amounts determined for each of the small areas $DW_{t1}$ to $DW_{tn}$. Therefore, even if there is some variation in the offset amounts, the travel distance can be calculated with higher accuracy from the maximum value.

In addition, because an offset amount is determined for a stationary object and this offset amount is ignored, it is possible to prevent a situation in which the calculation precision of the travel distance of a three-dimensional object is reduced due to a stationary object. In addition, when there are a plurality of maximum values and the offset amount corresponding to a stationary object is ignored, calculation of the travel distance of the three-dimensional object is halted. Therefore, it is possible to prevent a situation in which an erroneous travel distance is calculated, such as when there is a plurality of maximum values.

In the embodiment described above, the speed of the host vehicle V is determined based on signals from the vehicle speed sensor 20, but embodiments are not restricted thereto, and the speed can be estimated from a plurality of images at different points in time. In this case, a vehicle speed sensor is unnecessary, allowing simplification of the configuration.

In addition, in the embodiment described above, a captured image at the current moment and an image at a single moment prior are converted to bird's-eye views, the converted bird's-eye views are aligned, a differential image $PD_t$ is then generated, and the generated differential image $PD_t$ is evaluated along the collapsing direction (the direction in which the three-dimensional object collapses when the captured image is converted to the bird's-eye view) to generate a differential waveform $DW_t$, but no limitation is imposed thereby. For example, it is also possible to use a configuration in which only the image at a single moment prior is converted to a bird's-eye view, the converted bird's-eye view is aligned, then converted again to a captured image equivalent, a differential image is generated using this image and the image at the current moment, and the generated differential image is evaluated along the direction corresponding to the collapsing direction (i.e., the direction obtained by converting the collapsing direction to a direction in the captured image) to thereby generate the differential waveform $DW_t$. In other words, it is not always necessary to expressly generate a bird's-eye view, as long as the image at the current moment and the image at a single moment prior are aligned, a differential image $PD_t$ is generated from the difference between the aligned images, and the differential image $PD_t$ can be evaluated along the collapsing direction of the three-dimensional object when the differential image $PD_t$ is converted to a bird's-eye view.

In addition, in the embodiment described above, the bird's-eye-view image data $PB_t$ at a current moment and the bird's-eye-view image data $PB_{t-1}$ of a single moment prior (past) are aligned as illustrated in part (b) of FIG. 4, whereupon the differential image $PD_t$ thereof is generated, and the differential image $PD_t$ is evaluated along a direction corresponding to the collapsing direction as shown in FIG. 5, thereby generating a differential waveform $DW_t$. However, the bird's-eye-view image data $PB_t$, $PB_{t-1}$ at the current moment and at a single moment prior may be evaluated along a direction corresponding to the collapsing direction as shown in FIG. 5 to generate respective differential waveforms $DW_t$ for the current moment and a single moment prior, whereupon these two differential waveforms may be aligned as shown in part (b) of FIG. 4, and the final differential waveform information may be generated from the differences between these two differential waveforms.

<<Three-Dimensional Object Detection Using Edge Information>>

Figure 13:
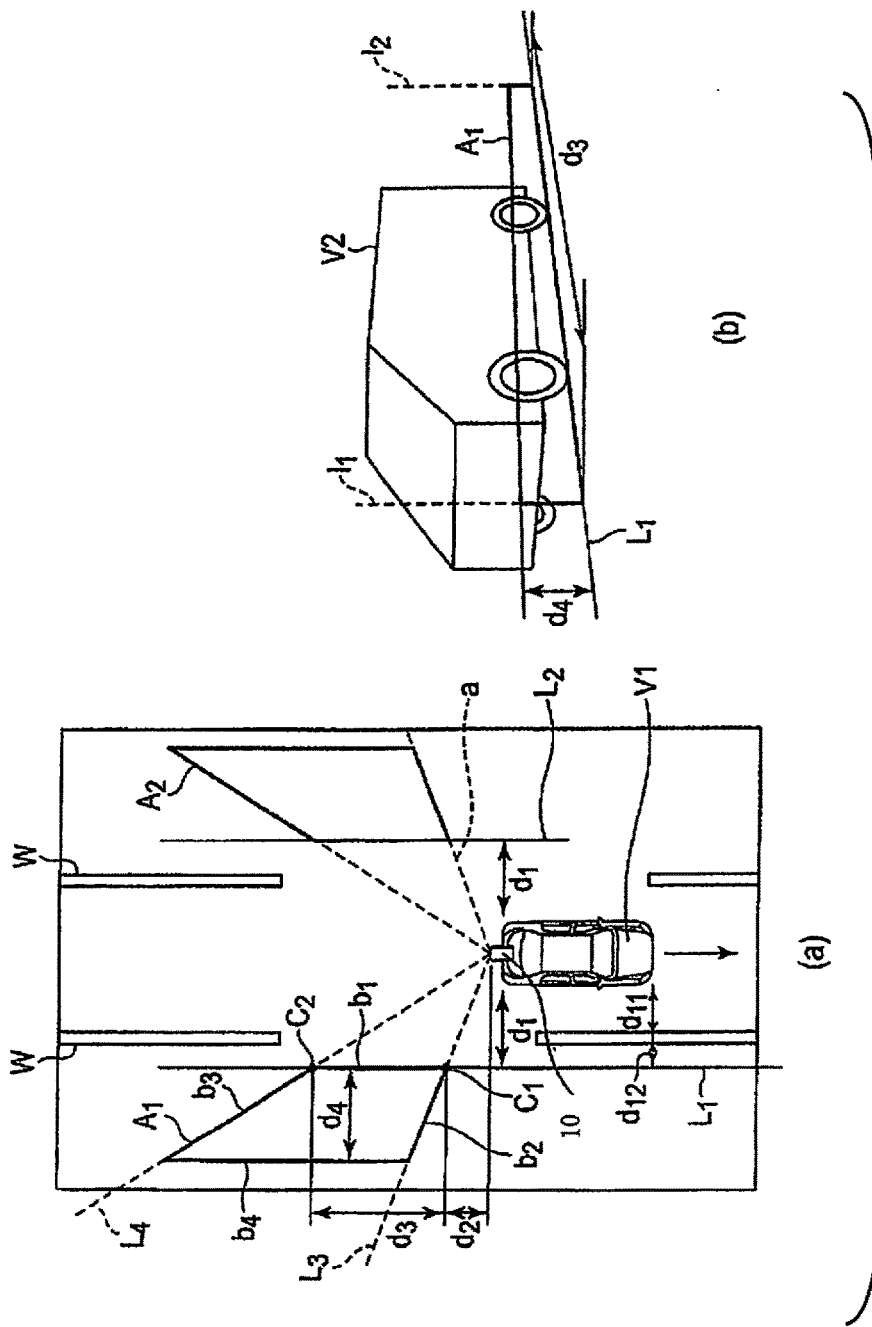
FIG. 13 is a view illustrating the travel state of the vehicle of FIG. 1 (three-dimensional object detection using edge information), with part (a) of FIG. 13 being a plan view illustrating the positional relationship between the detection areas, and part (b) of FIG. 13 being a perspective view illustrating the positional relationship between the detection areas in real space.

Next, there will be described a block B for detecting a three-dimensional object using edge information that can operate instead of the block A for detecting a three-dimensional object using differential waveform information as illustrated in FIG. 3. The block B for detecting a three-dimensional object using edge information of this example involves detection of a three-dimensional object utilizing edge information derived from the viewpoint conversion unit 31, the luminance difference calculation unit 35, the edge line detection unit 36, and the second three-dimensional object detection unit 37. FIG. 13 is a view illustrating the capture range of the camera 10 of FIG. 3. Part (a) of FIG. 13 is a plan view, and part (b) of FIG. 13 is a perspective view in real space in the rearward direction from the host vehicle V1. As shown in part (a) of FIG. 13, the camera 10 has a predetermined view angle a, and the rearward direction from the host vehicle V1 included in this predetermined view angle a is captured. As with the case shown in FIG. 2, the view angle a of the camera 10 is set so that adjacent lanes are included in the capture range of the camera 10 in addition to the lane in which the host vehicle V1 is travelling.

The detection areas A1, A2 in the present example are trapezoidal in a plan view (bird's-eye-view state), and the position, size, and shape of the detection areas A1, A2 are decided based on distances $d_1$ to $d_4$. The detection areas A1, A2 of the example illustrated in the drawing are not limited to being trapezoidal, and may also be rectangular or another shape in a bird's-eye-view state, as illustrated in FIG. 2.

Here, the distance d1 is the distance from the host vehicle V1 to the ground lines L1, L2. The ground lines L1, L2 refer to lines in which a three-dimensional object, which is present in a lane adjacent to the lane in which the host vehicle V1 is traveling, is in contact with the ground. In the present embodiment, the purpose is to detect another vehicle V2 or the like (including two-wheeled vehicles or the like) traveling in the left or right lane behind the host vehicle V1 and adjacent to the lane of the host vehicle V1. Accordingly, the distance d1, which is the distance to the positions of the ground lines L1, L2 of the other vehicle V2, can be decided so as to be substantially fixed, from the distance d11 from the host vehicle V1 to a white line W and the distance d12 from the white line W to the position to which the other vehicle V2 is predicted to travel.

The distance d1 is not limited to being fixedly decided, and may be variable. In this case, the computer 30 identifies the position of the white line W in relation to the host vehicle V1 using white line recognition or another technique, and the distance d11 is decided based on the position of the identified white line W. The distance d1 is thereby variably set using the decided distance d11. In the present embodiment described below, the position in which the other vehicle V2 is travelling (the distance d12 from the white line W) and the position in which the host vehicle V1 is travelling (the distance d11 from the white line W) are decided for the most part, and the distance d1 thus is fixedly decided.

A distance d2 is the distance extending from the rear end part of the host vehicle V1 in the vehicle progress direction. The distance d2 is decided so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle progression direction. The distance d3 is decided based on the size of the three-dimensional object to be detected. In the present embodiment, the object to be detected is another vehicle V2 or the like, and therefore the distance d3 is set to a length that includes another vehicle V2.

The distance d4 indicates the height of the other vehicle V2 in real space, which has been set so as to include the tires, as illustrated in part (b) of FIG. 13. In a bird's-eye-view image, the distance d4 is the length illustrated in part (a) of FIG. 13. The distance d4 may also be a length that does not include lanes further adjacent to the left and right adjacent lanes in the bird's-eye-view image (i.e., "next-next" lanes two lanes away). This is because when the lanes two lanes away from the lane of the host vehicle V1 are included, it is no longer possible to distinguish whether another vehicle V2 is present in the adjacent lanes to the left and right of the lane in which the host vehicle V1 is traveling, or whether another vehicle V2 is present in an "next-next" lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d3. The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V1, as illustrated in part (b) of FIG. 13.

Returning to FIG. 3, the viewpoint conversion unit 31 accepts input of captured image data of a predetermined area captured by the camera 10. The viewpoint conversion unit 31 converts the viewpoint of the inputted captured image data into bird's-eye-view image data, which represents a bird's-eye-view state. A bird's-eye-view state is a state of viewing from the viewpoint of an imaginary camera that is looking down from above, e.g., vertically downward (or slightly inclined downward). Viewpoint conversion can be carried out using the technique described in, e.g., Japanese Laid-Open Patent Application No. 2008-219063.

The luminance difference calculation unit 35 calculates luminance differences in the bird's-eye-view image data, which has undergone viewpoint conversion by the viewpoint conversion unit 31, in order to detect the edges of a three-dimensional object included in the bird's-eye-view image. The luminance difference calculation unit 35 calculates, for each of a plurality of positions along a vertical imaginary line extending along the vertical direction in real space, the luminance difference between two pixels near each position. The luminance difference calculation unit 35 is capable of calculating the luminance difference by a method for setting a single vertical imaginary line extending in the vertical direction in real space, or a method for setting two vertical imaginary lines.

Described below is the specific method for setting two vertical imaginary lines. The luminance difference calculation unit 35 sets a first vertical imaginary line that corresponds to a line segment extending in the vertical direction in real space, and a second vertical imaginary line that is different from the first vertical imaginary line and that corresponds to a line segment extending in the vertical direction in real space, for the bird's-eye-view image that has been subjected to viewpoint conversion. The luminance difference calculation unit 35 determines the luminance difference between a point on the first vertical imaginary line and a point on the second vertical imaginary line in continuous fashion along the first vertical imaginary line and the second vertical imaginary line. The operation of the luminance difference calculation unit 35 is described in detail below.

Figure 14:
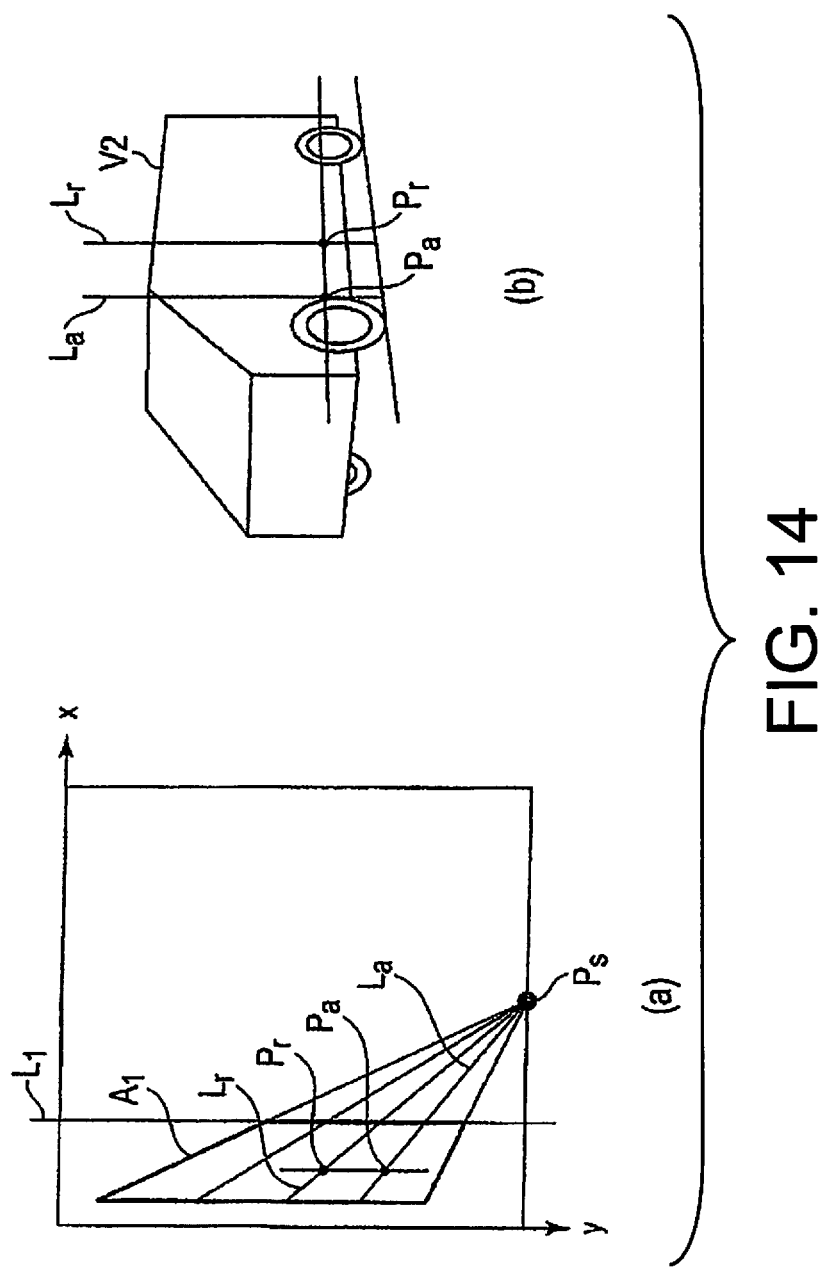
FIG. 14 is a view for describing the operation of the luminance difference calculation unit of FIG. 3, with part (a) of FIG. 14 being a view illustrating the positional relationship between the attention line, reference line, attention point, and reference point in the bird's-eye-view image, and part (b) of FIG. 14 being a view illustrating the positional relationship between the attention line, reference line, attention point, and reference point in real space.

The luminance difference calculation unit 35 sets a first vertical imaginary line La (hereinbelow referred to as attention line La) that corresponds to a line segment extending in the vertical direction in real space and that passes through the detection area A1, as illustrated in part (a) of FIG. 14. The luminance difference calculation unit 35 sets a second vertical imaginary line Lr (hereinbelow referred to as reference line Lr) that is different from the attention line La, corresponds to a line segment extending in the vertical direction in real space, and passes through the detection area A1. Here, the reference line Lr is set to a position at a distance from the attention line La by a predetermined distance in real space. The lines that correspond to the line segments extending in the vertical direction in real space are lines that spread out in a radial fashion from the position Ps of the camera 10 in a bird's-eye-view image. These lines spreading out in a radial fashion are lines that follow the collapsing direction of the three-dimensional object when converted to a bird's-eye view.

The luminance difference calculation unit 35 sets an attention point Pa on the attention line La (a point on the first vertical imaginary line). The luminance difference calculation unit 35 sets a reference point Pr on the reference line Lr (a point on the second vertical imaginary line). The attention line La, the attention point Pa, the reference line Lr, and the reference point Pr have the relationship in real space illustrated in part (b) of FIG. 14. It is apparent from part (b) of FIG. 14 that the attention line La and the reference line Lr are lines extending in the vertical direction in real space, and that the attention point Pa and the reference point Pr are points set to substantially the same height in real space. The attention point Pa and the reference point Pr are not necessarily required to be rigorously kept at the same height, and a certain amount of error that still allows for the attention point Pa and the reference point Pr to be deemed to be at the same height is allowed.

The luminance difference calculation unit 35 determines the luminance difference between the attention point Pa and the reference point Pr. If the luminance difference between the attention point Pa and the reference point Pr is great, it is possible that an edge is present between the attention point Pa and the reference point Pr. Accordingly, the edge line detection unit 36 illustrated in FIG. 3 detects an edge line based on the luminance difference between the attention point Pa and the reference point Pr.

Figure 15:
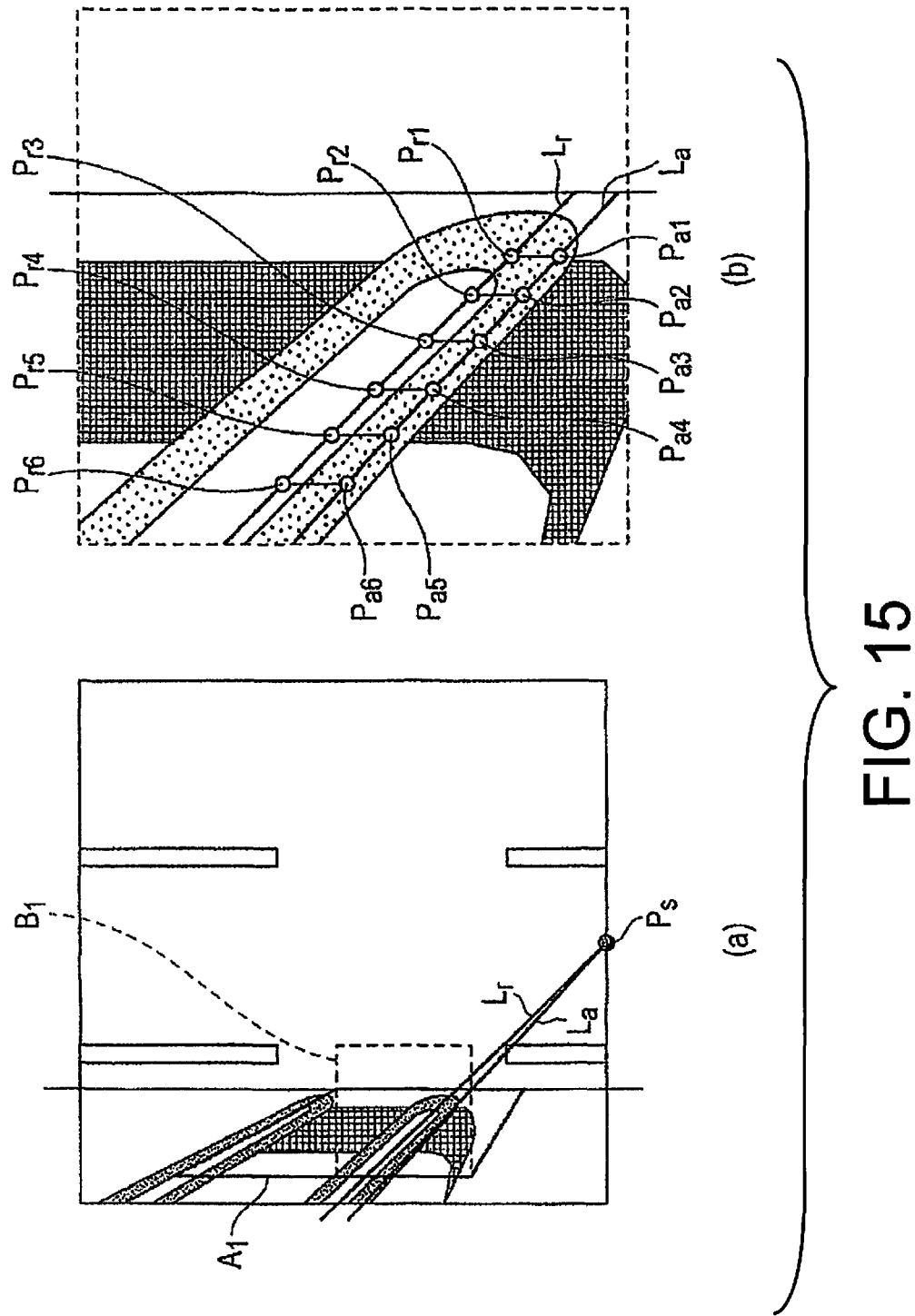
FIG. 15 is a view for describing the detailed operation of the luminance difference calculation unit of FIG. 3, with part (a) of FIG. 15 being a view illustrating the detection area in the bird's-eye-view image, and part (b) of FIG. 15 being a view illustrating the positional relationship between the attention line, reference line, attention point, and reference point in the bird's-eye-view image.

This point will be described in greater detail. FIG. 15 is a view for describing the detailed operation of the luminance difference calculation unit 35. Part (a) of FIG. 15 illustrates a bird's-eye-view image of the bird's-eye-view state, and part (b) of FIG. 15 is an enlarged view of a part B1 of the bird's-eye-view image illustrated in part (a) of FIG. 15. In FIG. 15, only the detection area A1 is illustrated and described, but the luminance difference is calculated using the same procedure for detection area A2.

When the other vehicle V2 is being depicted in the captured image captured by the camera 10, the other vehicle V2 appears in the detection area A1 in the bird's-eye-view image, as illustrated in part (a) of FIG. 15. The attention line La is set on a rubber portion of a tire of the other vehicle V2 in the bird's-eye-view image in part (b) of FIG. 15, as illustrated in the enlarged view of area B1 in part (a) of FIG. 15. In this state, first, the luminance difference calculation unit 35 sets the reference line Lr. The reference line Lr is set along the vertical direction in a position set at a predetermined distance in real space from the attention line La. Specifically, in the three-dimensional object detection device 1 according to the present embodiment, the reference line Lr is set in a position at a distance of 10 cm away in real space from the attention line La. The reference line Lr is thereby set on the wheel of the tire of the other vehicle V2, e.g., at a distance that corresponds to 10 cm from the rubber of the tire of the other vehicle V2 in the bird's-eye-view image.

Next, the luminance difference calculation unit 35 sets a plurality of attention points Pa1 to PaN on the attention line La. In part (b) of FIG. 15, six attention points Pa1 to Pa6 (hereinbelow simply referred to as attention point Pai when indicating an arbitrary point) are set for convenience of description. An arbitrary number of attention points Pa may be set on the attention line La. In the description below, N attention points Pa are set on the attention line La.

The luminance difference calculation unit 35 subsequently sets the reference points Pr1 to PrN so as to have the same height as the attention points Pa1 to PaN in real space. The luminance difference calculation unit 35 calculates the luminance difference between attention point Pa and reference point Pr pairs at the same height. The luminance difference calculation unit 35 thereby calculates the luminance difference between two pixels for each of the plurality of positions (1–N) along the vertical imaginary line extending in the vertical direction in real space. The luminance difference calculation unit 35 calculates the luminance difference between, e.g., the first attention point Pa1 and the first reference point Pr1, and calculates the luminance difference between the second attention point Pa2 and the second reference point Pr2. The luminance difference calculation unit 35 thereby determines the luminance difference in continuous fashion along the attention line La and the reference line Lr. In other words, the luminance difference calculation unit 35 sequentially determines the luminance difference between the third to $N^{th}$ attention points Pa3 to PaN and the third to $N^{th}$ reference points Pr3 to PrN.

The luminance difference calculation unit 35 repeats the process of setting the above-described reference line Lr, setting the attention point Pa, setting the reference point Pr, and calculating the luminance difference while shifting the attention line La within the detection area A1. In other words, the luminance difference calculation unit 35 repeatedly executes the above-described process while changing the positions of the attention line La and the reference line Lr by the same distance in real space along the direction in which the ground line L1 extends. The luminance difference calculation unit 35, e.g., sets the line that was the reference line Lr in the previous process to be the attention line La, sets the reference line Lr in relation to the attention line La, and sequentially determines the luminance difference.

Returning to FIG. 3, the edge line detection unit 36 detects the edge line from the continuous luminance difference calculated by the luminance difference calculation unit 35. For example, in the case illustrated in part (b) of FIG. 15, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 36 is capable of detecting that an edge line is present between the second to sixth attention points Pa2 to Pa6 and the second to sixth reference points Pr2 to Pr6 where the luminance difference is great.

Specifically, when an edge line is to be detected, the edge line detection unit 36 first assigns an attribute to the $i^{th}$ attention point Pai from the luminance difference between the $i^{th}$ attention point Pai (coordinates (xi, yi)) and the $i^{th}$ reference point Pri (coordinates (xi', yi')) in accordance with formula 1 noted below.

When $I(xi,yi) > I(xi',yi')+t$, $s(xi,yi)=1$;

when $I(xi,yi) < I(xi',yi')-t$, $s(xi,yi)=-1$;

otherwise, $s(xi,yi)=0$.      Formula 1

In formula 1 above, t represents a threshold value, I(xi, yi) represents the luminance value of the $i^{th}$ attention point Pai, and I(xi', yi') represents the luminance value of the $i^{th}$ reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above.

Next, the edge line detection unit 36 assesses whether the attention line La is an edge line from the continuity c(xi, yi) of the attribute s along the attention line La based on the following formula 2.

When $s(xi,yi)=s(xi+1,yi+1)$ (excluding when 0=0), $c(xi,yi)=1$;

otherwise, $c(xi,yi)=0$.      Formula 2

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 36 determines the sum of the continuities c of all the attention points Pa on the attention line La. The edge line detection unit 36 divides the sum of the continuities c thus determined by the number N of attention points Pa to thereby normalize the continuity c. The edge line detection unit 36 assesses the attention line La to be an edge line when the normalized value has exceeded a threshold value θ. The threshold value θ is set in advance, e.g., by experimentation.

In other words, the edge line detection unit 36 assesses whether the attention line La is an edge line based on formula 3 noted below. The edge line detection unit 36 then assesses whether all of the attention lines La drawn on the detection area A1 are edge lines.

$\Sigma c(xi,yi)/N > \theta$      Formula 3

Returning to FIG. 3, the second three-dimensional object detection unit 37 detects a three-dimensional object based on the amount of edge lines detected by the edge line detection unit 36. As described above, the three-dimensional object detection device 1 according to the present embodiment detects an edge line extending in the vertical direction in real space. Detecting many edge lines extending in the vertical direction indicates that there is a high possibility that a three-dimensional object is present in the detection areas A1, A2. Accordingly, the second three-dimensional object detection unit 37 detects a three-dimensional object based on the amount of edge lines detected by the edge line detection unit 36. Moreover, the second three-dimensional object detection unit 37 determines whether the edge lines detected by the edge line detection unit 36 are true edge lines prior to detecting the three-dimensional object. The second three-dimensional object detection unit 37 assesses whether, on an edge line, a change in luminance along the edge line of the bird's-eye-view image is greater than a predetermined threshold value. When the change in luminance on the edge lines in the bird's-eye-view image is greater than the threshold value, the edge lines are determined to have been detected by errant assessment. On the other hand, when the change in luminance on the edge lines in the bird's-eye-view image is not greater than the threshold value, it is assessed that the edge lines are correct. The threshold value is set in advance, e.g., by experimentation.

Figure 16:
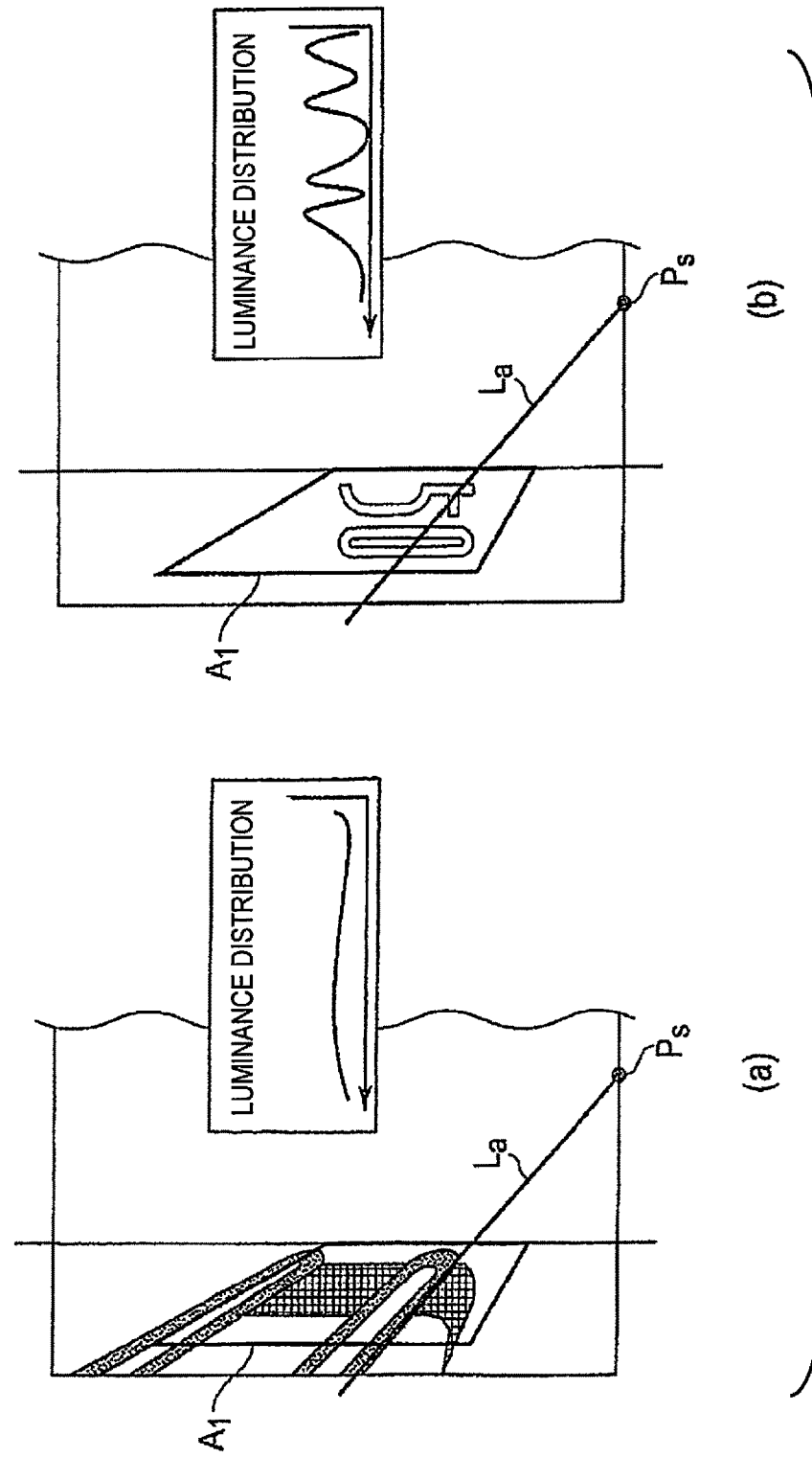
FIG. 16 is a view illustrating the edge line and luminance distribution on the edge line, with part (a) of FIG. 16 being a view illustrating the luminance distribution for a case in which a three-dimensional object (vehicle) is present in the detection area, and part (b) of FIG. 16 being a view illustrating the luminance distribution for a case in which a three-dimensional object is not present in the detection area.

FIG. 16 is a view illustrating the luminance distribution on the edge line. Part (a) of FIG. 16 illustrates the edge line and the luminance distribution when another vehicle V2 as a three-dimensional object is present in the detection area A1, and part (b) of FIG. 16 illustrates the edge line and the luminance distribution when a three-dimensional object is not present in the detection area A1.

As illustrated in part (a) of FIG. 16, it is assumed that it has been determined that the attention line La set on the tire rubber portion of the other vehicle V2 in the bird's-eye-view image is an edge line. In this case, the change in luminance on the attention line La in the bird's-eye-view image is gradual. This is due to the image captured by the camera 10 being converted in viewpoint to a bird's-eye-view image, whereby the tire of the other vehicle V2 is stretched within the bird's-eye-view image. On the other hand, the attention line La set in the white character portion "50" drawn on the road surface in the bird's-eye-view image is assumed to have been errantly assessed to be an edge line, as illustrated in part (b) of FIG. 16. In this case, the change in luminance on the attention line La in the bird's-eye-view image has a large amount of fluctuation. This is because, on the edge line, the road and other portions of low luminance are mixed with the portions of high luminance in the white characters.

The second three-dimensional object detection unit 37 assesses whether an edge line has been detected by errant assessment based on differences in the luminance distribution on the attention line La as described above. The second three-dimensional object detection unit 37 determines that the edge line has been detected by errant assessment when the change in luminance along the edge line is greater than a predetermined threshold value. The edge line is thus not to be used for detecting a three-dimensional object. A reduction in precision of detecting a three-dimensional object is thereby suppressed when white characters such as "50" on the road surface, roadside vegetation, and the like are assessed to be edge lines.

Specifically, the second three-dimensional object detection unit 37 calculates the change in luminance of the edge line using formula 4 or 5 noted below. The change in luminance of the edge line corresponds to the evaluation value in real space in the vertical direction. Formula 4 evaluates the luminance distribution using the total value of the square of the difference between the $i^{th}$ luminance value $I(xi, yi)$ and the adjacent $i^{th}+1$ luminance value $I(xi+1, yi+1)$ on the attention line La. Formula 5 evaluates the luminance distribution using the total value of the absolute value of the difference between the $i^{th}$ luminance value $I(xi, yi)$ and the adjacent $i^{th}+1$ luminance value $I(xi+1, yi+1)$ on the attention line La.

Evaluation value in vertical equivalent direction=$\Sigma$ $[\{I(xi,yi)-I(xi+1,yi+1)\}^2]$     Formula 4

Evaluation value in vertical equivalent direction=$\Sigma|I(xi,yi)-I(xi+1,yi+1)|$     Formula 5

No limitation is imposed in the use of formula 5, and it is also possible to binarize an attribute b of an adjacent luminance value using a threshold value t2, and then sum the binarized attribute b for all of the attention points Pa, as in formula 6 noted below.

Evaluation value in vertical equivalent direction=$\Sigma b(xi,yi)$ where $b(xi,yi)=1$ when $|I(xi,yi)-I(xi+1,yi+1)|>t2$ and $b(xi,yi)=0$     Formula 6 otherwise.

The attribute b(xi, yi) of the attention point Pa(xi, yi) is '1' when the absolute value of the luminance difference between the luminance value of the attention point Pai and the luminance value of the reference point Pri is greater than the threshold value t2. When the above relationship does not hold true, the attribute b(xi, yi) of the attention point Pai is '0.' The threshold value t2 is set in advance, e.g., by experimentation, so that the attention line La is not assessed to be on the same three-dimensional object. The second three-dimensional object detection unit 37 then sums the attribute b for all of the attention points Pa on the attention line La and determines the evaluation value in the vertical equivalent direction to assess whether the edge line is correct.

Figure 17:
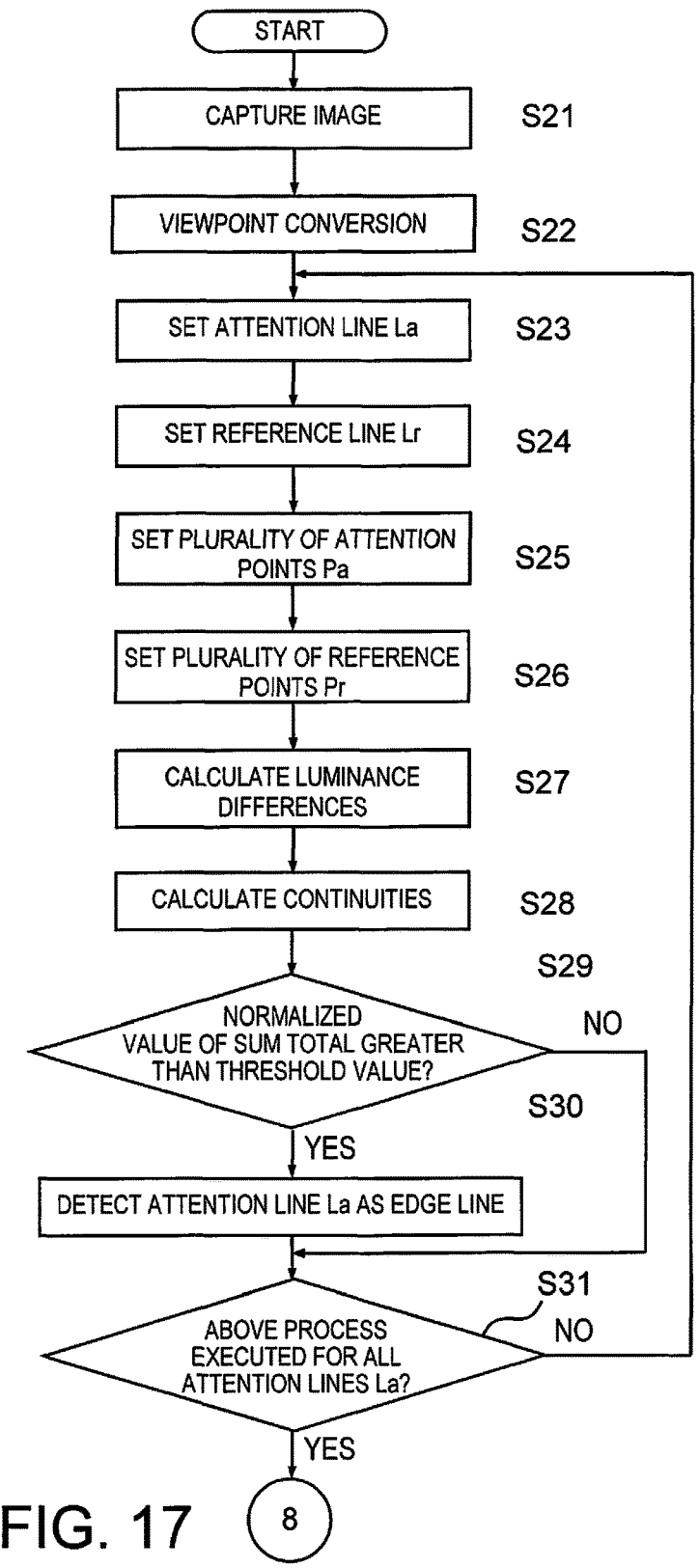
FIG. 17 is a first part of a flowchart illustrating the three-dimensional object detection method using edge information carried out by the viewpoint conversion unit, the luminance difference calculation unit, the edge line detection unit, and the second three-dimensional object detection unit of FIG. 3.
Figure 18:
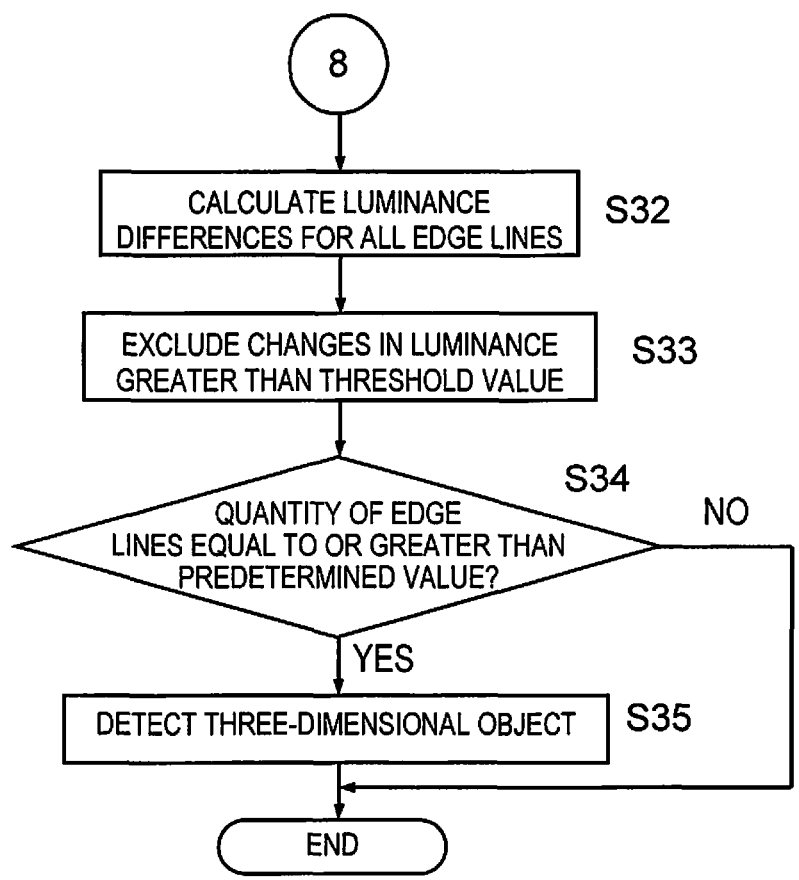
FIG. 18 is a second part of a flowchart illustrating the three-dimensional object detection method using the edge information carried out by the viewpoint conversion unit, the luminance difference calculation unit, the edge line detection unit, and the second three-dimensional object detection unit of FIG. 3.

Next, the method for detecting a three-dimensional object using the edge information in this embodiment will be described. FIGS. 17 and 18 are flow charts illustrating the details of the method for detecting the three-dimensional object in this embodiment. In FIGS. 17 and 18, the process involved with detection area A1 will be described for the sake of convenience, but the same process is executed for the detection area A2 as well.

First, in step S21, a predetermined area specified by the view angle a and the attachment position is captured by the camera 10, as shown in FIG. 17. Next, the viewpoint conversion unit 31 receives input of the captured image data captured by the camera 10 in step S21, and, in step S22, converts the viewpoint and generates bird's-eye-view image data.

Next, in step S23, the luminance difference calculation unit 35 sets the attention line La on the detection area A1. At this time, the luminance difference calculation unit 35 sets a line corresponding to a line extending in the vertical direction in real space as the attention line La. Next, in step S24, the luminance difference calculation unit 35 sets the reference line Lr on the detection area A1. At this time, the luminance difference calculation unit 35 sets, as the reference line Lr, a line that corresponds to a line segment extending in the vertical direction in real space, and that also is separated by a predetermined distance in real space from the attention line La.

Next, in step S25, the luminance difference calculation unit 35 sets a plurality of attention points Pa on the attention line La. At this time, the luminance difference calculation unit 35 sets attention points Pa in an amount that will not cause problems during edge detection by the edge line detection unit 36. In addition, in step S26, the luminance difference calculation unit 35 sets reference points Pr so that the attention points Pa and the reference points Pr are at substantially the same height in real space. The attention points Pa and the reference points Pr thereby line up in substantially the horizontal direction, and the edge line extending in the vertical direction in real space is more readily detected.

Next, in step S27, the luminance difference calculation unit 35 calculates the luminance difference between the attention points Pa and the reference points Pr at the same height in real space. The edge line detection unit 36 calculates the attribute s of the attention points Pa in accordance with formula 1 described above. In step S28, the edge line detection unit 36 then calculates the continuity c of the attribute s of the attention points Pa in accordance with formula 2 described above. In step S29, the edge line detection unit 36 furthermore determines whether a value obtained by normalizing the sum of the continuities c is greater than a threshold value $\theta$, in accordance with formula 3. When it has been determined that the normalized value is greater than the threshold value $\theta$ (S29: Yes), the edge line detection unit 36 detects the attention line La as an edge line in step S30. The process then proceeds to step S31. When it has been determined that the normalized value is not greater than the threshold value $\theta$ (S29: No), the edge line detection unit 36 does not detect the attention line La as an edge line, and the process proceeds to step S31. Although this threshold value $\theta$ can be set in advance, it may also be varied in accordance with the control instructions from the controller 39.

In step S31, the computer 30 determines whether the processes of steps S23 to S30 have been executed for all the attention lines La that can be set on the detection area A1. When it has been determined that the above processes have not been carried out for all the attention lines La (S31: No), the process returns to step S23, sets a new attention line La, and repeats the process through step S31. On the other hand, when it has been determined that the processes have been carried out for all the attention lines La (S31: Yes), the process proceeds to step S32 of FIG. 18.

In step S32 of FIG. 18, the second three-dimensional object detection unit 37 calculates the change in luminance along the edge line for each edge line detected in step S30 of FIG. 17. The second three-dimensional object detection unit 37 calculates the change in luminance of edge lines in accordance with any of formulas 4, 5, and 6. Next, in step S33, the second three-dimensional object detection unit 37 excludes, from among the edge lines, edge lines in which the change in luminance is greater than a predetermined threshold value. In other words, when an edge line having a large change in luminance is not determined to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value is determined in advance, e.g., by experimentation, and is set based on the change in luminance that occurs due to characters on the road surface, roadside vegetation, and the like.

Next, in step S34, the second three-dimensional object detection unit 37 determines whether the amount of edge lines is a second threshold value $\beta$ or higher. Here, the second threshold value $\beta$ is set in advance as determined, e.g., by experimentation. For example, when a four-wheeled vehicle is set as the three-dimensional object that is to be detected, the second threshold value $\beta$ is set based on the number of edge lines of a four-wheeled vehicle appearing in the detection area A1 by, e.g., prior experimentation. When it has been determined that the amount of edge lines is at the second threshold value $\beta$ or greater (S34: Yes), in step S35, the second three-dimensional object detection unit 37 detects the presence of the three-dimensional object in the detection area A1. On the other hand, when it is determined that the amount of edge lines is not at the second threshold value $\beta$ or higher (S34: No), the second three-dimensional object detection unit 37 assesses that a three-dimensional object is not present in the detection area A1. The processing illustrated in FIGS. 17 and 18 then ends. The detected three-dimensional object may be assessed to be another vehicle VX that is travelling in an adjacent lane that is adjacent to the lane in which the host vehicle V is travelling, or may be assessed as to whether the detected three-dimensional object is another vehicle VX that is travelling in an adjacent lane with consideration of the relative speed of the detected three-dimensional object with respect to the host vehicle V. The second threshold value $\beta$ may be set in advance as described above or may vary in accordance with control instructions from the controller 39 illustrated in FIG. 31.

As described above, the three-dimensional object present in the detection areas A1, A2 is detected by the three-dimensional object detection method utilizing the edge information of the present embodiment. Therefore, a vertical imaginary line is set as a line segment that extends in the vertical direction in real space with respect to the bird's-eye-view image. Then, the luminance difference between two pixels near each position is calculated for each of a plurality of positions along the vertical imaginary line, and the presence of a three-dimensional object can be determined based on the continuity between the luminance differences.

Specifically, the attention line La corresponding to the line segment extending in the vertical direction in real space and the reference line Lr that is different from the attention line La are set for the detection areas A1, A2 in the bird's-eye-view image. Next, the luminance difference between the attention point Pa on the attention line La and the reference point Pr on the reference line Lr is continuously determined along the attention line La and the reference line Lr. By continuously determining the luminance difference of the points in this manner, the luminance difference between the attention line La and the reference line Lr is determined. When the luminance difference between the attention line La and the reference line Lr is high, it is highly probable that there is an edge of a three-dimensional object at the set location of the attention line La. It is thereby possible to detect a three-dimensional object based on continuous luminance difference. In particular, because luminance comparison is carried out on vertical imaginary lines extending in the vertical direction in real space, detection processing of the three-dimensional object will not be affected even if the three-dimensional object is stretched along its height from the road surface as a result of conversion to a bird's-eye-view image. Therefore, the detection precision for three-dimensional objects is improved by the method of this example.

In this example, the luminance difference at two points of substantially the same height near a vertical imaginary line is determined. Specifically, the luminance difference between an attention point Pa on an attention line La and a reference point Pr on a reference line Lr is determined at substantially the same height in real space, and thus it is possible to clearly detect the difference in luminance when an edge that extends in the vertical direction is present.

Figure 19:
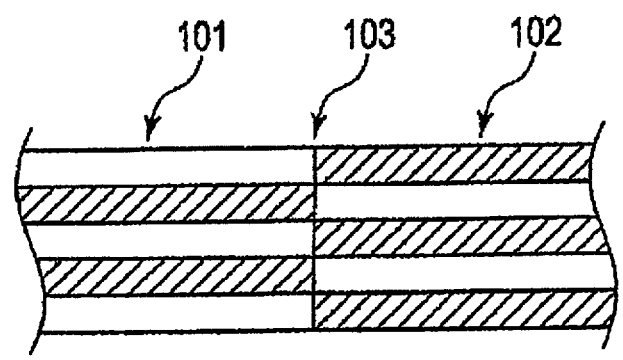
FIG. 19 is a view illustrating an image example for describing the edge detection operation.

In addition, in this example, an attribute is assigned to the attention point Pa based on the luminance difference between the attention point Pa on the attention line La and the reference point Pr on the reference line Lr, and it is determined whether the attention line La is an edge line based on the continuity c of the attributes along the attention line La. Therefore, the boundaries between areas having high luminance and areas having low luminance are detected as edge lines, and edges can be detected in accordance with natural human perception. The results of the above will be described in detail. FIG. 19 is a view illustrating an image example for describing the processing of the edge line detection unit 36. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high, and areas of the second stripe pattern 102 in which the luminance is low are adjacent to each other, and areas of the first stripe pattern 101 in which the luminance is low, and areas of the second stripe pattern 102 in which the luminance is high are adjacent to each other. A location 103 positioned on the boundary between the first stripe pattern 101 and the second stripe pattern 102 tends not to be perceived as an edge by human perception.

In contrast, because an area of low luminance and an area of high luminance are adjacent to each other, the location 103 is identified as an edge when edges are detected only by luminance difference. However, the edge line detection unit 36 determines the location 103 to be an edge line only when there is continuity in the attributes of the luminance difference, in addition to the luminance difference at the location 103. Therefore, the edge line detection unit 36 is capable of suppressing errant determination in which the location 103, which is not identified as an edge line by human perception, is identified as an edge line, and edges can be detected in accordance with human perception.

In addition, in this example, assessment that an edge line has been detected by errant determination is made when the change in luminance of an edge line detected by the edge line detection unit 36 is greater than a predetermined threshold value. When the captured image obtained by the camera 10 is converted to a bird's-eye-view image, the three-dimensional objects included in the captured image tend to appear stretched in the bird's-eye-view image. For example, as described above, when the tire of another vehicle V2 is enlarged, changes in the luminance of the bird's-eye-view image in the stretching direction tend to be small because the tire as a single location is stretched. In contrast, when a character or the like drawn on the road surface has been errantly determined to be an edge line, areas such as the character portion having high luminance and areas such as the road surface portion having low luminance are included in the bird's-eye-view image in an intermixed fashion. In such a case, changes in luminance in the stretching direction tend to be greater in the bird's-eye-view image. Accordingly, by assessing the change in luminance in the bird's-eye-view image along the edge lines as in this example, it is possible to identify edge lines that have been detected by erroneous determination, thereby increasing the detection precision for three-dimensional objects.

Final Assessment of a Three-Dimensional Object

Returning to FIG. 3, in detecting a three-dimensional object by the two three-dimensional object detection units 33, 37 described above, the three-dimensional object detection device 1 of this example has a three-dimensional object assessment unit 38 for making the final assessment as to whether there is a three-dimensional object based on the detection results of the first three-dimensional object detection unit 33 and the detection results of the second three-dimensional object detection unit 37, and a controller 39 for operating a water droplet removal device 41 depending on whether water drops are attached to the lens as detected by the water droplet detection unit 40.

Figure 24A:
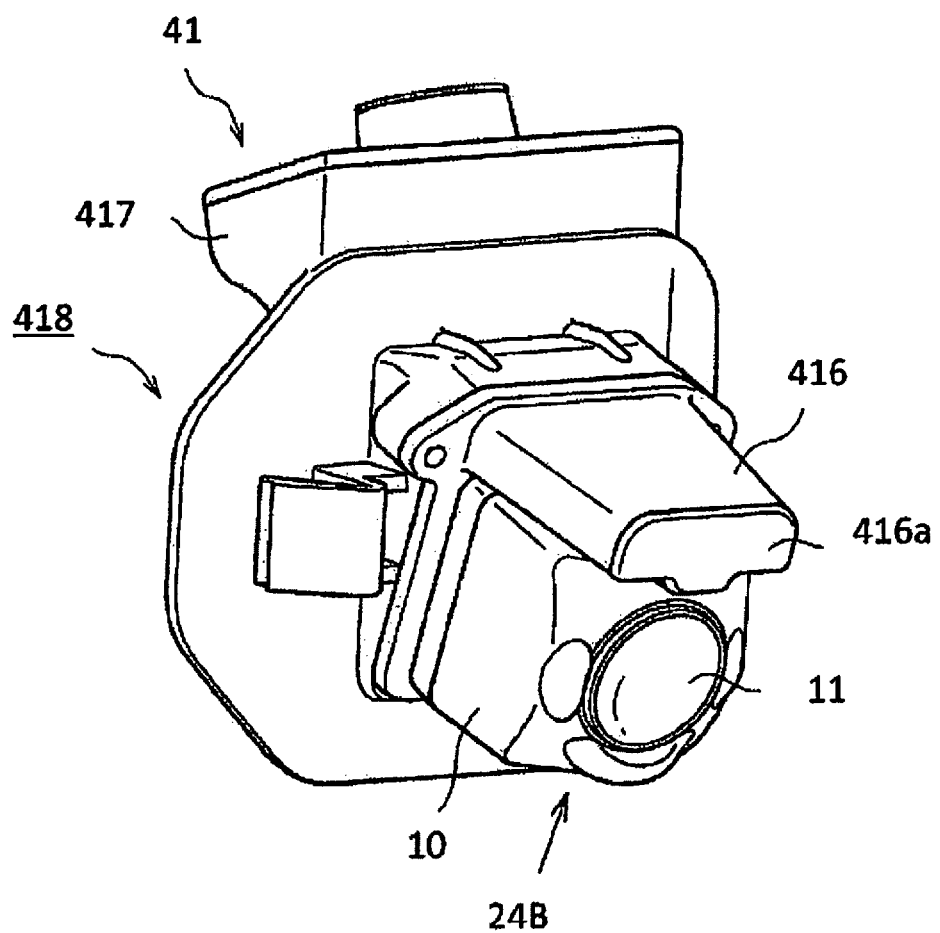
FIG. 24A is a perspective view illustrating the camera and water droplet removal device of FIG. 3.

An example of the water droplet detection method carried out by the water droplet detection unit 40 will be described first. FIG. 24A is a perspective view illustrating the camera 10 which is the image capturing means, as viewed from the left and rear of the vehicle. As described above, the lens 11 (or capture filter) that constitutes an optical capture system is included in the camera 10, but by mounting the camera on the outside of the vehicle, water droplets that are thrown up from the road surface or rain droplets often attach to the lens 11 which is the outer surface of the camera 10. When the surrounding environment is bright, e.g., during the day, water droplet border edges are not readily extracted when edge extraction of a captured image is carried out, and the water droplets that have attached to the lens 11 do not have much of an effect on detection of a three-dimensional object. However, when the surrounding environment is dark, such as at night, the borders of the water droplet are extracted as edge information when edge extraction is carried out on the captured image, and may be erroneously detected as three-dimensional objects.

For this reason, in this example, whether or not water droplets are attached to the lens 11 is detected, and when a predetermined amount of water droplets or more are attached, the water droplet removal device 41 operates to remove the water droplets. Erroneous detection of water droplets as three-dimensional objects is thereby prevented.

Figure 26:
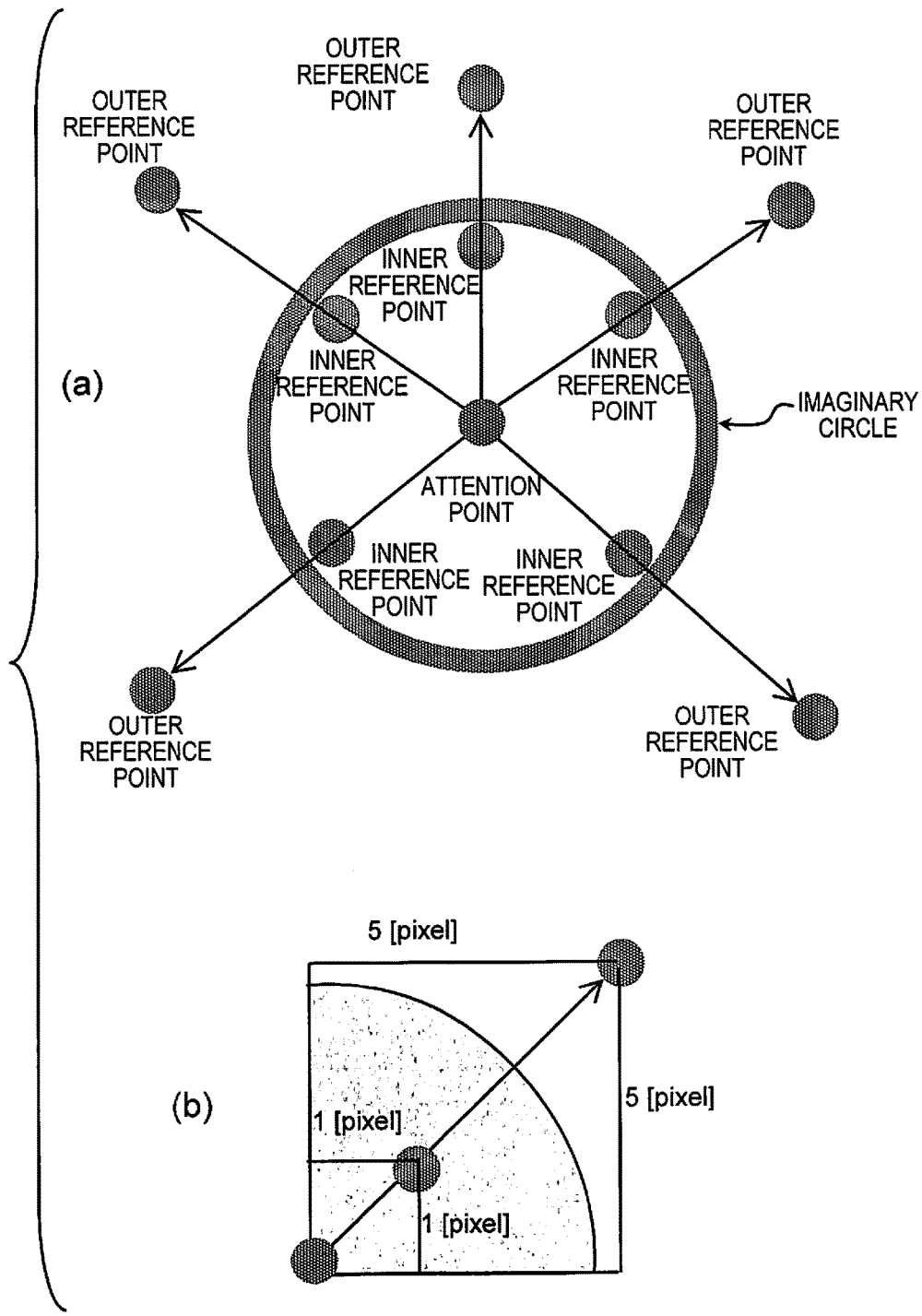
FIG. 26 is a cross sectional perspective view illustrating a setting example of the viewpoint and reference point in the water droplet detection process of FIG. 20.

Part (a) of FIG. 26 is a view illustrating a plan view of a captured image for describing the method for detecting water droplets using a captured image obtained by the camera 10. With the water droplet detection method of this example, the attention points are set for all of the pixels of the captured image, or for respective pixels of specific areas, e.g., areas within the captured image corresponding to detection areas A1 and A2 shown in FIG. 2. Part (a) of FIG. 26(a) shows a state in which the attention point has been set for a single pixel. Next, an imaginary circle of a predetermined radius centered on this attention point is hypothesized. This imaginary circle corresponds to the border of the water droplet. This draws on the fact that, for many water droplets, the border will be circular due to the involvement of surface tension.

Next, a plurality of inner reference points (first reference points) are set inside the imaginary circle that has been hypothesized, and outer reference points (second reference points) that are outside the imaginary circle are set on straight lines connecting the attention point and the respective inner reference points. In this example, the inner reference points are set at positions that are separated from the attention point by a 1-pixel diagonal line, and the outer reference points are set at positions that are separated from the attention point by a 5-pixel diagonal line, for example, as shown in part (b) of FIG. 26. The radius of the imaginary circle and the setting positions of the inner reference points and the outer reference points can be selected to have suitable values based on the size of the water droplets and the frequency of water droplet attachment to the lens, as determined by experience. In addition, a plurality of imaginary circle radii (specifically, the inner reference points and outer reference points) may be set for one pixel.

In this example, a total of five points at the upper center part, the upper left part, the upper right part, the lower left part, and the lower right part inside the imaginary circle are set as inner reference points, and a total of five points at the upper center part, the upper left part, the upper right part, the lower left part, and the lower right part outside of the imaginary circle are set as outer reference points. The upper center part is obtained on the assumption that the water droplet is made prominent by the headlights of a trailing vehicle in the same lane, the upper left part and upper right part are similarly obtained on the assumption that the water droplet is made prominent by the headlights of trailing vehicles in the left and right adjacent lanes, and the lower left part and lower right part are obtained on the assumption that the water droplet is made prominent by the white lines at the boundaries with the adjacent lanes. Although it is desirable to set at least five inner reference points and five outer reference points at positions in this manner, it is possible to omit the inner reference points or outer reference points in either the lower left part or lower right part.

Although it is preferable for the distances between the attention point and the respective inner reference points to be the same, equivalent distance in the strict meaning of the term is not required. In addition, although it is preferable for the distances between the attention point and the respective outer reference points to be the same also, equivalent distance in the strict meaning of the term is not required.

Figure 27:
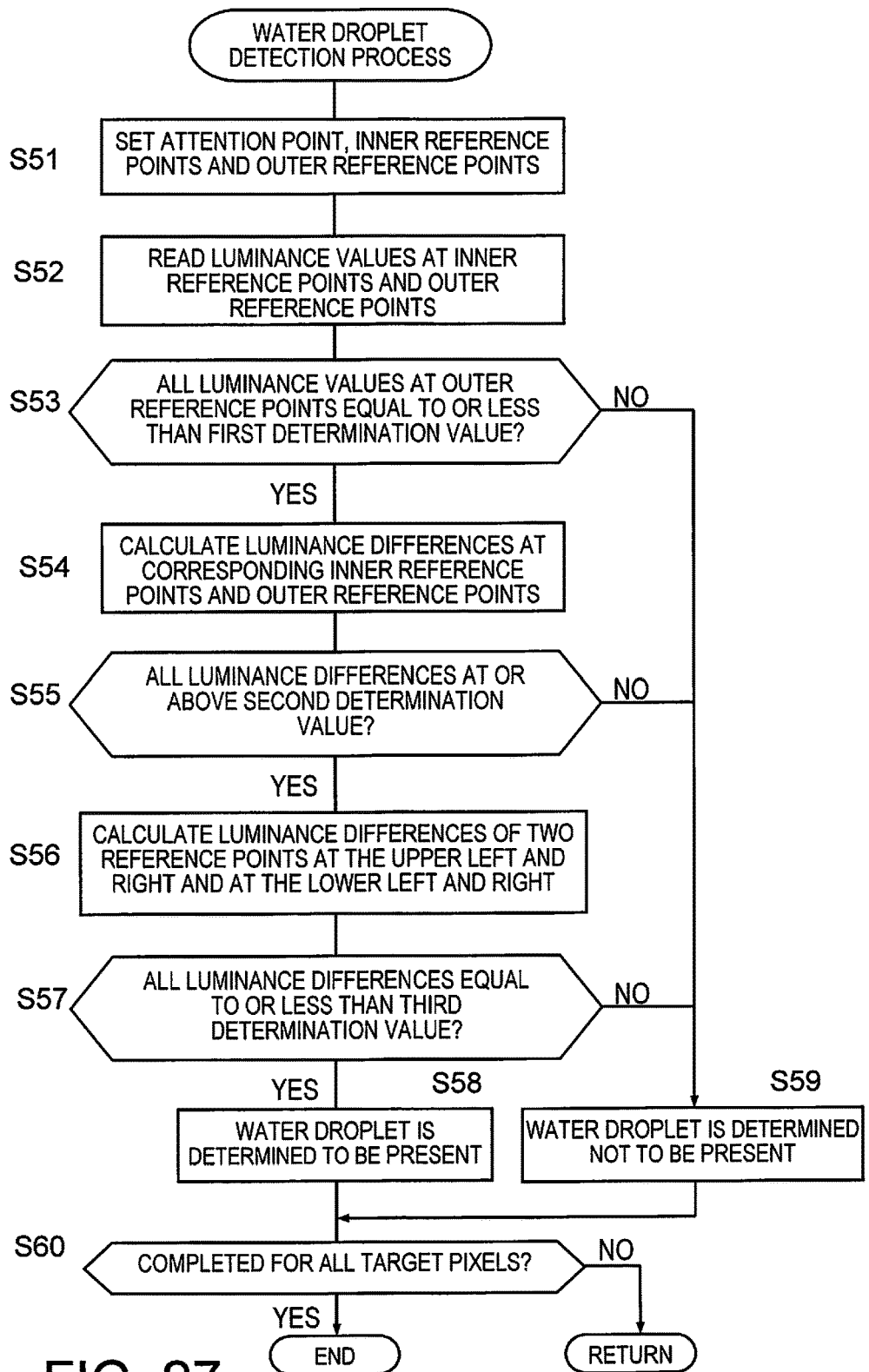
FIG. 27 is a flowchart illustrating the subroutine of the water-droplet detection process (step S41) of FIG. 20.

If the plurality of inner reference points and the corresponding plurality of outer reference points are set in the manner described above for a single attention point, then the presence of a water droplet is detected by the following procedure. FIG. 27 is a flow chart showing the water droplet detection procedure in the water droplet detection unit 40. First, as shown in step S51, the plurality of inner reference points and the corresponding plurality of outer reference points are set for a single attention point (in this example, five points for each), then in step S52, the luminance values are read from the output signals of the pixels corresponding to the inner reference points and outer reference points. In step S53, it is then determined whether the luminance values of the five outer reference points are all equal to or less than a first determination value, and if all are equal to or less than the first determination value, then the process proceeds to step S54, and the subsequent determination is carried out. If all are not equal to or less than the first determination value, then the process proceeds to step S59, and it is determined that a water droplet is not attached at this attention point.

In step S54, the difference between the luminance values of the five inner reference points and the luminance values of the five outer reference points corresponding therewith is determined in order to detect the edge information between the corresponding inner reference points and outer reference points. Next, in step S55, a determination is made as to whether the five luminance differences are all equal to or greater than a second determination value, and if all luminance differences are equal to or greater than the second determination value, then the process proceeds to step S56, and the subsequent determination is carried out. If all are not equal to or greater than the second determination value, then the process proceeds to step S59, and it is determined that a water droplet is not attached at this attention point.

In step S56, the luminance difference between the outer reference points in the upper left part and the upper right part, and the luminance difference between the outer reference points in the lower left part and lower right part are determined. Next, in step S57, it is determined whether these two luminance differences are both equal to or less than a third determination value, and if both luminance differences are equal to or less than the third determination value, then the process proceeds to step S58, and it is determined that a water droplet is attached at this attention point. If both are not equal to or less than the third determination value, then the process proceeds to step S59, and it is determined that a water droplet is not attached at this attention point.

In step S60, it is determined whether the processes of steps S51 to S59 described above have been carried out on all of the target pixels, and if incomplete, then the process returns to step S51, the attention point and reference points are set for the next target pixel, and the processes described above are repeated. Once processing has been completed for all target pixels, the water droplet detection process ends.

In the water droplet detection process described above, water droplets are detected and assessed based on the luminance values of the outer reference points being equal to or less than the first determination value (specifically, the outside of the imaginary circle being sufficiently dark), the luminance difference between the inner reference points and outer reference points being equal to or greater than the second determination value (specifically, an edge being present that can be the border of a water droplet between the inner reference points and outer reference points), and the left-right luminance differences, above and below respectively, being equal to or less than the third determination value (specifically, an object or the like other than a water droplet not being present to the left or right). Next, it is determined that a water droplet is attached when all of these determination conditions are satisfied. In particular, when the luminance differences between the five inner reference points and outer reference points are all equal to or greater than the second determination value, it is highly probable that a portion of the imaginary circle will be detected as the border of a water droplet when the edge information is extracted, and it is highly probable that the aggregate body of the edge information will be identified as a circle. In this example, the high probability of recognizing edge information as a circle in this manner is referred to as circularity strength, and it is determined that there is an increasingly high probability of an object being a water droplet as circularity strength increases.

In the example described above, it is determined that a water droplet is attached when all of the luminance differences between the five inner reference points and outer reference points are equal to or greater than the second determination value, but the determination that a water droplet is attached may be made when the ratio of detection of edge information among the five data is equal to or greater than a predetermined ratio. For example, when eight inner reference points and outer reference points are set, the circularity strength of the edge information is considered to be high when six or more of the luminance differences between the eight inner reference points and outer reference points are equal to or greater than the second determination value, and the determination that a water droplet is attached therefore may be made.

Figure 23:
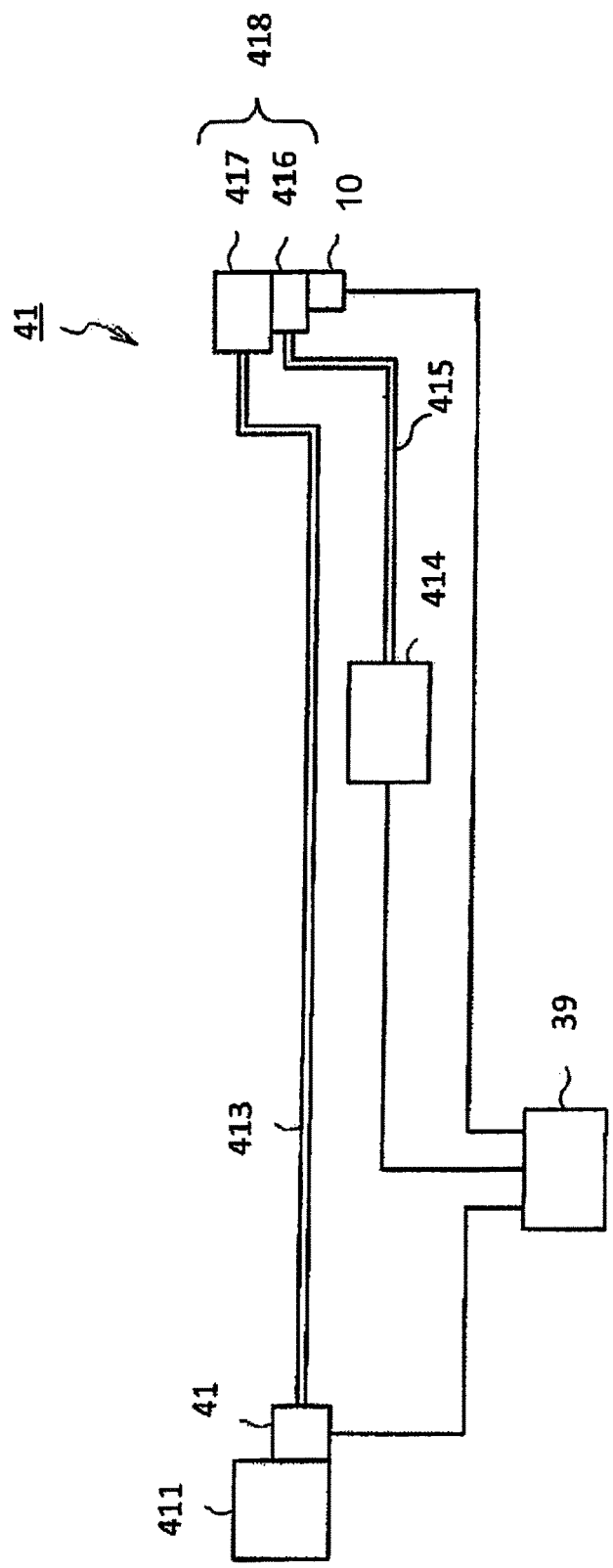
FIG. 23 is a block diagram illustrating the water droplet removal device of FIG. 3.

Next, an example of the water droplet removal device 41 for removing water droplets or dirt attached to the lens 11 of the camera 10 will be described. As shown in FIG. 23, the water droplet removal device 41 of this example has a cleaning fluid reservoir tank 411 for storing cleaning fluid, a cleaning fluid pump 412 for discharging cleaning fluid that has been stored in the cleaning fluid reservoir tank 411, an air pump 414 for discharging compressed air, and a nozzle 416 for ejecting cleaning fluid, compressed air, or a mixture of cleaning fluid and compressed air, in the direction of the lens 11 of the camera 10.

Additionally, there is a cleaning fluid line 413 for conducting the cleaning fluid that has been discharged by the cleaning fluid pump 412 to a secondary tank 417 for storing the cleaning fluid, an air line 415 for conducting compressed air that has been discharged by the air pump 414 to the nozzle 416 of a nozzle unit 418, and a controller 39 for controlling operation of the cleaning fluid pump 412 and the air pump 414.

Figure 24B:
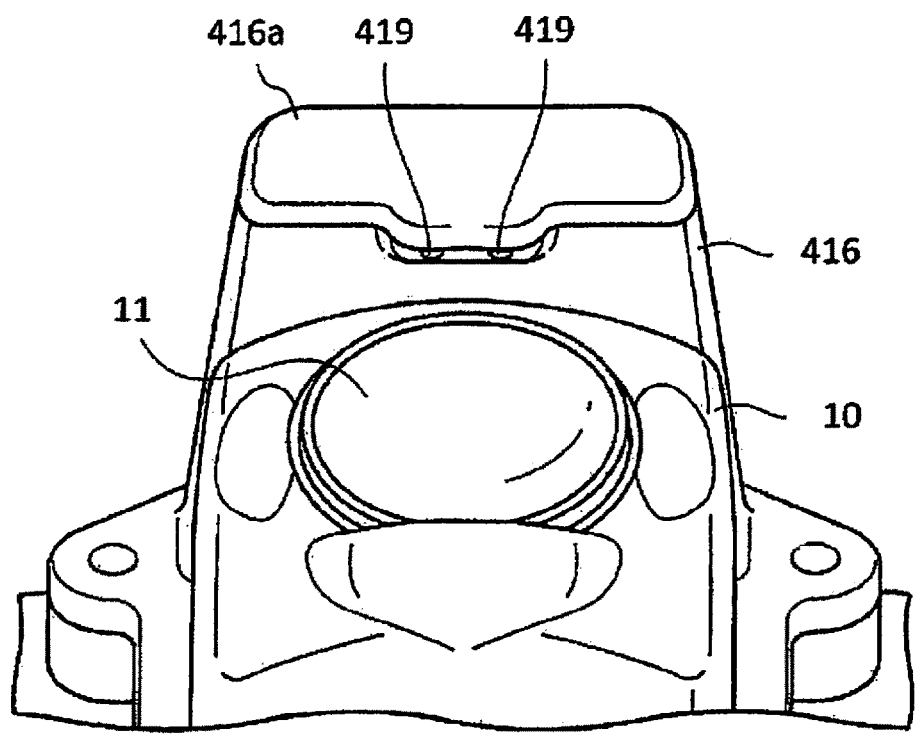
FIG. 24B is a partial perspective view from the arrow 24B in FIG. 24A.

FIG. 24A is a perspective view showing a state in which the water droplet removal device 41 of this example is installed on the camera 10 that has been mounted on a rear part of the vehicle. The nozzle unit 418 for cleaning the surface of the lens 11 is fixed, of course to a rear part of the vehicle, in the vicinity of a side part of the camera 10 that has been fixed to the rear part of the vehicle. A cap 416a and the nozzle 416 for spraying compressed air and cleaning fluid towards the lens 11 are provided on the nozzle unit 418. The nozzle 416, as shown in FIG. 24B, has two ejection openings 419 for spraying compressed air and cleaning fluid at the distal end thereof. In other words, a configuration is achieved in which foreign matter such as water droplets or dirt that has attached to the surface of the lens 11 is removed by spraying cleaning fluid and compressed air towards the surface of the lens 11 from the ejection openings 419 of the nozzle 416.

Figure 25:
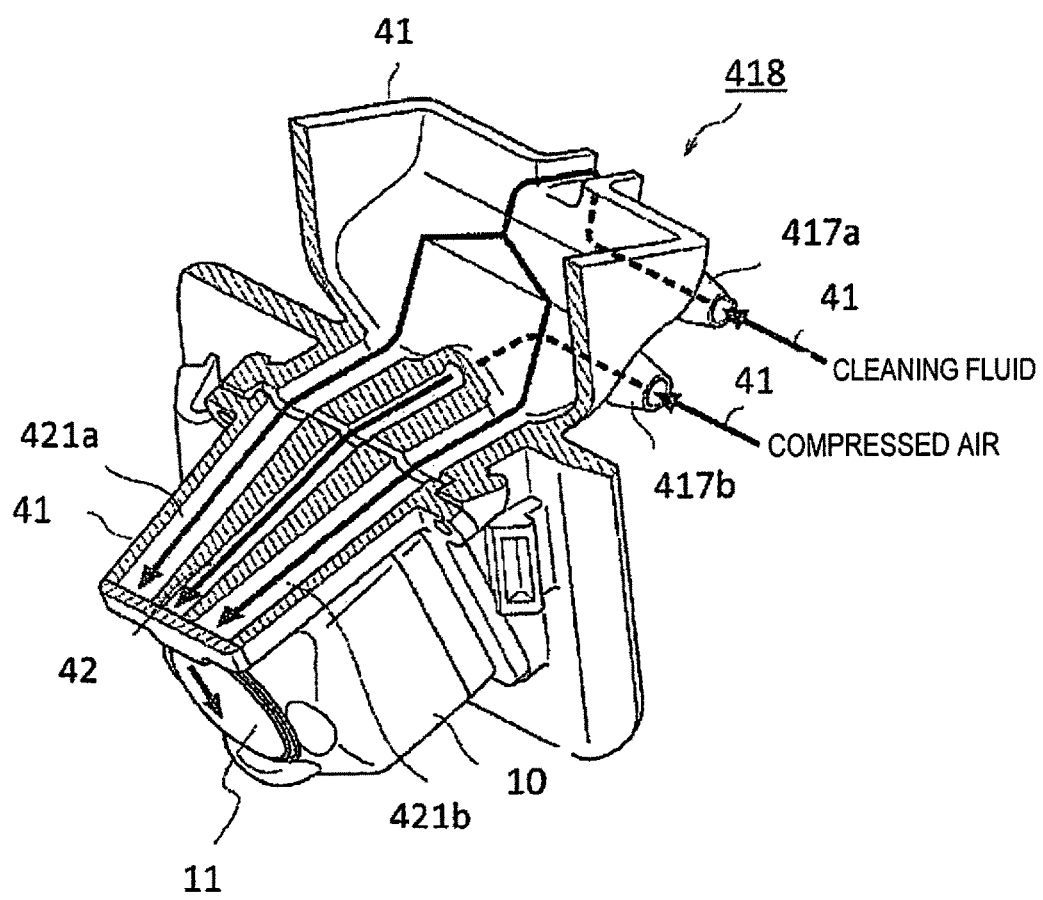
FIG. 25 is a partial exploded perspective view illustrating the camera and water droplet removal device illustrated in FIG. 24A.

FIG. 25 is a perspective view showing a partial cross-section of the nozzle unit 418 illustrated in FIG. 24A. As shown in FIG. 25, in the nozzle 416 that is provided towards the distal end of the nozzle unit 418 is provided an air pathway 420 for conducting compressed air to a middle portion thereof, and cleaning fluid pathways 421a, 421b for conducting cleaning fluid are provided both to the right and left of the air pathway 420. In addition, the distal ends of the air pathway 420 and the cleaning fluid pathways 421a, 421b are bent at roughly right angles so as to face the surface of the lens 11 of the camera 10.

Moreover, a secondary tank 417 for temporarily storing cleaning fluid is provided on the upstream side of the cleaning fluid pathways 421a, 421b. A plug 417a for connecting the cleaning fluid line 413 and a plug 417b for connecting the air line 415 are provided on a side part of the secondary tank 417. Plug 417b of the two is connected to the air pathway 420 via a flow line that is provided below the secondary tank 417. In other words, the compressed air that is conducted into the nozzle unit 418 via the plug 417b is conducted directly to the air pathway 420.

In addition, the plug 417a is connected to the secondary tank 417, and the cleaning fluid that is supplied via the plug 417a flows inside from above the secondary tank 417. The line that connects the plug 417a to the secondary tank 417 is vertically oriented.

In addition, as shown in FIG. 25, a bottom part of the secondary tank 417 is connected to the two cleaning fluid pathways 421a, 421b. Therefore, the compressed air that is discharged by the air pump 414 illustrated in FIG. 23 is conducted to the air pathway 420 of the nozzle 416 via the air line 415, whereas the cleaning fluid that has been discharged from the cleaning fluid pump 412 is conducted to the two cleaning fluid pathways 421a, 421b after having been stored in the secondary tank 417.

Next, the controller 39 illustrated in FIG. 23, by virtue of being connected with the control unit that is mounted in the vehicle, acquires vehicle information of various types, i.e., host vehicle speed information, wiper switch information, washer switch information, soft position information, and headlight switch information, and also acquires camera image information, which is the image captured by the camera 10. In addition, the controller 39 assesses the cleaning mode of the lens 11 based on various types of vehicle information, and based on detected information from the water droplet detection unit 40 for assessing whether water droplets are attached to the surface of the lens 11 of the camera 10 based on camera image information. In addition, based on the assessed cleaning mode, driving of the air pump 414 is controlled and driving of the cleaning fluid pump 412 is controlled.

The water droplet removal device 41 of this example sets three modes: a pressurized cleaning mode in which the lens 11 is cleaned by discharging cleaning fluid and compressed air, an air blow mode in which water droplets that have attached to the lens 11 are removed by discharging compressed air alone, and a continuous flushing mode in which cleaning fluid is dropped intermittently onto the lens 11, and dirt does not readily attach to the lens 11. The camera 10 is effectively cleaned by suitably selecting and carrying out of one of three modes in accordance with various conditions, such as the dirtiness of the lens 11 or weather conditions. In the description below, descriptions of the pressurized cleaning mode and the continuous flushing mode are omitted, and removal of water droplets using the air blow mode pertaining to the present invention is described.

In the air blow mode of the water droplet removal device 41 of this example, only the air pump 414 is driven by the controller 39 when cleaning fluid is not stored in the secondary tank 417. As a result, compressed air is blown from the ejection opening 419 at the distal end of the air pathway 420 towards the surface of the lens 11. As a result, water droplets that have attached to the surface of the lens 11 of the camera 10 can be removed by air pressure.

In this manner, the controller 39 of this example controls operation of the water droplet removal device 41 in accordance with the water droplet attachment state when the water droplet detection unit 40 has detected water droplets attached to the lens 11. Specifically, the number of attached water droplets is counted, and the air blow operating time is lengthened for higher numbers of attached droplets.

Figure 21:
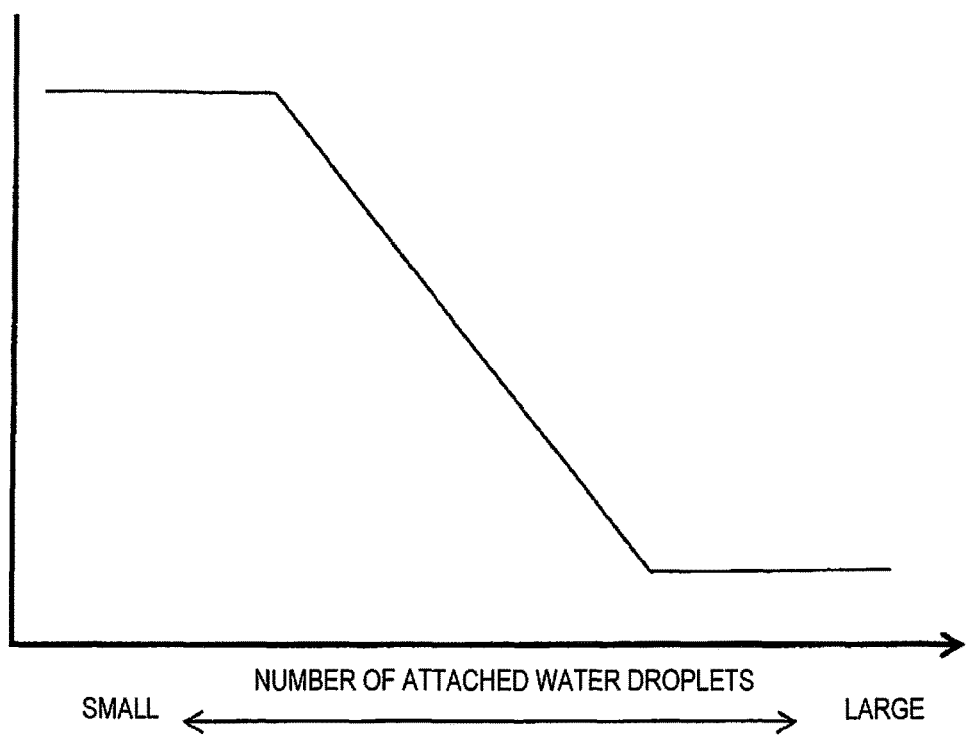
FIG. 21 is an example of a control map illustrating the relationship of air blow OFF time with respect to number of water droplets.
Figure 22:
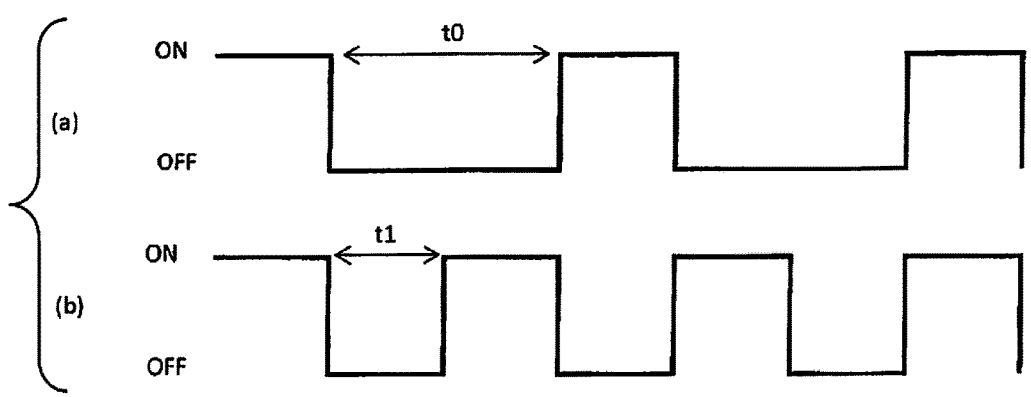
FIG. 22 is an example of a time chart illustrating air blow ON/OFF set in accordance with the number of water droplets.

FIGS. 21 and 22 are control maps showing a setting example of the air blow OFF interval with respect to the water droplet attachment number. FIG. 21 is an example in which the air blow OFF interval is shortened as the number of attached water droplets increases. Part (a) of FIG. 22 is an air blow operation time chart for a case where the number of attached water droplets is small, and part (b) of FIG. 22 is an example of an air blow operation time chart for a case where the number of attached water droplets is large. When carrying out ON/OFF control of operation of the air pump 414 of the water droplet removal device 41, the controller 39 sets a correspondingly shorter OFF interval t1 as shown in part (b) of FIG. 22 as the number of water droplets detected by the water droplet detection unit 40 increases (t1<t0). The time of the air blow onto the surface of the lens 11 of the camera 10 is thereby lengthened, allowing removal, even when a large number of water droplets are attached. Conversely, when there are few attached water droplets, a longer air blow OFF interval t0 is set, thereby shortening the time of the air blow onto the surface of the lens 11 of the camera 10 and dramatically reducing the non-detection period.

Figure 20:
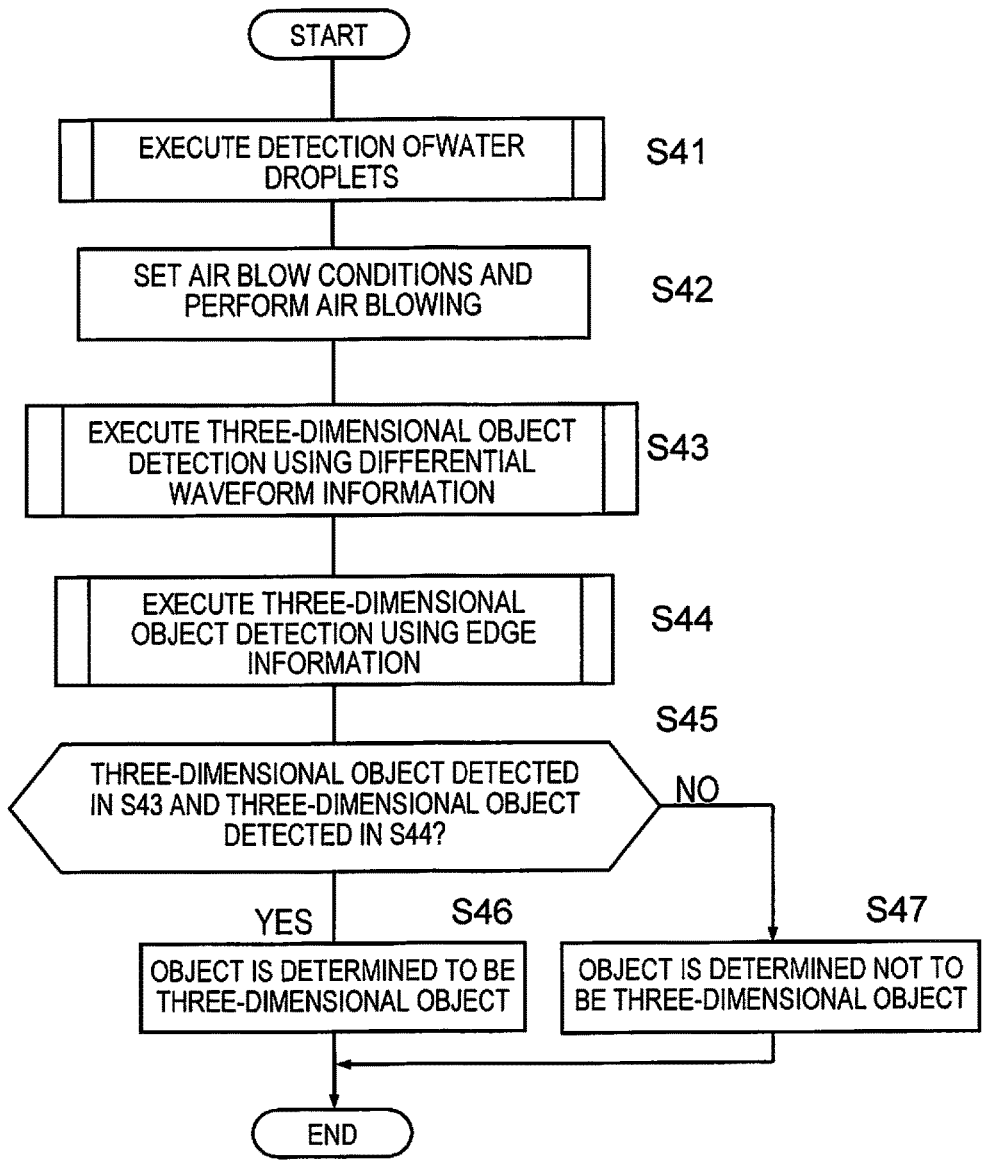
FIG. 20 is a flowchart illustrating the control procedure of the three-dimensional object assessment unit and control unit of FIG. 3.

Next, with reference to FIG. 20, operation of the three-dimensional object assessment unit 38 and the controller 39 will be described. First, in step S41, the attachment state of water droplets (number of water droplets) on the lens 11 is detected by the water droplet detection unit 40 and is output to the controller 39. Step S42 is carried out at this point only when water droplets are attached to at least one of the detection areas A1 and A2, and step S42 need not be carried out when water droplets are not attached to either detection area A1 or A2. Because it is highly probable that erroneous detection due to attachment of water droplets will occur when the environment is dark, the brightness of the environment can be detected by an exposure sensor or the like of the camera 10, with step S42 being carried out when the brightness is equal to or less than a predetermined value.

In step S42, the controller 39 sets the air blow OFF time in the air-blow mode of the water droplet removal device 41 using the control map of FIG. 21 that has been stored beforehand along with the detected water droplet attachment state, and also carries out air blowing according to the set conditions. Air blowing is thereby carried out in accordance with the water droplet attachment state, and water droplets that have attached to the surface of the lens 11 are removed.

In step S43, detection of a three-dimensional object is carried out using differential waveform information according to the procedure described above. In addition, in step S44, detection of a three-dimensional object is carried out using edge information according to the procedure described above. When detecting a three-dimensional object using the difference information and when detecting a three-dimensional object using the edge information, the first threshold value α and second threshold value β are respectively set in advance in the first three-dimensional object detection unit 33 and second three-dimensional object detection unit 37.

In step S45, it is assessed whether an object has been detected as being a three-dimensional object in step S43 and whether an object has been detected as being a three-dimensional object in step S44, and if the object has been detected as being a three-dimensional object in step S43 and step S44, then the process proceeds to step S46, and a final assessment is made that the object is a three-dimensional object. If an object has not been detected as being a three-dimensional object in either step S43 or S44, then the process proceeds to step S47, and a final assessment is made that the object is not a three-dimensional object.

As described above, according to the three-dimensional object detection device 1 of this example, when water droplets are attached to the lens 11 of the camera 10 and when the detection environment is dark, e.g., during the night, then although there is the possibility of erroneously detecting water droplets as a three-dimensional object due to the influence of street lights, head lights, and the like, because the water droplets are effectively removed by the water droplet removal device 41 when a large number of water droplets are attached, erroneous detection of three-dimensional objects and water droplets can be prevented.

Incidentally, in generating differential waveform information by the alignment unit 32 and the first three-dimensional object detection unit 33 in FIG. 3, the bird's-eye-view image at a current moment and the bird's-eye-view image at a single moment prior were aligned while shifting the bird's-eye-view image by the travel distance in real space, based on the traveling speed of the vehicle as shown in FIG. 4 in the embodiment described above, a differential image was determined in this state, and differential waveform information was generated therefrom. However, the method described below also may be used.

Specifically, the pixel amount (number of pixels showing a difference) corresponding to the characteristic points of a moving object increase in a differential image in which captured images at different timings are offset, and the pixel amount corresponding to the characteristic points of a stationary object increase in a differential image in which captured images at different timings are not offset. Thus, in this example, a three-dimensional object is assessed as being a stationary Object or a moving object based on a comparison of the pixel value (edge amount) of a differential image of captured images at different timings that have been offset, and the pixel value (edge amount) of a differential image of captured images at different timings that have not been offset.

Figure 28:
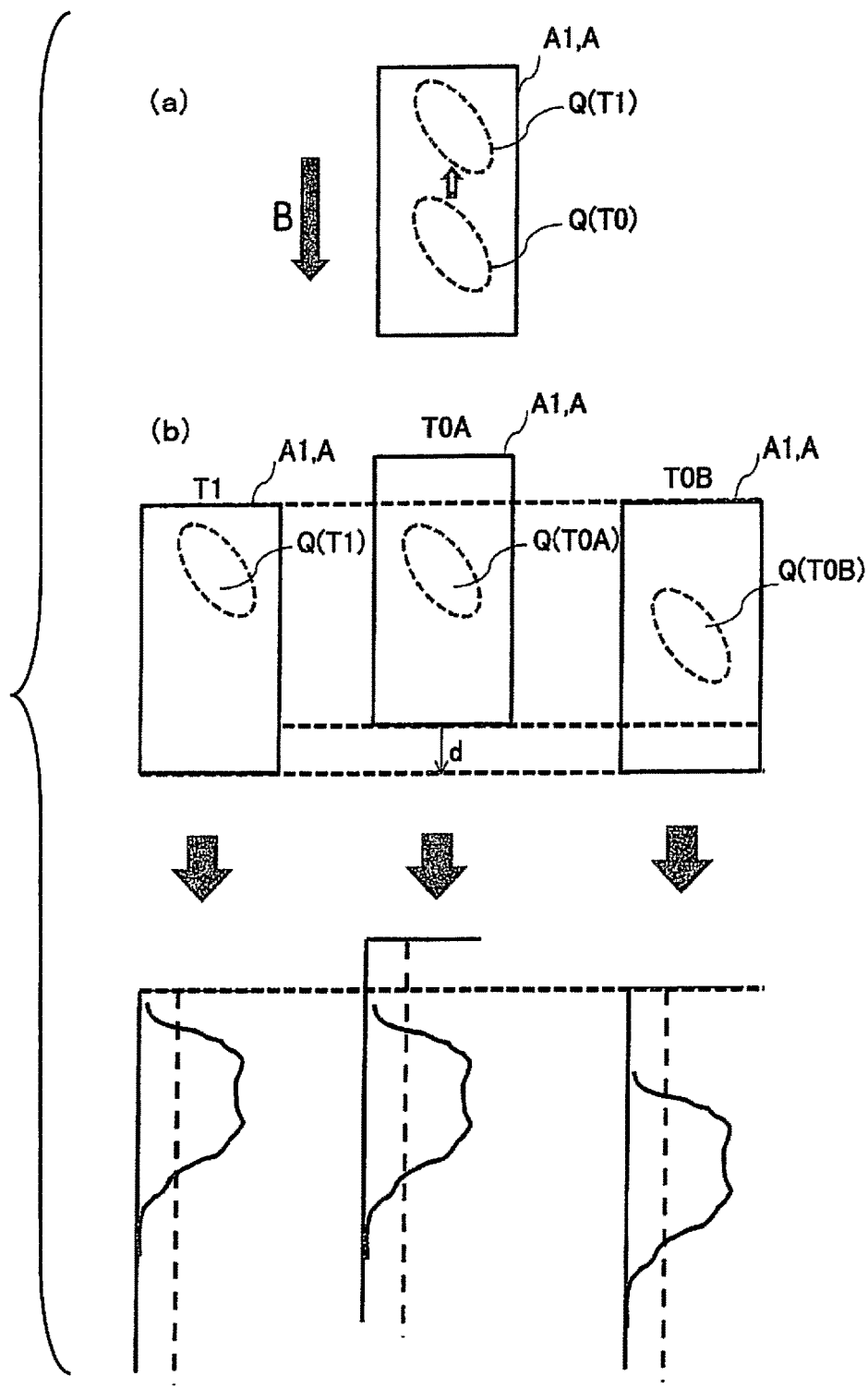
FIG. 28 is a view (part 1) for describing another example of the process of the alignment unit of FIG. 3.

As illustrated in part (a) of FIG. 28, when a representation Q (T0) of a three-dimensional object has been detected in the detection areas A1, A2 at a past timing T0, and a representation Q (T1) of the three-dimensional object has been detected in detection areas A1, A2 at the current timing T1 after the timing T0, because the host vehicle V which is the main object of detection is moving along a direction B, the representation Q (T0) of the three-dimensional object that has been detected at the past timing T0 moves on the image to the position of the representation Q (T1) of the three-dimensional object upwards in the drawing of the detection areas A1, A2.

As illustrated in part (b) of FIG. 28, there are obtained: a distribution of edge components or pixels of the representation Q (T1) of the three-dimensional object that has been detected at the current timing T1, a distribution of edge components or pixels of the representation Q (T0A) of the three-dimensional object that has been offset by a predetermined amount, which is a representation of the three-dimensional object representation Q (T0) that has been detected at a past timing T0, and a distribution of edge components or pixels of the representation Q (T0B) of the three-dimensional object that has not been offset, which is an image of the representation Q (T0) of the three-dimensional object that has been detected at the same past timing T0.

As shown in part (b) of FIG. 28, the image T1 and the offset image T0A are compared, and the positions of the representation Q (T1) of the three-dimensional object in the image T1 and the representation Q (TOA) of the three-dimensional object in the image TOA (position along the moving direction B of the host vehicle V) are substantially shared. On the other hand, as shown in the same drawing, when the image T1 and the image T0B that is not offset are compared, the positions of the representation Q (T1) of the three-dimensional object in the image T1 and the representation Q (T0B) of the three-dimensional object in the image T0B (position along the movement direction B of the host vehicle V) are different. In other words, when the differential image of T1 and T0A is determined, because there is no remainder when subtracting the shared portions, there are few pixels that are extracted as characteristic. When the differential image of T1 and T0B is determined, the different portions remain, and therefore the number of pixels that are extracted as characteristic is correspondingly increased.

Next, whether a three-dimensional object is a moving object or a stationary object is considered in the description of the attention points shown in FIG. 28. A case in which the three-dimensional object is a moving object is described with reference to FIG. 29, and a case in which the three-dimensional object is a stationary object is described with reference to FIG. 30.

Figure 29:
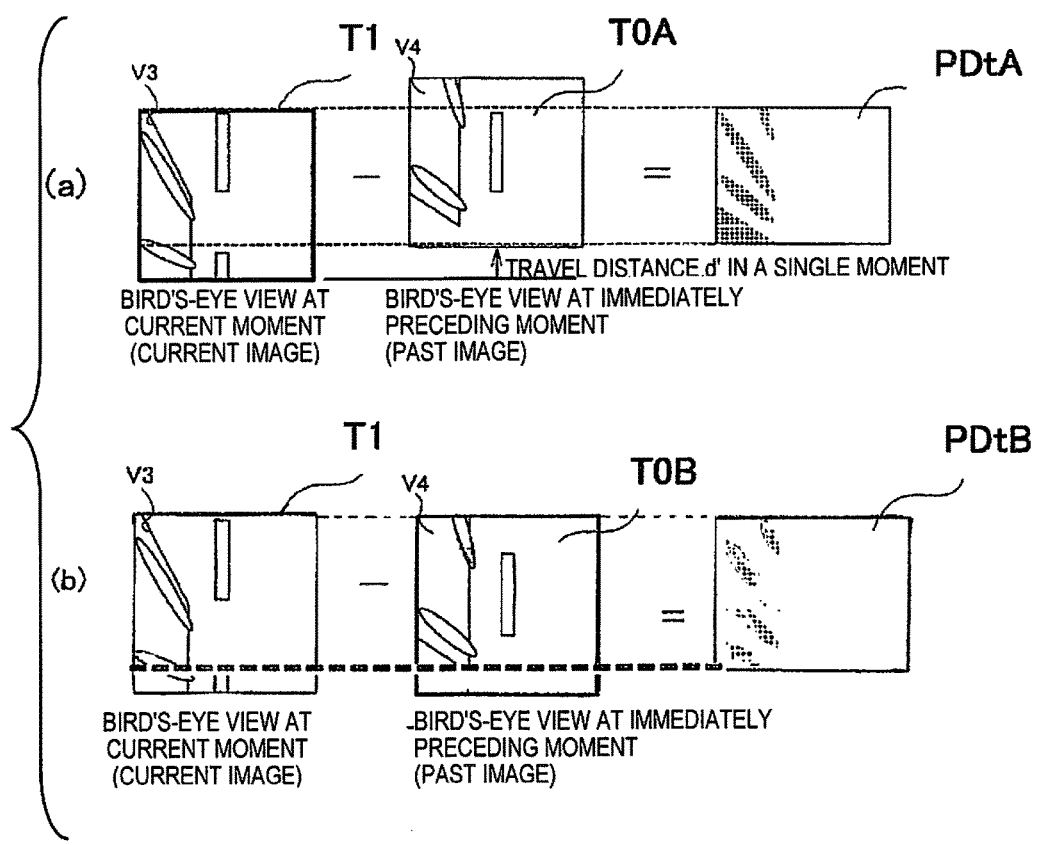
FIG. 29 is a view (part 2) for describing another example of the process of the alignment unit of FIG. 3.

As shown in part (a) of FIG. 29, when the three-dimensional object that is to be detected is another vehicle VX that is moving, both the host vehicle V and the other vehicle VX are moving, and so there is a tendency for the predetermined positional relationship between the host vehicle V and the other vehicle VX to be maintained. In other words, there will be a tendency for the position of the other vehicle VX to be displaced when the captured image is offset, and many pixels that are found to be characteristic (edges) will be detected in the differential image PDt. On the other hand, as illustrated in part (b) of FIG. 29, when the captured image is not offset, there will be a tendency for the positions of the host vehicle V and the other vehicle VX to be close, and few pixels that are found to be characteristic (edges) will be detected in the differential image PDt. If the pixels (edges) in the differential image PDt are numerous, then the integration value will increase, and if the pixels (edges) in the differential image PDt are few, then the integration value will tend to be low in the differential waveform information.

Figure 30:
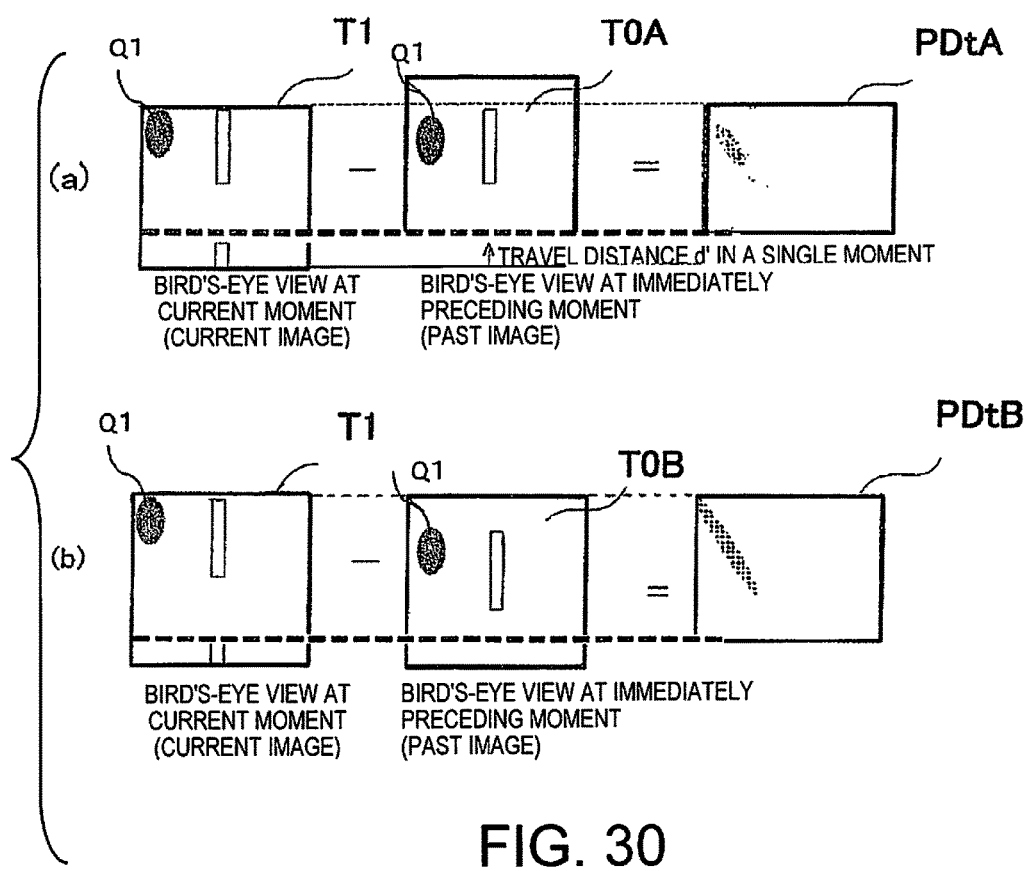
FIG. 30 is a view (part 3) for describing another example of the process of the alignment unit of FIG. 3.

In addition, as illustrated in part (a) of FIG. 30, when the three-dimensional object to be detected is a stationary object Q1 that is stationary, because the stationary object Q1 is stationary whereas the host vehicle V is moving, there will tend to be a disparity between the host vehicle V and the stationary object Q1. In other words, the positions of the host vehicle V and the stationary object Q1 will tend to be close when the captured image is offset, and few pixels (edges) that are taken to be characteristic will be detected in the differential image PDt. On the other hand, as illustrated in part (b) of FIG. 30, if the captured image is not offset, then the position of the stationary object Q1 will tend to be different from that of the previous captured image as the host vehicle V moves, and there will be many pixels (edges) that are found to be characteristic detected in the differential image PDt. If the pixels (edges) in the differential image PDt are numerous, then the integration value will increase in the luminance distribution information, and if the pixels (edges) in the differential image PDt are few, then the integration value will tend to be low in the luminance distribution information.

The manner of thinking described above can be similarly utilized when using edge information. In other words, the position in a first birds-eye-view image obtained at a first moment T0 in which a three-dimensional object has been detected and the position in a second birds-eye-view image that has been obtained at a second moment T1 after the first moment are aligned from a bird's-eye viewpoint, and in the differential image of the aligned bird's-eye-view image, the number of pixels for which the luminance difference of adjacent image areas is equal to or greater than a predetermined threshold value are counted, a frequency distribution is produced, and a first integration value of generated first luminance distribution information is determined. In other words, an offset differential image is generated in consideration of the amount of movement of the host vehicle V. The offset amount d' is decided based on the time from the single moment prior to the current moment and a signal from the vehicle speed sensor 20 corresponding to the movement amount in the bird's-eye-view image data corresponding to the actual travel distance of the host vehicle V depicted in part (a) of FIG. 4. The first integration value is the total value of all values plotted in the first luminance distribution information or the total value of a predetermined area.

Next, in the differential image obtained without shifting positions with regard to the first bird's-eye-view image obtained at the first moment T0 and the second bird's-eye-view image obtained at a second moment T1 after the first moment T0, the number of pixels for which the luminance difference in adjacent image areas is equal to or greater than a predetermined threshold value is counted, a frequency distribution is produced, and a second integration value of the generated second luminance distribution information is determined. In other words, a differential image that is not offset is generated, and the integration value (second integration value) thereof is calculated. The second integration value is the total value of all values plotted in the second luminance distribution information or the total value of a predetermined area.

Next, if the evaluation value of the frequency at which the second integration value is assessed to be larger than the first integration value is equal to or greater than a predetermined evaluation threshold value, then the three-dimensional object that has been detected by the first three-dimensional object detection unit 33 is assessed as "moving object." The evaluation value calculation method has no restrictions, but in this embodiment, evaluation points are counted up each time the assessment is made that the second integration value is larger than the first integration value in a process that is repeated at a predetermined period, and the total value is determined as the "evaluation value".

In this manner, based on the captured images of different points in time, the characteristics of an image transition of a stationary object and the characteristics of an image transition of a moving object are identified based on a magnitude relationship between the pixel amount (edge amount) extracted from the differential image of the offset past captured image and current captured image, and the pixel amount (edge amount) extracted from the differential image of the non-offset past captured image and current captured image, and an assessment as to whether a three-dimensional object is a moving object or a stationary object can be made with high precision.

In this example, the evaluation value is calculated by incrementing the first count value when the second integration value (edge amount) of the pixels exhibiting a predetermined difference in the differential image with regard to the non-offset image is assessed to be greater than the first integration value (edge amount) of the pixels exhibiting a predetermined difference in the differential image with regard to the offset image. In other words, the evaluation value increases along with the accumulation of assessments that the second integration value is greater than the first integration value. When the evaluation value is equal to or greater than a predetermined evaluation threshold value, the three-dimensional object is then assessed as being a stationary object.

In this process, when an assessment indicating that the second integration value is greater than the first integration value continues, the first count value is set higher with increasing continuations of this assessment. In this manner, when the assessment that the second integration value is greater than the first integration value continues, it is assessed as highly probable that the detected three-dimensional object is a stationary object, and the first count value is increased so as to increase the evaluation value. Therefore, it is possible to assess with high precision whether a three-dimensional object is a moving object based on the results of successive observations.

The evaluation value may be calculated by incrementing the first count value when it is assessed that the second integration value is greater than the first integration value, and decrementing the second count value when it is assessed that the second integration value is smaller than the first integration value. In this case, when the stationary object detection unit 38 assesses that the second integration value is greater than the first integration value, then assesses that the second integration value is smaller than the first integration value, and then assesses that the second integration value is greater than the first integration value, the first count value is set high.

When the assessment that the second integration value is greater than the first integration value and the assessment that the first integration value is greater than the second integration value alternate in this manner, the assessment is made that there is a high probability that the detected three-dimensional object is a stationary object, and the first count value is increased so that the evaluation value increases. Consequently, a stationary object can be assessed with high precision based on the results of successive observations. Incidentally, there is a strong trend for moving object characteristic detection to be observed in a stable manner. This is because if the detection results are unstable, and the assessment result that a three-dimensional object is a stationary object is detected in a discrete manner, then it can be assessed that it is highly probable that the detected three-dimensional object is a stationary object.

In addition, when it is assessed that the second integration value is smaller than the first integration value, the second count value is decremented, and the evaluation value is calculated. In this case, when the assessment that the second integration value is smaller than the first integration value continues for a predetermined number of repetitions or more, then the second count value is set high.

When it is assessed that the second integration value is smaller than the first integration value in this manner, it is assessed that there is a high probability that the three-dimensional object that has been detected is a moving object (another vehicle VX), and the second count value pertaining to decrementing is increased so that the evaluation value for assessment of a stationary object decreases. A stationary object can therefore be assessed with high precision based on the results of successive observations.

Second Embodiment

The second embodiment of the three-dimensional object detection device of the present invention is described with reference to FIGS. 31 to 36. The configuration of three-dimensional object detection using differential waveform information illustrated in FIGS. 4 to 12 and the configuration of three-dimensional object detection using edge information illustrated in FIGS. 13 to 19 are shared with the first embodiment described above when no specific descriptions are provided, and the descriptions of the first embodiment are therefore cited herein.

Figure 31:
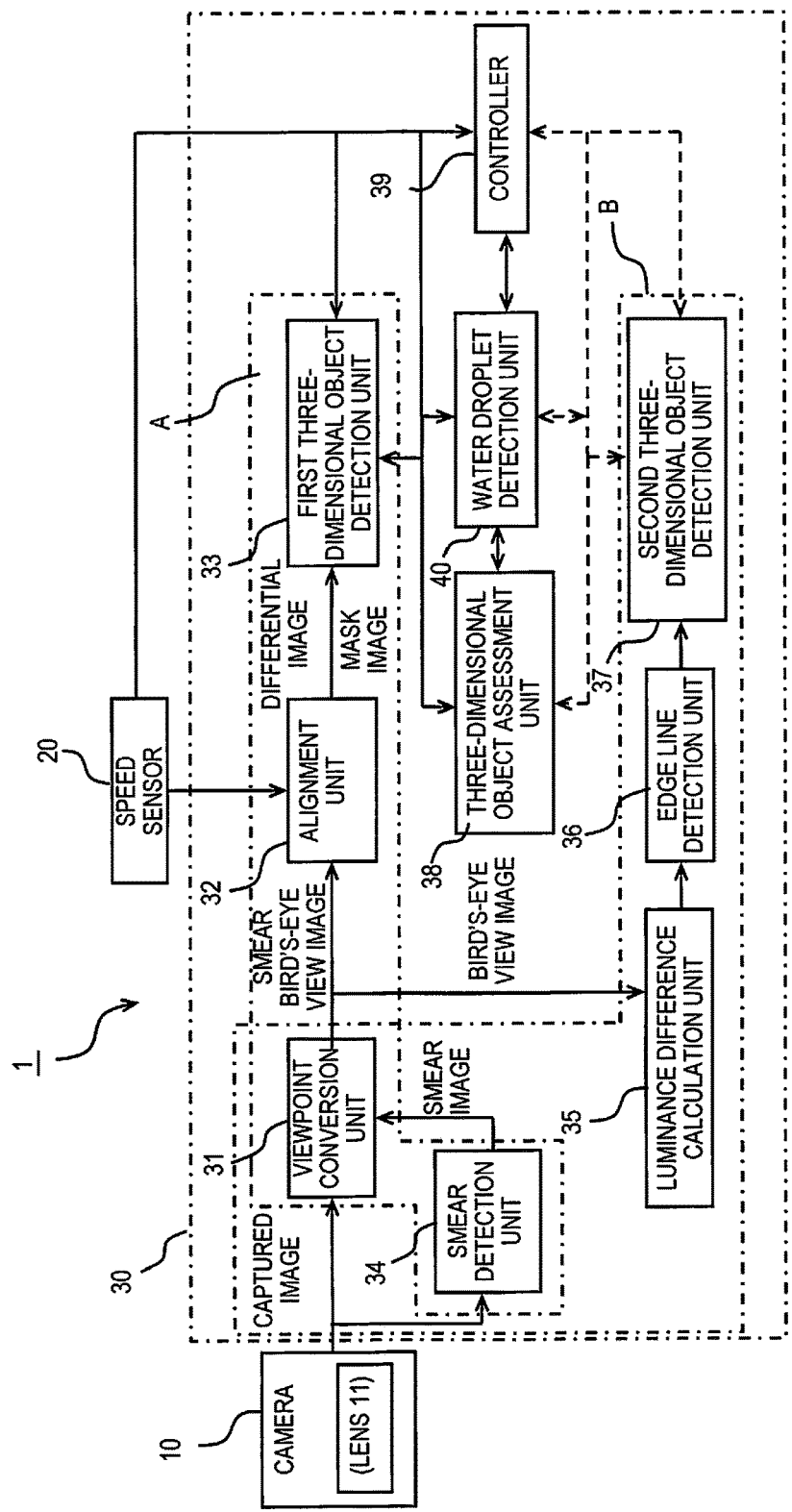
FIG. 31 is a block diagram illustrating details of the second embodiment of the computation unit of FIG. 1.

As illustrated in FIG. 31, the computer 30 of this example has a viewpoint conversion unit 31, an alignment unit 32, a first three-dimensional object detection unit 33, a smear detection unit 34, a luminance difference calculation unit 35, an edge line detection unit 36, a second three-dimensional object detection unit 37, a three-dimensional object assessment unit 38, and a controller 39. Of these, the viewpoint conversion unit 31, the smear detection unit 34, the alignment unit 32, and the first three-dimensional object detection unit 33 are constituent units related to the detection block A for three-dimensional objects using the differential waveform information as described in the first embodiment above, and the viewpoint conversion unit 31, the luminance difference calculation unit 35, the edge line detection unit 36, and the second three-dimensional object detection unit 37 are constituent units related to the detection block B for three-dimensional objects using the edge information as described in the first embodiment above. The main differences with respect to the first embodiment are described below.

Final Assessment of a Three-Dimensional Object

In detecting a three-dimensional object by the two three-dimensional object detection units 33, 37, the three-dimensional object detection device 1 of this example, as illustrated in FIG. 31, has a three-dimensional object assessment unit 38 for making a final assessment as to whether an object is a three-dimensional object from the detection results of the first three-dimensional object detection unit 33 and the detection results of the second three-dimensional object detection unit 37, and a controller 39 for setting the first threshold value α of the first three-dimensional object detection unit 33 and the second threshold value β of the second three-dimensional object detection unit 37 in accordance with the attachment state of water droplets on the lens that has been detected by the water droplet detection unit 40. The detection method for water droplets of the water droplet detection unit 40 is the same as in the first embodiment illustrated in FIGS. 26 and 27, and a description has therefore been omitted.

In this example, a camera 10 is provided as the image capturing means illustrated in FIGS. 24A, 24B. As described above, although a lens (or protective filter) 11 that constitutes the optical capture system is included in the camera 10, because the camera is mounted on the outside of the vehicle, water droplets that are thrown up from the road surface or rain droplets often attach to the lens 11 which is the outer surface of the camera 10. When the surrounding environment is bright, e.g., during the day, the water droplets that have attached to the lens 11 do not have much of an effect on detection of a three-dimensional object, because the water droplet border edges are difficult to extract even when edge extraction from a captured image is carried out. However, when the surrounding environment is dark, such as at night, the borders of the water droplet are extracted as edge information when edge extraction is carried out on the captured image, and may be erroneously detected as three-dimensional objects.

For this reason, in this example, whether or not a water droplet is attached to the lens 11 is detected, and when a predetermined amount of water droplets or more are attached, detection of three-dimensional objects is suppressed in order to prevent erroneous detection of a three-dimensional object. Specifically, the controller 39 sets at least one of the first threshold value α of the first three-dimensional object detection unit 33 and the second threshold value β of the second three-dimensional object detection unit 37 relatively higher than the prior ordinary setting value. The potential for assessment as a three-dimensional object by the three-dimensional object assessment unit 38 is thereby decreased, preventing erroneous detection of water droplets as three-dimensional objects.

When water droplets attached to the lens 11 have been detected by the water droplet detection unit 40, in order to suppress assessment that a three-dimensional object detected by the first three-dimensional object detection unit 33 or the second three-dimensional object detection unit 37 is another vehicle VX, the controller 39 in this example outputs control instructions for controlling the units (including the controller 39) constituting the computer 30 so as to suppress the assessment that an image corresponding to water droplets that have been detected is another vehicle VX present in the detection areas A1, A2. The specific method for suppressing assessment that a three-dimensional object detected by the first three-dimensional object detection unit 33 or the second three-dimensional object detection unit 37 is another vehicle VX is described below.

In a case where the first three-dimensional object detection unit 33 for detecting three-dimensional objects using differential waveform information detects a three-dimensional object when the differential waveform information is equal to or greater than the predetermined first threshold value $\alpha$, if the water droplet detection unit 40 has detected water droplets attached to the lens 11, the controller 39 generates a control command to increase the first threshold value $\alpha$ so that three-dimensional objects are less readily detected, and the control command is output to the first three-dimensional object detection unit 33.

Similarly, in a case where the first three-dimensional object detection unit 33 detects a three-dimensional object when the differential waveform information is equal to or greater than the predetermined first threshold value $\alpha$, if the water droplet detection unit 40 has detected water droplets attached to the lens 11, the controller 39 will issue an output to decrease the value at which the number of pixels exhibiting a predetermined difference in the differential image obtained from the bird's-eye-view images are counted and a frequency distribution is produced. The control command is output to the first three-dimensional object detection unit 33.

In addition, in a case where the first three-dimensional object detection unit 33 for detecting three-dimensional objects using differential waveform information extracts, as the number of pixels exhibiting a predetermined difference, the number pixels exhibiting pixel values that are equal to or greater than a threshold value p, when the water droplet detection unit 40 has detected water droplets attached to the lens 11, the controller 39 generates a control command for upwardly adjusting the threshold value p so that three-dimensional objects are not readily detected. The control command is output to the first three-dimensional object detection unit 33.

Similarly, in a case where the first three-dimensional object detection unit 33 extracts, as the number of pixels exhibiting a predetermined difference, the number of pixels exhibiting pixel values that are equal to or greater than a threshold value p, when the water droplet detection unit 40 has detected water droplets attached to the lens 11, the controller 39 generates a control command for outputting a downwardly adjusted number of pixels that are extracted in the differential image along the collapsing direction of the three-dimensional object upon viewpoint conversion of the bird's-eye-view image. The control command is output to the first three-dimensional object detection unit 33.

On the other hand, in a case where the second three-dimensional object detection unit 37 for detecting three-dimensional objects using edge information extracts edge lines based on the pixels exhibiting luminance differences of a predetermined threshold value t or greater, when the water droplet detection unit 40 has detected water droplets attached to the lens 11, the controller 39 generates a control command for upwardly adjusting the predetermined threshold value t so that three-dimensional objects are not readily detected. The control command is output to the second three-dimensional object detection unit 37.

Similarly, in a case where the second three-dimensional object detection unit 37 for detecting three-dimensional objects using edge information extracts edge lines based on the pixels exhibiting luminance differences of the predetermined threshold value t or greater, when the water droplet detection unit 40 has detected water droplets attached to the lens 11, the controller 39 generates a control command for outputting a downwardly adjusted pixel luminance value. The control command is output to the second three-dimensional object detection unit 37.

Similarly, in a case where the second three-dimensional object detection unit 37 for detecting three-dimensional objects using edge information detects a three-dimensional object based on edge lines having lengths that are equal to or greater than a threshold value $\theta$ in the edge information, when the water droplet detection unit 40 has detected water droplets attached to the lens 11, the controller 39 generates a control command for upwardly adjusting the threshold value $\theta$ so that three-dimensional objects are not readily detected. The control command is output to the second three-dimensional object detection unit 37.

Similarly, in a case where the second three-dimensional object detection unit 37 for detecting three-dimensional objects using edge information detects a three-dimensional object based on edge lines having lengths that are equal to or greater than the threshold value $\theta$ in the edge information, when the water droplet detection unit 40 has detected water droplets attached to the lens 11, the controller 39 generates a control command for outputting a downwardly adjusted edge line length value in the detected edge information. The control command is output to the second three-dimensional object detection unit 37.

Similarly, in a case where the second three-dimensional object detection unit 37 for detecting three-dimensional objects using edge information detects a three-dimensional object based on an assessment of whether the number of edge lines that are equal to or greater than a predetermined length contained in the edge information, e.g., edge lines that have lengths that are equal to or greater than the threshold value $\theta$, is equal to or greater than the second threshold value $\beta$, when the water droplet detection unit 40 has detected water droplets attached to the lens 11, the controller 39 generates a control command for upwardly adjusting the second threshold value $\beta$ so that three-dimensional objects are not readily detected. The control command is output to the second three-dimensional object detection unit 37.

Similarly, in a case where the second three-dimensional object detection unit 37 for detecting three-dimensional objects using edge information detects a three-dimensional object based on an assessment of whether the number of edge lines that are equal to or greater than a predetermined length contained in the edge information, e.g., edge lines that have lengths that are equal to or greater than the threshold value $\theta$, is equal to or greater than the second threshold value $\beta$, when the water droplet detection unit 40 has detected water droplets attached to the lens 11, the controller 39 generates a control command for outputting a downwardly adjusted number of detected edge lines that are equal to or greater than a predetermined length. The control command is output to the second three-dimensional object detection unit 37.

In addition, in a case where the traveling speed of the detected three-dimensional object is equal to or greater than a predetermined speed that has been set in advance, and the three-dimensional object assessment unit 38 assesses that the three-dimensional object is another vehicle, when the water droplet detection unit 40 detects water droplets attached to the lens 11, the controller 39 generates a control command for upwardly adjusting the predetermined speed that serves as the lower limit for assessment that a three-dimensional object is another vehicle so that a three-dimensional object is not readily detected. The control command is output to the three-dimensional object assessment unit 38.

Similarly, in a case where the traveling speed of the detected three-dimensional object is equal to or greater than a predetermined speed that has been set in advance, and the three-dimensional object assessment unit 38 assesses that the three-dimensional object is another vehicle, when the water droplet detection unit 40 detects water droplets attached to the lens 11, the controller 39 generates a control command for outputting a downwardly adjusted traveling speed of the three-dimensional object that is compared with the predetermined speed that serves as the lower limit for assessing that a three-dimensional object is another vehicle. The control command is output to the three-dimensional object assessment unit 38.

In addition, in a case where the traveling speed of the detected three-dimensional object is less than a predetermined speed that has been set in advance, and the three-dimensional object assessment unit 38 assesses that the three-dimensional object is another vehicle, when the water droplet detection unit 40 detects water droplets attached to the lens 11, the controller 39 generates a control command for downwardly adjusting the predetermined speed that serves as the upper limit for assessment that a three-dimensional object is another vehicle. The control command is output to the three-dimensional object assessment unit 38.

Similarly, in a case where the traveling speed of the detected three-dimensional object is less than a predetermined speed that has been set in advance, and the three-dimensional object assessment unit 38 assesses that the three-dimensional object is another vehicle, when the water droplet detection unit 40 detects water droplets attached to the lens 11, the controller 39 generates a control command for upwardly adjusting the traveling speed of the three-dimensional object that is compared with the predetermined speed that serves as the upper limit for assessment that a three-dimensional object is another vehicle. The control command is output to the three-dimensional object assessment unit 38.

The term "traveling speed" used herein includes the relative speed of the three-dimensional object with respect to the host vehicle as well as the absolute speed of the three-dimensional object. The absolute speed of the three-dimensional object may be calculated from the relative speed of the three-dimensional object, or the relative speed of the three-dimensional object may be calculated from the absolute speed of the three-dimensional object.

The controller 39 may partially mask the detection areas A1, A2 or may adjust the threshold values or output values used for detection or assessment, in order to suppress output of the final assessment result of the three-dimensional object assessment unit 38 that a three-dimensional object is another vehicle VX, or the detection result of the first three-dimensional object detection unit 33 or the second three-dimensional object detection unit 37 that a three-dimensional object is present.

Specifically, the controller 39 designates the position information (image coordinate information) of a portion of the detection areas A1, A2 corresponding to the positions of the water droplets attached to the lens 11 and generates a control command whereby the detection process for three-dimensional objects in the masked area or the assessment as to whether a three-dimensional object is another vehicle VX is not carried out, and control commands for outputting results indicating that a three-dimensional object is not detected in the masked area, or that a three-dimensional object in the masked area is not another vehicle VX. The control commands are sent to the first three-dimensional object detection unit 33, the second three-dimensional object detection unit 37, or the three-dimensional object assessment unit 38. The control commands for outputting results indicating that a three-dimensional object is not detected in the masked area, or that a three-dimensional object in the masked area is not another vehicle VX, include commands for designating the image data in the masked area and commands for changing the respective threshold values or output values as described above.

In this manner, the controller 39 generates control commands for changing the threshold values and output values, control commands for halting the three-dimensional object detection process or the assessment of whether a three-dimensional object is another vehicle VX, and control commands for outputting results indicating that a three-dimensional object is not detected or that a three-dimensional object is not another vehicle VX, and also sends the control commands to the first three-dimensional object detection unit 33, the second three-dimensional object detection unit 37, or the three-dimensional object assessment unit 38.

The first three-dimensional object detection unit 33 or second three-dimensional object detection unit 37 in this example, in accordance with the control commands from the controller 39, excludes some of the image information, differential waveform information, and edge information from the information that is to be processed, adjusts the threshold values or output values, and carries out detection of three-dimensional objects according to strict criteria. The process whereby the results of detection indicating that a three-dimensional object is not detected are output is carried out, or the three-dimensional object detection process itself is halted. Similarly, the three-dimensional object assessment unit 38, in accordance with the control commands from the controller 39, adjusts the threshold values or output values, and assesses whether or not a three-dimensional object that has been detected according to strict criteria is another vehicle VX, and an assessment indicating that the three-dimensional object is not another vehicle VX is output, or the three-dimensional object assessment process itself is halted. The control process pertaining to three-dimensional object assessment described above is carried out when the water droplet detection unit 40 detects a condition in which water droplets are attached to the lens 11 receiving an image of the detection areas A1, A2.

Next, an example is described of three-dimensional object detection suppression by the controller 39 of this example. In the example described below, the first threshold value α of the first three-dimensional object detection unit 33 and the second threshold value β of the second three-dimensional object detection unit 37 are set in accordance with the water droplet attachment state detected by the water droplet detection unit 40. More specifically, at least one of the first threshold value α and second threshold value β is set larger as the number of water droplets detected by the water droplet detection unit 40 increases. The number of water droplets in this case may be the number over the entire lens corresponding to the entire captured image, or the number attached to the lens areas corresponding to the areas specified as detection areas A1, A2.

Figure 33:
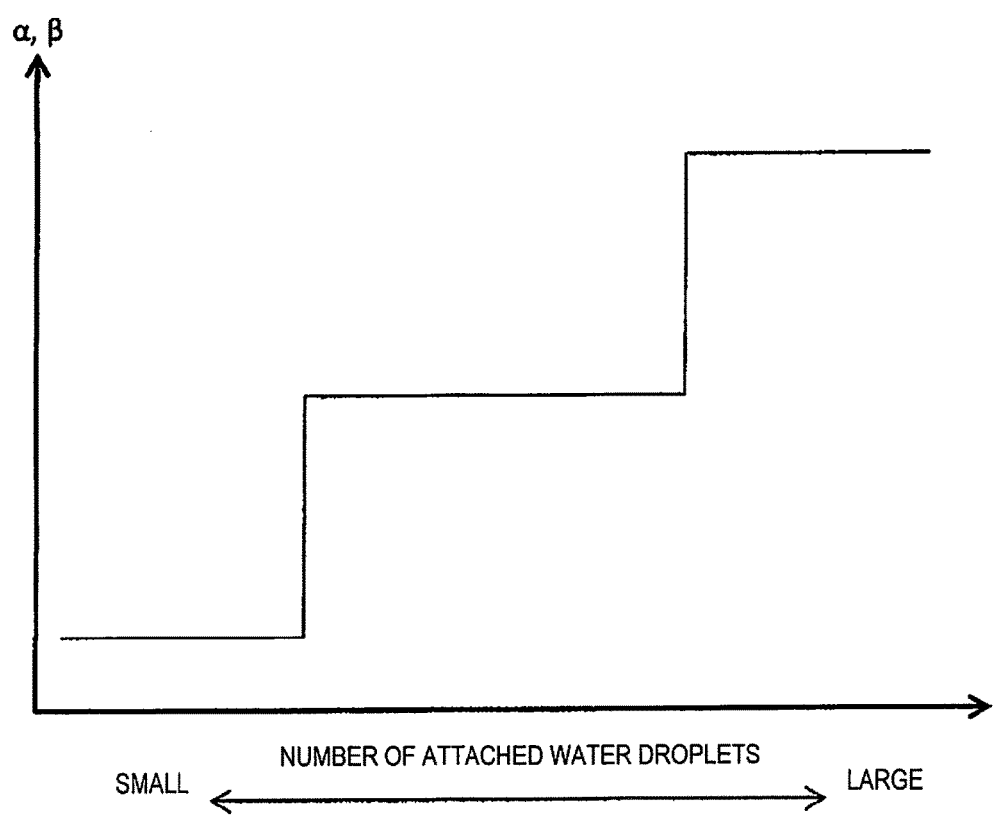
FIG. 33 is an example of a control map illustrating the relationship of the first threshold value α and second threshold value β with respect to the number of water droplets.
Figure 34:
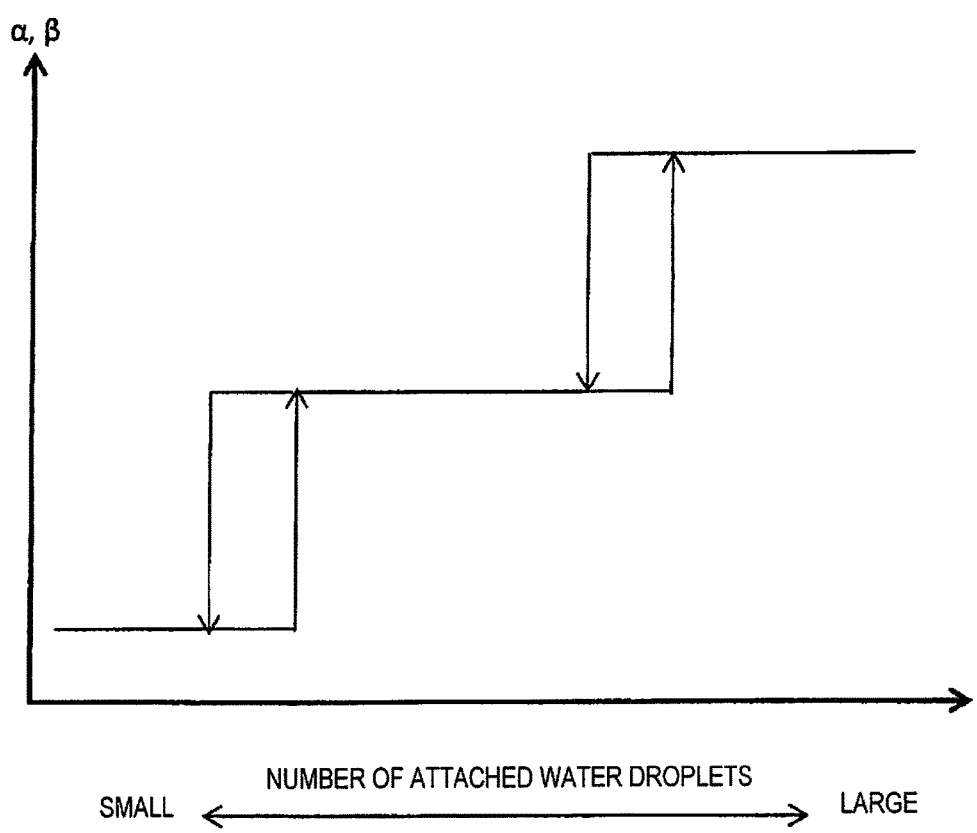
FIG. 34 is another example of a control map illustrating the relationship of the first threshold value α and second threshold value β with respect to the number of water droplets.
Figure 35:
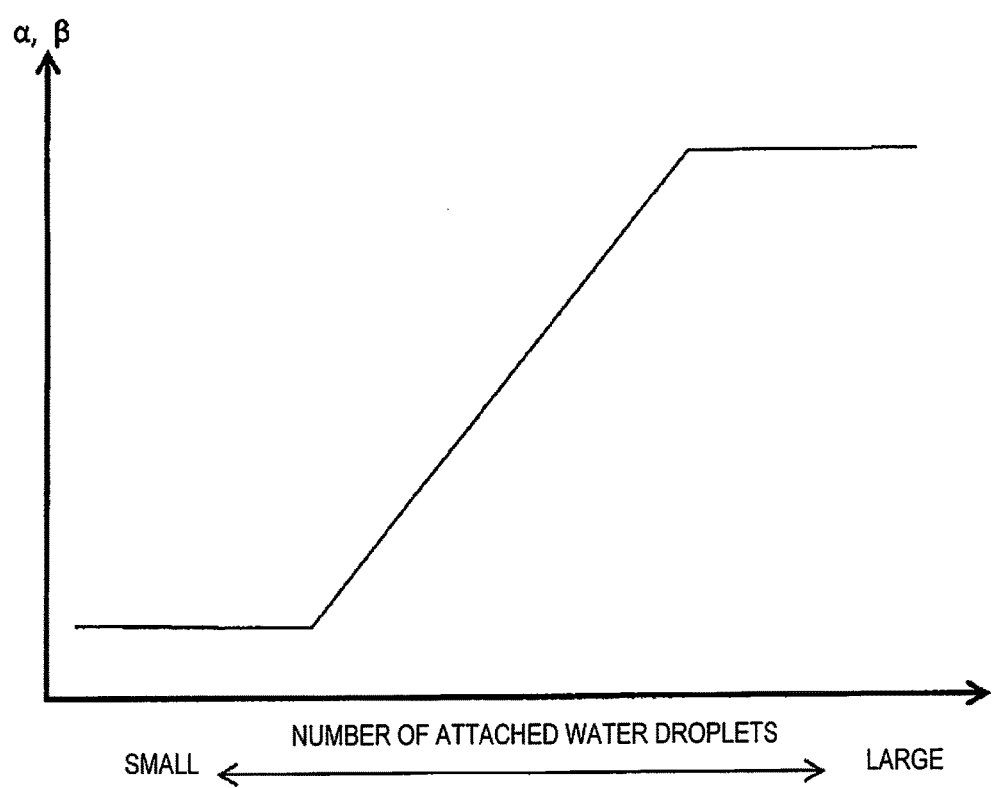
FIG. 35 is another example of a control map illustrating the relationship of the first threshold value α and second threshold value β with respect to the number of water droplets
Figure 36:
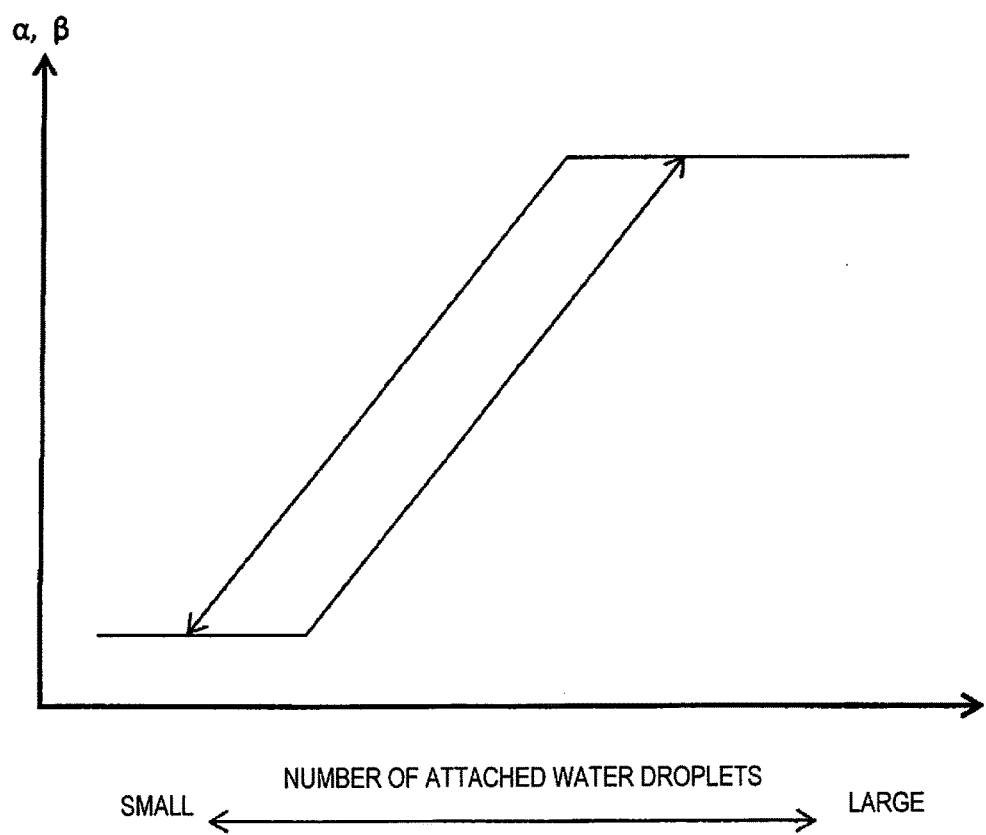
FIG. 36 is another example of a control map illustrating the relationship of the first threshold value α and second threshold value β with respect to the number of water droplets.

FIGS. 33 to 36 are control maps illustrating a setting example of the first threshold value α and second threshold value β with respect to the number of attached water droplets. FIG. 33 is an example in which the first threshold value α or second threshold value β is increased in steps as the number of attached water droplets increases. Similarly, FIG. 34 is an example in which the first threshold value α or second threshold value β is increased in steps as the number of attached water droplets increases, but hysteresis is set in the example in order to prevent control hunting. FIG. 35 is an example in which the first threshold value α or second threshold value β is increased proportionally as the number of attached water droplets increases. Similarly, FIG. 36 is an example in which the first threshold value α or second threshold value β is increased proportionally as the number of attached water droplets increases, but hysteresis is set in order to prevent control hunting.

Figure 32:
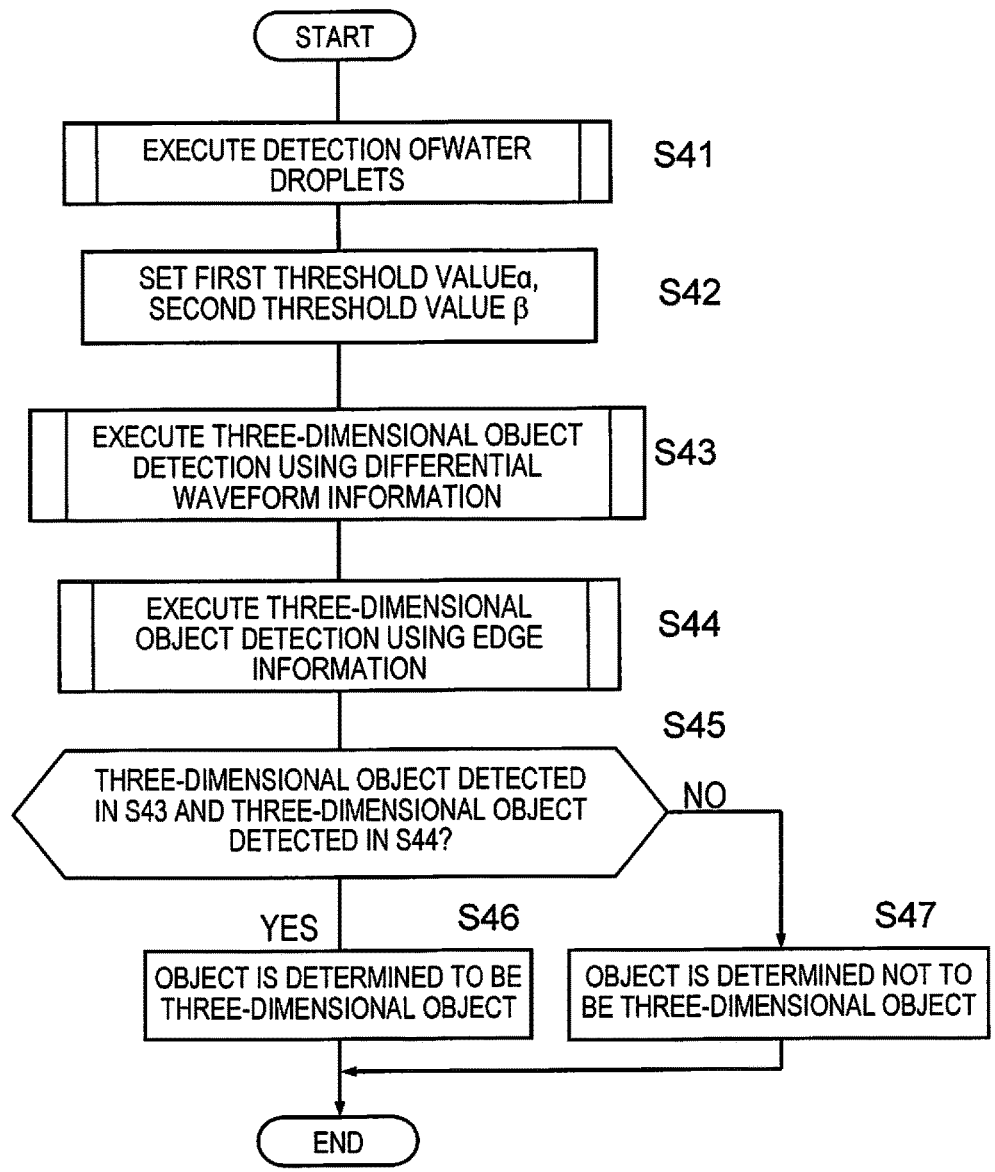
FIG. 32 is a flowchart t illustrating the control procedure of the three-dimensional assessment unit of FIG. 31.

The operation of the three-dimensional object assessment unit 38 and the controller 39 is described below with reference to FIG. 32. First, in step S41, the state of water droplet attachment (number of water droplets) on the lens 11 is detected by the water droplet detection unit 40, and the result is output to the controller 39. In step S42, the controller 39 computes the first threshold value α and second threshold value β using any of the control maps of FIGS. 33 to 36 stored in advance and the detected water droplet attachment state, and outputs the result to the first three-dimensional object detection unit 33 and the second three-dimensional object detection unit 37.

In step S43, detection of a three-dimensional object by differential waveform information by the procedure described above is carried out. In step S44, detection of a three-dimensional object using edge information by the procedure described above is carried out. In detecting a three-dimensional object using edge information and detecting a three-dimensional object using difference information, the first threshold value α and second threshold value β are respectively set in the first three-dimensional object detection unit 33 and the second three-dimensional object detection unit 37 in accordance with the water droplet attachment state.

In step S45, assessment is made as to whether detection of a three-dimensional object was made in step S43 and whether detection of a three-dimensional object was made in step S44, and if detection of a three-dimensional object was made in either step S43 or S44, the process proceeds to step S46, and a final assessment of a three-dimensional object is made. If a three-dimensional object is not detected in step S43 or S44, then the process proceeds to step S47, and the final assessment that there is no three-dimensional object is made.

As described above, according to the three-dimensional object detection device 1 of this example, when water droplets are attached to the lens 11 of the camera 10, there is the potential for erroneous detection of water droplets as three-dimensional objects due to the influence of, e.g., street lights or head lights when the detection surroundings are dark, e.g., at night. However, detection of three-dimensional objects is suppressed as the number of attached water droplets increases, and therefore it is possible to prevent erroneous detection of three-dimensional objects and water droplets.

Incidentally, in the generation of differential waveform information by the alignment unit 32 and the first three-dimensional object detection unit 33 in FIG. 31, a bird's-eye-view image at the current moment and a bird's-eye-view image at a single moment prior were aligned while shifting the position of the bird's-eye-view image by the travel distance in actual space based on the traveling speed of the host vehicle as shown in FIG. 4 in the second embodiment described above, a differential image was determined in this state, and differential waveform information was generated therefrom. However, this procedure may be carried out by another method illustrated in FIGS. 28 to 30 as in the first embodiment described above.

The three-dimensional object detection device 1 of this example constituted and worked in the manner described above provides the following effects.

(1) The three-dimensional object detection device 1 of this example sets an arbitrary attention point in the image, sets a plurality of inner reference points inside an imaginary circle of a predetermined radius centered at the attention point, and sets a plurality of outer reference points corresponding to the inner reference points outside the imaginary circle. Edge information is detected between these inner reference points and outer reference points, and by assessing the circularity strength of the edge information, water droplets attached to the lens 11 of the camera 10 are detected, thereby allowing precise detection of water droplets.

(2) When water droplets are attached to the lens 11 of the camera 10 and the detection environment is dark, e.g., at night, the three-dimensional object detection device 1 in this example may erroneously detect water droplets as three-dimensional objects due to the influence of, e.g., street lights or head lights. However, the water droplet removal device 41 is operated in accordance with the water droplet attachment state to remove water droplets, thereby making it possible to prevent erroneous detection of three-dimensional objects and water droplets.

(3) When water droplets are attached to the lens 11 of the camera 10 and the detection environment is dark, e.g., at night, the three-dimensional object detection device 1 in this example may erroneously detect water droplets as three-dimensional objects due to the influence of, e.g., street lights or head lights. However, assessment that a three-dimensional object is another vehicle is suppressed in accordance with the water droplet attachment state, thereby making it possible to prevent erroneous detection of three-dimensional objects and water droplets.

The camera 10 described above corresponds to the image capturing means in the present invention, the lens 11 described above corresponds to the photographic optical system in the present invention, the viewpoint conversion unit 31 described above corresponds to the image conversion means in the present invention, the alignment unit 32 and the first three-dimensional object detection unit 33 described above correspond to the first three-dimensional object detection means in the present invention, the luminance difference calculation unit 35, the edge line detection unit 36, and the second three-dimensional object detection unit 37 described above correspond to the second three-dimensional object detection means in the present invention, the three-dimensional object assessment unit 38 described above corresponds to the three-dimensional object assessment means in the present invention, the water droplet detection unit 40 described above corresponds to the water droplet detection means in the present invention, the controller 39 described above corresponds to the control means in the present invention, and the water droplet removal device 41 corresponds to the water droplet removal means.

The invention claimed is:

1. A water droplet detection device comprising:
   an image capturing unit configured to capture an area an image of a predetermined area, the image capturing unit having a photographic optical system; and
   a water droplet detection unit programmed to set an arbitrary attention point in the image obtained by the image capturing unit, a plurality of first reference points inside an imaginary circle of a predetermined radius having the attention point as a center the imaginary circle, and a plurality of second reference points corresponding to the first reference points outside the imaginary circle, each of the second reference points being set on a straight line connecting the attention point and the corresponding one of the first reference points, the water droplet detection unit being further programmed to detect edge information between the first reference points and second reference points, and the water droplet detection unit being further programmed to assess a circularity strength of the edge information, thereby detecting a water droplet attached to the photographic optical system, the circularity strength being determined as a ratio of a number of pairs of the corresponding first and second reference points between which the edge information was detected to a total number of the corresponding first and second reference points, and the water droplet attached to the photographic optical system being detected when the circularity strength is equal to or greater than a prescribed ratio.

2. The water droplet detection device according to claim 1, wherein the water droplet detection unit is further programmed to set, as the first reference point, at least one of an upper center part, an upper left part, an upper right part, a lower left part, and a lower right part inside the imaginary circle.

3. The water droplet detection device according to claim 1, wherein the water droplet detection is further programmed to assess that the circularity strength is greater when there is a higher proportion at which edge information is detected between the plurality of first reference points and the plurality of second reference points.

4. The water droplet detection device according to claim 1, wherein the edge information is detected between a corresponding pair of the first and second reference points when a luminance difference equal to or greater than a prescribed value exists between the first reference point and the second reference point of the corresponding pair.

5. A three-dimensional object detection device comprising:

an image capturing unit configured to capture an image of a predetermined area, the image capturing unit having a photographic optical system;

an image conversion unit programmed to perform viewpoint conversion of the image obtained by the image capturing unit to a bird's-eye-view image;

a water droplet detection unit programmed to set an arbitrary attention point in the image obtained by the image capturing unit, a plurality of first reference points inside an imaginary circle of a predetermined radius having the attention point as a center the imaginary circle, and a plurality of second reference points corresponding to the first reference points outside the imaginary circle, the water droplet detection unit being further programmed to detect edge information between the first reference points and second reference points, and the water droplet detection unit being further programmed to assess a circularity strength of the edge information, thereby detecting a water droplet attached to the photographic optical system;

a three-dimensional object detection unit programmed to detect a presence of the three-dimensional object based on the pixel distribution data by detecting information on pixel distribution in the bird's-eye-view image obtained by the image conversion unit, for which the luminance difference is equal to or greater than a predetermined first threshold value in a direction in which a three-dimensional object collapses upon viewpoint conversion to the bird's-eye-view image, and, detects the three-dimensional object when a degree of distribution of the pixels is equal to or greater than a predetermined second threshold value in the direction in which the three-dimensional object collapses; a three-dimensional object assessment unit programmed to access whether or not a three-dimensional object in a detection area that has been detected by the three-dimensional object detection unit is another vehicle; and a controller programmed to control the vehicle in accordance with a state of attachment of water droplets in a detection area detected by the water droplet detection unit.

6. The three-dimensional object detection device according to claim 5, further comprising a water droplet removal device configured to remove water droplets that have attached to the photographic optical system, the controller being programmed to operate the water droplet removal device in accordance with the state of water droplet attachment in the detection area detected by the water droplet detection unit.

7. The three-dimensional object detection device according to claim 6, wherein the controller is further programmed to set a longer operating time for the water droplet removal device as the number of water droplets detected by the water droplet detection unit increases.

8. The three-dimensional object detection device according to claim 6, wherein the controller is further programmed to operate the water droplet removal device when water droplets are detected in the predetermined area in the image.

9. The three-dimensional object detection device according to claim 6, wherein the controller is further programmed to operate the water droplet removal device when the brightness of the environment is equal to or less than a predetermined value.

10. The three-dimensional object detection device according to claim 5, wherein the controller is further programmed to suppress detection of a three-dimensional object by the three-dimensional object detection unit, or suppress assessment by the three-dimensional object assessment unit that the three-dimensional object is another vehicle, in accordance with the water droplet attachment state detected by the water droplet detection unit.

11. The three-dimensional object detection device according to claim 5, wherein the water droplet detection unit is further programmed to assess that the circularity strength is greater when there is an increasing proportion at which edge information is detected between the plurality of first reference points and plurality of second reference points, and the controller is further programmed to increase the detection time of the three-dimensional object detection unit longer correspondingly with respect to increased circularity strength detected by the water droplet detection unit.

12. The three-dimensional object detection device according to claim 5, wherein the three-dimensional object detection unit comprises a first three-dimensional object detection unit programmed to detect a presence of the three-dimensional object based on differential waveform information by aligning bird's-eye viewpoint positions of bird's-eye-view images obtained at different points in time by the image conversion unit; counting a number of pixels exhibiting a predetermined difference in a preset detection area in a predetermined area on a differential image of the bird's-eye-view images that were aligned; producing a frequency distribution to generate the differential waveform information;

the three-dimensional object detection unit detects the three-dimensional object when the differential waveform information is equal to or greater than a predetermined first threshold value α; and the controller is further programmed to:
generate a first control command for upwardly adjusting the predetermined first threshold value α so that the three-dimensional object is not easily detected when water droplets have been detected by the water droplet detection unit, and
output the first control command to the first three-dimensional object detection unit.

13. The three-dimensional object detection device according to claim 12, wherein
the first three-dimensional object detection unit is programmed to detect the three-dimensional object when the differential waveform information is equal to or greater than the predetermined first threshold value α, and
the controller is further programmed to:
generate a second control command to reduce the value obtained by counting the number of pixels exhibiting the predetermined difference in the differential image of the bird's-eye-view images and producing the frequency distribution when water droplets have been detected by the water droplet detection unit; and
output the second control command to the first three-dimensional object detection unit.

14. The three-dimensional object detection device according to claim 12, wherein
the first three-dimensional object detection unit is programmed to extract the number of pixels exhibiting pixel values that are equal to or greater than a threshold value p as the number of pixels exhibiting the predetermined difference, and
the controller is further programmed to:
generate a second control command for upwardly adjusting the threshold value p so that the three-dimensional object is not easily detected when water droplets have been detected by the water droplet detection unit, and
output the second control command to the first three-dimensional object detection unit.

15. The three-dimensional object detection device according to claim 12, wherein
the first three-dimensional object detection unit is programmed to extract the number of pixels exhibiting pixel values that are equal to or greater than a threshold value p as the number of pixels exhibiting the predetermined difference, and
the controller is further programmed to:
generate a second control command for outputting a downwardly adjusted number of pixels that are extracted in the differential image along the direction in which the three-dimensional object collapses upon viewpoint conversion of the bird's-eye-view image when water droplets have been detected by the water droplet detection unit, and
output the second control command to the first three-dimensional object detection unit.

16. The three-dimensional object detection device according to claim 5, wherein
the three-dimensional object detection unit comprises a second three-dimensional object detection unit programmed to detect a presence of the three-dimensional object based on edge information in a preset detection area within the predetermined area from the bird's-eye-view images obtained by the image conversion unit,
the three-dimensional object detection unit programmed to extract edge lines based on the pixels exhibiting a luminance difference that is equal to or greater than a predetermined threshold value t; and
the controller is further programmed to
generate a first control command for upwardly adjusting the predetermined threshold value t so that the three-dimensional object is not easily detected when water droplets have been detected by the water droplet detection unit, and
output the first control command to the second three-dimensional object detection unit.

17. The three-dimensional object detection device according to claim 16, wherein
the second three-dimensional object detection unit is programmed to extract edge lines based on pixels exhibiting the luminance difference that is equal to or greater than the predetermined threshold value t; and
the controller is further programmed to
generate a second control command that reduces the luminance value of the pixels when water droplets have been detected by the water droplet detection unit, and
output the second control command to the second three-dimensional object detection unit.

18. The three-dimensional object detection device according to claim 16, wherein
the second three-dimensional object detection unit is programmed to detect a three-dimensional object based on edge lines having a length equal to or greater than a threshold value θ contained in the edge information, and
the controller is further programmed to generate a control command for upwardly adjusting the threshold value θ so that the three-dimensional object is not easily detected when water droplets have been detected by the water droplet detection unit, and outputs the control command to the second three-dimensional object detection unit.

19. The three-dimensional object detection device according to claim 16, wherein
the second three-dimensional object detection unit is programmed to detect a three-dimensional object based on edge lines having a length equal to or greater than a threshold value θ contained in the edge information, and
the controller is further programmed to:
generate a second control command for outputting a downwardly adjusted value for the length of the edges contained in the detected edge information when water droplets have been detected by the water droplet detection unit, and
output the second control command to the second three-dimensional object detection unit.

20. The three-dimensional object detection device according to claim 16, wherein
the second three-dimensional object detection unit is programmed to detect the three-dimensional object based on assessing whether the number of edge lines that are equal to or greater than a predetermined length contained in the edge information is equal to or greater than a second threshold value β, and the controller is further programmed to generate a second control command for upwardly adjusting the second threshold value β so that the three-dimensional object is not readily detected when water droplets have been detected by the water droplet detection unit, and output the second control command to the second three-dimensional object detection unit.

21. The three-dimensional object detection device according to claim 16, wherein the second three-dimensional object detection unit is programmed to detect the three-dimensional object based on assessing whether the number of edge lines that are equal to or greater than a predetermined length contained in the edge information is equal to or greater than a second threshold value β, and the controller is further programmed to generate a second control command for outputting a downwardly adjusted number of detected edge lines that are equal to or greater than the predetermined length when water droplets have been detected by the water droplet detection unit, and output the second control command to the second three-dimensional object detection unit.

22. The three-dimensional object detection device according to claim 5, wherein the controller is further programmed to assess that the three-dimensional object is another vehicle when water droplets have been detected in the predetermined area in the image.

23. The three-dimensional object detection device according to claim 5, wherein the controller is further programmed to increase a degree of suppression of the assessment that the three-dimensional object is another vehicle in correspondence to an increase in the number of water droplets detected by the water droplet detection unit.

24. The three-dimensional object detection device according to claim 5, wherein the controller is further programmed to suppress the assessment that the three-dimensional object is another vehicle when a brightness of an environment is equal to or less than a predetermined value.

25. The three-dimensional object detection device according to claim 5, wherein the three-dimensional object assessment unit is further programmed to assess that the three-dimensional object is another vehicle when a traveling speed of the three-dimensional object that has been detected is equal to or greater than a preset predetermined value, the controller, when water droplets have been detected by the water droplet detection unit, is further programmed to execute out at least one of the following:

a) generating a first control command for increasing a predetermined speed that serves as a lower limit when an assessment is made that the three-dimensional object is another vehicle, and outputs the first control command to the three-dimensional object assessment unit, b) generating a second control command for outputting a downwardly adjusted a three-dimensional object traveling speed that is compared with the predetermined speed that serves as the lower limit when an assessment is made that the three-dimensional object is another vehicle and outputs the second control command to the three-dimensional object assessment unit, c) generating a third control command for downwardly adjusting a predetermined speed that serves as an upper limit when an assessment is made that the three-dimensional object is another vehicle, and outputs the third control command to the three-dimensional object assessment unit, and d) generating a fourth control command for upwardly adjusting the traveling speed of the three-dimensional object that is compared with the predetermined speed that serves as the upper limit when an assessment is made that the three-dimensional object is another vehicle, and outputs the fourth control command to the three-dimensional object assessment unit.

26. A water droplet detection method for detecting water droplets attached to a photographic optical system of an image capturing unit comprising a photographic optical system, the water droplet detection method comprising:

setting an arbitrary attention point in the captured image that has been acquired by the image capturing unit, a plurality of first reference points inside an imaginary circle of a predetermined radius having the attention point as a center the imaginary circle, and a plurality of second reference points corresponding to the first reference points outside the imaginary circle, each of the second reference points being set on a straight line connecting the attention point and the corresponding one of the first reference points;

detecting edge information between the first reference points and the second reference points;

determining a circularity strength of the edge information as a ratio of a number of pairs of the corresponding first and second reference points between which the edge information was detected to a total number of the corresponding first and second reference points;

assessing that a water droplet is attached to the photographic optical system at a location corresponding to the imaginary circle when the circularity strength is equal to or greater than a prescribed ratio.

27. The water droplet detection method according to claim 26, wherein the edge information is detected between a corresponding pair of the first and second reference points when a luminance difference equal to or greater than a prescribed value exists between the first reference point and the second reference point of the corresponding pair.

* * * * *